(12) United States Patent
Fujimori et al.

(10) Patent No.: US 6,703,474 B2
(45) Date of Patent: Mar. 9, 2004

(54) POLYESTER RESIN, MOLDED PRODUCT MADE THEREOF AND PROCESS FOR PRODUCTION OF POLYESTER RESIN

(75) Inventors: Yoshihiro Fujimori, Mie (JP); Kiyotoshi Fujioka, Mie (JP); Masahiro Nukui, Mie (JP); Yutaka Yatsugi, Mie (JP); Kazuya Nakamichi, Mie (JP); Noboru Satou, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 40 days.

(21) Appl. No.: 10/252,509

(22) Filed: Sep. 24, 2002

(65) Prior Publication Data

US 2003/0144459 A1 Jul. 31, 2003

Related U.S. Application Data

(63) Continuation of application No. PCT/JP02/00562, filed on Jan. 25, 2002.

(30) Foreign Application Priority Data

Jan. 25, 2001 (JP) .......................... 2001-016535
Sep. 27, 2001 (JP) .......................... 2001-297454

(51) Int. Cl.$^7$ .............................. C08G 63/78
(52) U.S. Cl. .................... 528/275; 528/279; 528/280; 528/281; 528/283; 528/285; 528/286; 528/301; 528/308.6; 428/221; 428/364; 524/706; 524/779; 524/783; 524/785; 525/437; 525/445
(58) Field of Search .................... 528/275, 279, 528/280, 281, 283, 285, 286, 301, 308.6; 428/221, 364; 524/706, 779, 783, 785; 525/437, 445

(56) References Cited

U.S. PATENT DOCUMENTS

| | | | |
|---|---|---|---|
| 5,453,479 A | 9/1995 | Borman et al. | |
| 6,160,085 A | 12/2000 | Fujimori et al. | |
| 6,200,659 B1 | 3/2001 | Fujimori et al. | |

FOREIGN PATENT DOCUMENTS

| | | |
|---|---|---|
| EP | 0 745 629 | 12/1996 |
| EP | 1 013 692 | 6/2000 |
| JP | 62-207325 | 9/1987 |
| JP | 9-87374 | 3/1997 |
| JP | 2000-128964 | 5/2000 |
| JP | 3081104 | 8/2000 |
| JP | 2000-219726 | 8/2000 |
| JP | 2000-219730 | 8/2000 |
| JP | 2000-226444 | 8/2000 |
| JP | 2000-226445 | 8/2000 |
| JP | 2000-226446 | 8/2000 |
| JP | 2000-226500 | 8/2000 |

*Primary Examiner*—Samuel A. Acquah
(74) *Attorney, Agent, or Firm*—Oblon, Spivak, McClelland, Maier & Neustadt, P.C.

(57) ABSTRACT

A polyester resin produced by polycondensing a dicarboxylic acid component containing an aromatic dicarboxylic acid or its ester-forming derivative as the main component and a diol component containing ethylene glycol as the main component in the presence of at least an antimony compound and a phosphorus compound, via an esterification reaction or an ester exchange reaction, which is characterized in that the amount of antimony eluted when immersed in hot water of 95° C. for 60 minutes in the form of particles having a number average particle weight of 24 mg, is not more than 1 $\mu$g per 1 g of the polyester resin, as antimony atoms (Sb).

31 Claims, 2 Drawing Sheets

POLYESTER RESIN, MOLDED PRODUCT MADE THEREOF AND PROCESS FOR PRODUCTION OF POLYESTER RESIN

This application is a Continuation of International Application No. PCT/JP02/00562, filed Jan. 25, 2002.

TECHNICAL FIELD

The present invention relates to a polyester resin polycondensed in the presence of an antimony compound which is to be used for molding of e.g. bottles, films, sheets and fibers, and a process for its production. More particularly, it relates to a polyester resin having the elution of antimony suppressed during the contact with water, solvent, etc., in a posttreatment step after the polycondensation, in a dying step after processed into polyester fibers and at the time of filling a content as used as a polyester container, etc.

BACKGROUND ART

Heretofore, a polyester resin such as a polyethylene terephthalate resin has been widely used as various packaging materials such as containers or films, or as fibers, etc., since it is excellent in mechanical strength, chemical stability, gas barrier property, hygienics, etc., and is relatively inexpensive and light in weight.

Such a polyester resin is produced mainly by using an antimony compound as a polycondensation catalyst. However, there has been concern about a problem such that the antimony compound or metal antimony remaining in the resin may elute, for example, in a step of being contacted with water for e.g. cooling after the polycondensation or in a step of being contacted with a solvent for e.g. dying after being processed into fibers, thus causing environmental pollution. Further, there has been concern about a possibility that in use as a packaging material for e.g. a container, it will elute from the container, for example, in a step of being contacted with hot water for e.g. heat sterilizing filling. Accordingly, various polyester resins have been proposed which are produced, for example, by using a titanium compound as a polycondensation catalyst instead of the antimony compound or using a titanium compound in combination therewith. However, there has been a problem such that the color tone of the polyester resin deteriorates, acetaldehyde, diethylene glycol, etc. will form, whereby the amount of such by-products in the polyester resin increases, or elution of antimony from the polyester resin cannot adequately be suppressed.

Meanwhile, when a polyester resin or the like is used for a hollow container for a beverage, it may be used, for example, for a non-carbonated beverage such as mineral water, tea or juice, or for a carbonated beverage. Further, irrespective of the non-carbonated or carbonated beverage, an unheated aseptic filling method and a heat sterilization filling method are available as methods for filling the beverage.

A conventional polyester resin obtainable by using an antimony compound as a catalyst has a high crystallization rate, whereby the transparency tends to be poor. Accordingly, especially when it is used for a hollow container for a non-carbonated beverage, it is common to suppress the crystallization rate to a proper level by copolymerizing e.g. diethylene glycol-isophthalic acid in a small amount and usually setting the molecular weight (usually represented by the intrinsic viscosity) of the resin to be relatively high, in order to form a container such as a bottle excellent in transparency. However, since a copolymer component is incorporated, there is a problem such that oriented crystallization will not adequately proceed at the time of molding, whereby it tends to be difficult to obtain a molded product having sufficient heat resistance and strength efficiently, and when formed into a molded product, the amount of by-products such as acetaldehyde contained in the molded product tends to increase. If the molecular weight is further increased, there has been a problem such that the productivity of the resin and the productivity in the molding tend to deteriorate, or the amount of by-products such as acetaldehyde tends to further increase.

Further, with a conventional polyester resin obtainable by using an antimony compound as a catalyst, the crystallization rate is high, and accordingly, it is common to carry out copolymerization of a corresponding amount of diethylene glycol as mentioned above, whereby the transparency when formed into a. container may be improved, but in a case where it is used as a bottle particularly for a carbonated beverage, which is transported in a state where a stress is exerted by the inner pressure of the contained beverage, there has been a problem that cracks are likely to form by external factors such as the environmental temperature, chemical agents or solvents.

For the purpose of e.g. imparting environmental stress cracking resistance to a bottle for a carbonated beverage, a method of copolymerizing a polyfunctional compound component (e.g. JP-A-5-84808) or a method of applying anneal treatment to a bottle (e.g. JP-A-6-297550) has, for example, been proposed. However, such methods are not necessarily satisfactory from the viewpoint of the thermal stability during the production of a bottle, the transparency as a bottle or the productivity of the bottle.

Further, with a conventional polyester resin obtainable by using an antimony compound as a catalyst, the crystallization rate is so high that when a bottle obtained by molding it, is used particularly for heat sterilization filling, there has been a problem that deterioration of the transparency of a preform by heat treatment before blowing at the time of molding a bottle, tends to be remarkable. Accordingly, there have been many proposals from the viewpoint of the polycondensation catalyst, such as a method of using a titanium compound or a germanium compound, and further a magnesium compound and a phosphorus compound, in combination with the antimony compound, as a polycondensation catalyst. However, according to the study by the present inventors, it has been found that although in each proposal, the effect of lowering the crystallization rate is observed, there has been a problem that the above-mentioned heat treatment at the time of molding a bottle, takes time and there will be a difference between local crystallization rates, for example, between inside and outside of the mouth stopper portion, whereby the dimensional precision at the mouth stopper portion cannot be stabilized.

Further, with a conventional polyester resin obtainable by using an antimony compound as a catalyst, the crystallization rate is so high that there has been a problem that at the time of molding a bottle, in the injection molding of a preform, it is necessary to set the molding temperature at a high level for melting and plasticizing, followed by injection into a mold and by quenching in order to maintain the transparency, and the molding temperature is obliged to be high, consequently, by-products such as acetaldehyde, cyclic low molecular weight products, etc. will form in the resin after the molding, and such acetaldehyde may adversely affect the taste of the content when used as a bottle, or such cyclic low molecular weight products tend to contaminate the blow molding mold, whereby for the cleaning of the mold, the productivity will substantially be reduced.

Further, in order to solve the above-mentioned various problems, various proposals have been made for a process for producing a polyester resin wherein the amount of the antimony is reduced, and a titanium compound or a germanium compound, and further a magnesium compound and a phosphorus compound or the like are used in combination. However, by any one of conventional methods, it is difficult to sufficiently suppress elution of antimony, and there has been a problem that the above-mentioned other various problems cannot be adequately solved, or the polymerizability deteriorates, whereby the productivity of the polyester resin tends to be poor.

For example, JP-A-9-87374 discloses a process for producing a thermoplastic polyester, characterized in that in the production of a thermoplastic polyester resin comprising a dicarboxylic acid component and an alkylene glycol component, a mixture of an antimony compound and a titanium compound, and at least one compound selected from alkali metal compounds and alkaline earth metal compounds, are used as a polycondensation catalyst.

JP-A-2000-128964 discloses a polyester resin produced by using an antimony compound as a catalyst and containing ethylene terephthalate as the main repeating unit, which is characterized in that the haze of a molded product having a thickness of 4 mm molded from this resin at a temperature of 290° C., is not more than 3.0%, and the haze of a molded product having a thickness of 5 mm is not more than 15.0%.

Japanese Patent No. 03081104 discloses a polyester for forming a film comprising an aromatic dicarboxylic acid as the main acid component and an aliphatic glycol as the main glycol component, which is characterized in that the content of metal-containing precipitated particles by a catalyst used at the time of synthesizing the polyester, is not more than 0.01 wt % (based on the polyester), and the catalyst comprises a titanium compound or a titanium compound and an antimony compound, and the amounts of these metal elements satisfy the specific ranges. JP-A-2000-219726, JP-A-2000-219730, JP-A-2000-226444, JP-A-2000-226445, JP-A-2000-226446 and JP-A-2000-226500 disclose polyester resins containing Sb and Ti or/and Ge as catalysts, and having densities and density-increasing rates within specific ranges.

However, according to the study by the present inventors, elution of antimony is not adequately suppressed, and the polymerizability and the productivity of the polyester resin are poor.

The present invention has been made in view of the above-described prior art, and it is an object of the present invention to provide a polyester resin poly-condensed in the presence of an antimony compound and having elution of antimony suppressed, and a process for producing a polyester resin, whereby such a polyester resin can be obtained with good polymerizability and productivity.

DISCLOSURE OF THE INVENTION

The present invention has been made to accomplish the above object. Namely, the present invention relates to a polyester resin (hereinafter referred to as polyester (①)) produced by polycondensing a dicarboxylic acid component containing an aromatic dicarboxylic acid or its ester-forming derivative as the main component and a diol component containing ethylene glycol as the main component in the presence of at least an antimony compound and a phosphorus compound, via an esterification reaction or an ester exchange reaction, which is characterized in that the amount of antimony eluted when immersed in hot water of 95° C. for 60 minutes in the form of particles having a number average particle weight of 24 mg, is not more than 1 $\mu$g per 1 g of the polyester resin, as antimony atoms (Sb).

By such present invention, elution of antimony can be suppressed, and a polyester resin having a good color tone and having formation of by-products suppressed, can be provided.

One of preferred embodiments of the present invention is a polyester resin (hereinafter referred to as polyester ②) which is polyester ① wherein the ethylene glycol component is at least 96 mol % of the total glycol component, the diethylene glycol component is not more than 2.5 mol % of the total glycol component, the terephthalic acid component is at least 98.5 mol % of the total acid component, the intrinsic viscosity IV is from 0.65 to 1.0 dl/g, and the temperature-lowering crystallization temperature $Tc_2$ is from 150 to 200° C. According to this embodiment, even if the copolymerized amount is particularly small and the intrinsic viscosity is low, the crystallization rate is low, whereby when formed into a container such as a bottle, it is possible to obtain a container having excellent transparency, heat resistance and strength at high productivity, such being particularly suitable for a hollow container for a non-carbonized beverage such as mineral water, tea or juice.

Another preferred embodiment of the present invention is a polyester resin (hereinafter referred to as polyester ③) which is polyester ① and which contains an ethylene terephthalate unit as the main repeating constituting unit and is characterized by satisfying the following characteristics (1), (2) and (3):

(1) after formed into a molded product, the temperature-rising crystallization temperature ($Tc_1$) is at least 155° C., and the temperature-lowering crystallization temperature ($Tc_2$) is at most 180° C. or not observed, (2) the difference ($\Delta AA=AA_s-AA_o$) between the acetaldehyde content ($AA_s$; ppm) in a molded product after injection molding at 280° C. and the acetaldehyde content ($AA_o$; ppm) before the injection molding, is not more than 15 ppm, and (3) when an injection-molded sheet having a thickness of 1 mm is immersed in a 0.2 wt % sodium hydroxide aqueous solution at 25° C. in such a state that it is fixed along the outer circumference of a cylinder having a diameter of 32mm, the environmental stress rupture time is at least 10 minutes.

According to this embodiment, particularly, the transparency, strength, taste deterioration resistance of e.g. the contained beverage and environmental stress cracking resistance are good, such being particularly suitable for a bottle for a carbonated beverage.

Another preferred embodiment of the present invention is a polyester resin (hereinafter referred to as polyester ④) which is polyester ② or ③ and which is characterized in that it contains a polyolefin resin or a polyamide resin in an amount of from 0.0001 to 1000 ppm, and after formed into a molded product, the temperature-rising crystallization temperature ($Tc_1$) is from 155 to 165° C., and the temperature-lowering crystallization temperature ($Tc_2$) is at most 180° C. or not observed. This embodiment has a characteristic such that particularly when formed into a hollow container, the transparency of the body portion will not deteriorate, and the crystallization rate at the mouth stopper portion is high, whereby the productivity of the hollow container is excellent, and the dimensional stability of the mouth stopper portion is excellent, and there will be no substantial deformation of the mouth stopper portion during hot filling, and it is suitable for a hollow container to be used by heat sterilization filling irrespective of a non-carbonated beverage or a carbonated beverage.

Another preferred embodiment of the present invention is a polyester resin (hereinafter referred to as polyester ⑤) which is polyester ① and which is characterized in that the haze in a thickness of 5 mm of a molded product after injection molding at 270° C. is not more than 50%. According to this embodiment, even if the molding temperature is set to be lower than ever, molding is possible without impairing the transparency, whereby a molded product excellent also in transparency can be obtained while suppressing formation of acetaldehyde during the molding and suppressing contamination of the mold during the molding, and thus it is suitable for a hollow container irrespective of whether it is for a non-carbonated or carbonated beverage or whether it is for unheated aseptic filling or for heat sterilization filling.

Another preferred embodiment of the present invention is a polyester resin (hereinafter referred to as polyester ⑥) which is polyester ① and which is characterized in that the number of particles of at least 1 μm in the interior of the resin is not more than 20 particles/0.01 mm$^3$. According to this embodiment, the number of particles in the interior of the resin is particularly small, whereby at the time of forming fibers or films, there will be no substantial thread breakage or film rupture caused by the particles, or when formed into a film, there will be no substantial projections such as fish eyes on the surface, and thus, it is suitable for fibers and films.

Further, another gist of the present invention resides in a process for producing a polyester resin, which comprises polycondensing a dicarboxylic acid component containing an aromatic dicarboxylic acid or its ester-forming derivative as the main component and a diol component containing ethylene glycol as the main component, characterized in that a catalyst is added to the reaction system so that the following respective atoms derived from the catalyst will be contained in the following concentration ranges based on the obtainable polyester resin:

$0 < T \leq 50$ ppm $10 \leq Sb \leq 250$ ppm $0.1 \leq P \leq 200$ ppm $6.0 \leq Sb/P \leq 30$ (in the above formulae, T is the total concentration (ppm) of at least one type of atoms selected from the group consisting of titanium atoms, hafnium atoms and zirconium atoms in the resin, Sb is the concentration (ppm) of antimony atoms in the resin, and P is the concentration (ppm) of phosphorus atoms in the resin). According to this invention, it is possible to produce the polyester resin of the present invention having elution of antimony suppressed, with good polymerizability and productivity.

Figure 1A:
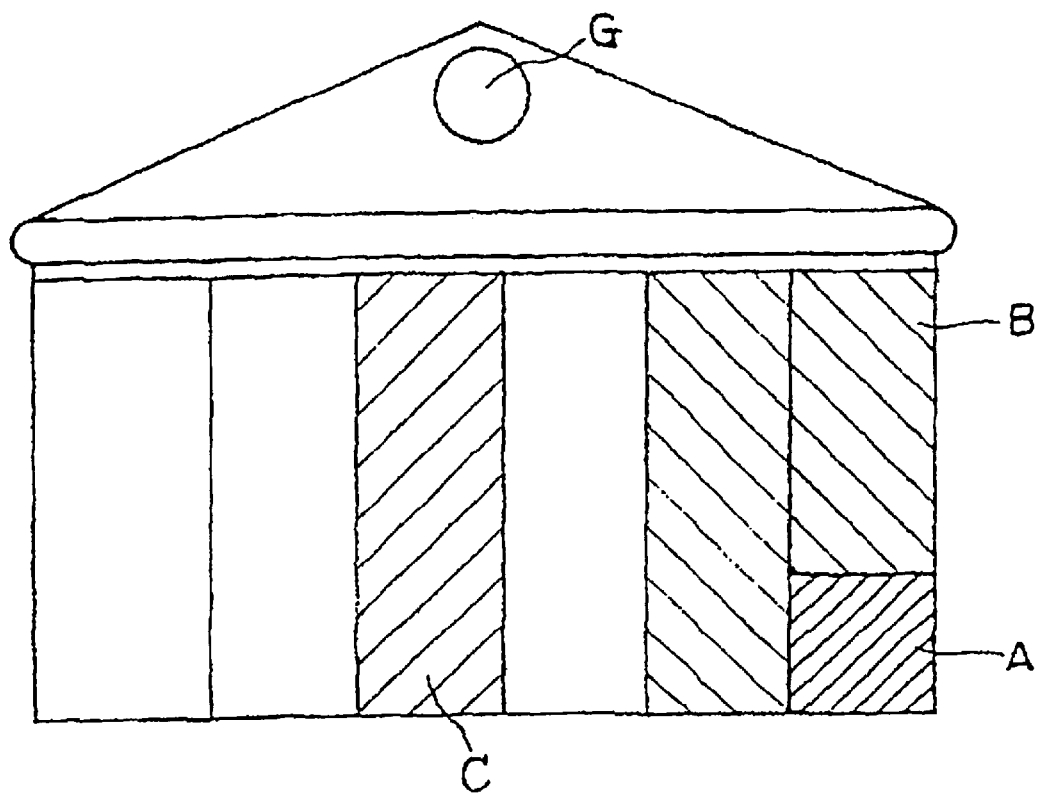
FIGS. 1: (a) is a plan view and (b) is a front view, of a stepped molded plate for evaluation of the physical properties, molded in Examples.

DESCRIPTION OF SYMBOLS 1 tank for preparation of a slurry
2 esterification reactor (first stage)
3 esterification reactor (second stage)
4 catalyst supply pipe
5 transportation pipe for the esterification reaction product
6 melt polycondensation reactor (first stage)
7 melt polycondensation reactor (second stage)
8 melt polycondensation reactor (third stage)

BEST MODE FOR CARRYING OUT THE INVENTION

Monomer Components Constituting the Resin

The polyester resin in the present invention is one produced by polycondensing a dicarboxylic acid component containing an aromatic dicarboxylic acid or its ester-forming derivative as the main component and a diol component containing ethylene glycol as the main component in the presence of at least an antimony compound and a phosphorus compound, via an esterification reaction or an ester exchange reaction.

In the present invention, specifically, the aromatic dicarboxylic acid or its ester-forming derivative may, for example, be terephthalic acid, phthalic acid, isophthalic acid, dibromoisophthalic acid, sodium sulfoisophthalate, phenylenedioxy dicarboxylic acid, 4,4'-diphenyldicarboxylic acid, 4,4'-diphenyl ether dicarboxylic acid, 4,4'-diphenyl ketone dicarboxylic acid, 4,4'-diphenoxy ethane dicarboxylic acid, 4,4'-diphenyl sulfone dicarboxylic acid, 2,6-naphthalene dicarboxylic acid as well as a $C_{1-4}$ alkyl ester of such an aromatic dicarboxylic acid, such as dimethyl terephthalate or dimethyl 2,6-naphthalene dicarboxylate, and a halogenated product thereof. Among them, terephthalic acid, 2,6-naphthalene dicarboxylic acid or an alkyl ester thereof, is preferred, and terephthalic acid is particularly preferred.

Further, the dicarboxylic acid component other than the above aromatic dicarboxylic acid and its ester-forming derivative, may, for example, be an alicyclic dicarboxylic acid such as hexahydroterephthalic acid or hexahydroisophthalic acid, and an aliphatic dicarboxylic acid such as succinic acid, glutaric acid, adipic acid, pimelic acid, suberic acid, azelaic acid, sebacic acid, undecadicarboxylic acid or dodecadicarboxylic acid, as well as a $C_{1-4}$ alkyl ester of such an alicyclic dicarboxylic acid or an aliphatic dicarboxylic acid, and a halogenated product thereof.

Further, the diol component other than ethylene glycol, may, for example, be an aliphatic diol such as trimethylene glycol, tetramethylene glycol, pentamethylene glycol, hexamethylene glycol, octamethylene glycol, decamethylene glycol, neopentyl glycol, 2-ethyl-2-butyl-1,3-propane diol, diethylene glycol, polyethylene glycol or polytetramethylene ether glycol, an alicyclic diol such as 1,2-cyclohexanediol, 1,4-cyclohexanediol, 1,1-cyclohexanedimethylol, 1,4-cyclohexanedimethylol or 2,5-norbornanedimethylol, and an aromatic diol such as xylene glycol, 4,4'-dihydroxybiphenyl, 2,2-bis(4'-hydroxyphenyl) propane, 2,2-bis(4'-β-hydroxyethoxyphenyl)propane, bis(4-hydroxyphenyl)sulfone or bis(4-β-hydroxyethoxyphenyl) sulfonic acid, as well as an ethylene oxide adduct or a propylene oxide adduct, of 2,2-bis(4'-hydroxyphenyl) propane.

Further, one or more of a hydroxycarboxylic acid and an alkoxycarboxylic acid, such as glycolic acid, p-hydroxybenzoic acid and p-β-hydroxyethoxy benzoic acid, a single functional component such as stearyl alcohol, benzyl alcohol, stearic acid, benzoic acid, t-butyl benzoic acid and benzoyl benzoic acid, and a polyfunctional component with at least trifunctional, such as tricarbarylic acid, trimellitic acid, trimesic acid, pyromellitic acid, gallic acid, trimethylolethane, trimethylolpropane, glycerol and pentaerythritol, may be used as copolymerizable components.

Particularly from the viewpoint of further suppressing the elution of antimony, the polyester resin of the present invention is one produced by polycondensing a dicarboxylic acid component containing the above aromatic dicarboxylic acid or its ester-forming derivative in an amount of at least 50 mol %, preferably at least 90 mol %, more preferably at least 95 mol %, particularly preferably at least 99 mol %, of the dicarboxylic acid component, and a diol component containing ethylene glycol in an amount of at least 50 mol %, preferably at least 90 mol %, further preferably at least 95 mol %, particularly preferably at least 97 mol %, of the diol component, via an esterification reaction or an ester exchange reaction. Here, the polyester resin may have diethylene glycol formed as a by-product in the reaction system, copolymerized, and the content of diethylene glycol inclusive of one added as a copolymerizable component from outside the system, is preferably not more than 5 mol %. If the content of diethylene glycol is large, the degree of suppressing the elusion of antimony as the polyester resin tends to be low, and further, the melt heat stability, heat resistance, mechanical strength, etc. as a resin tend to deteriorate.

Antimony and Phosphorus

In the present invention, the polycondensation is carried out in the presence of at least an antimony compound and a phosphorus compound, and accordingly, in the polyester resin of the present invention, at least an antimony component and a phosphorus component will be contained.

Here, specifically, the antimony compound may, for example, be antimony trioxide, antimony pentoxide, antimony acetate, methoxy antimony, triphenyl antimony or antimony glycolate. Among them, antimony trioxide is preferred.

Further, specifically, the phosphorus compound may, for example, be a pentavalent phosphorus compound such as orthophosphoric acid, polyphosphoric acid and esters thereof, such as trimethyl phosphate, triethyl phosphate, tri-n-butyl phosphate, trioctyl phosphate, triphenyl phosphate, tricresyl phosphate, tris(triethylene glycol) phosphate, ethyldiethyl phosphonoacetate, methyl acid phosphate, ethyl acid phosphate, isopropyl acid phosphate, butyl acid phosphate, monobutyl phosphate, dibutyl phosphate, dioctyl phosphate and triethylene glycol acid phosphate, or a trivalent phosphorus compound such as hypophosphorous acid, phosphorous acid and esters thereof, such as dimethyl phosphite, diethyl phosphite, trimethyl phosphite, triethyl phosphite, tributyl phosphite, trisdodecyl phosphite, trisnonyldecyl phosphite, diphenyl phosphite and triphenyl phosphite as well as a metal salt such as a lithium, sodium or potassium salt, thereof.

Among them, from the viewpoint of further suppressing elution of antimony, a pentavalent phosphorus compound such as an ester of orthophosphoric acid, such as ethyl acid phosphate, or a trivalent phosphorus compound such as hypophosphorous acid, phosphorous acid or an ester of phosphorous acid, such as diethyl phosphite, trimethyl phosphite or triethyl phosphite, is preferred, and a trivalent phosphorus compound such as phosphorous acid or an ester of phosphorous acid, is particularly preferred.

In the present invention, the amount of the above antimony compound and the above phosphorus compound used for the polycondensation and the resulting respective contents in the polyester resin are such that from the viewpoint of further suppressing elution of antimony, the content as antimony atoms (Sb) of the antimony component in the polyester resin is preferably from 10 to 250 weight ppm, more preferably from 30 to 150 weight ppm, particularly preferably from 50 to 110 weight ppm. If the content as antimony atoms is less than the above range, the polymerizability tends to be inadequate, whereby the productivity tends to deteriorate, and the color tone also tends to deteriorate, and by-products also tend to increase. On the other hand, if it exceeds the above range, it tends to be difficult to suppress the amount of elution.

Further, the content as phosphorus atoms (P) of the phosphorus component in the polyester resin is preferably relatively small at a level of from 0.1 to 20 weight ppm, more preferably from 1.0 to 15 weight ppm, particularly preferably from 2.0 to 10 weight ppm, from the viewpoint of further suppressing elution of antimony. If the content as phosphorus atoms is less than the above range, the color tone tends to deteriorate, and by-products also tend to increase. On the other hand, if it exceeds the above range, it tends to be difficult to control the amount of elution.

Further, the ratio (Sb/P) of the content (weight ppm) as antimony atoms (Sb) of the antimony component to the content (weight ppm) as phosphorus atoms (P) of the phosphorus component in the polyester resin, is preferably from 6.0 to 30, more preferably from 8 to 20, particularly preferably from 9 to 15, from the viewpoint of suppressing elution of antimony. If the ratio of the content as antimony atoms to the content as phosphorus atoms, is less than the above range, the polycondensability tends to be inadequate, whereby the productivity tends to deteriorate, the color tone also tends to deteriorate, and by-products also tend to increase. On the other hand, if it exceeds the above range, it tends to be difficult to control the amount of elution.

Other Constituting Element Components

Further, from the viewpoint of further suppressing elution of antimony, the polyester resin of the present invention is preferably one which is polycondensed in the coexistence of a compound of at least one metal element selected from the group consisting of Groups IA and IIA of the periodic table, zinc, aluminum, gallium, germanium, titanium, zirconium, hafnium, manganese, iron and cobalt. Accordingly, the polyester resin of the present invention preferably contains at least one metal element component selected from the group consisting of Groups IA and IIA of the periodic table, zinc, aluminum, gallium, germanium, titanium, zirconium, hafnium, manganese, iron and cobalt. And, in the present invention, from the viewpoint of further suppressing elution of antimony, the total amount of these metal compounds used at the time of the polycondensation and accordingly the total content thereof in the polyester resin are preferably such that the total content as metal atoms (M) of such metal element components in the polyester resin, is preferably from 0.1 to 100 weight ppm, more preferably from 1 to 30 weight ppm.

The above coexistent compound may, for example, be an oxide, hydroxide, alkoxide, carboxylate, carbonate, oxalate and halide of lithium, sodium or potassium of Group IA of the periodic table, beryllium, magnesium, calcium, strontium or barium of Group IIA of the periodic table, zinc, aluminum, gallium, germanium, titanium, zirconium, hafnium, manganese, iron and cobalt.

Among such coexistent compound, in the present invention, a metal compound of Group IA or IIA of the periodic table, particularly a magnesium compound, is preferred. Specifically, such a magnesium compound may, for example, be magnesium oxide, magnesium hydroxide, magnesium alkoxide, magnesium acetate or magnesium carbonate, and among them, magnesium acetate is preferred.

Further, the amount of the magnesium compound used for the polycondensation and the resulting content in the polyester resin are such that from the viewpoint of further suppressing elution of antimony, the content as magnesium atoms (Mg) of the magnesium component in the polyester resin, is preferably from 0.1 to 30 weight ppm, more preferably from 1.0 to 20 weight ppm, particularly preferably from 3.0 to 15 weight ppm. If the content as magnesium atoms is less than the above range, it tends to be difficult to suppress the amount of elution. On the other hand, if it exceeds the above range, the color tone tends to deteriorate, and by-products also tend to increase.

Further, in a case where the coexistent metal compound is a magnesium compound, from the viewpoint of further suppressing elution of antimony, the ratio (Mg/P) of the content (weight ppm) as magnesium atoms (Mg) of the magnesium component to the content (weight ppm) as phosphorus atoms (P) of the phosphorus component in the polyester resin, is preferably from 1.1 to 3.0, more preferably from 1.3 to 2.5 weight ppm, particularly preferably from 1.5 to 2.0. If the ratio of the content as magnesium atoms to the content as phosphorus atoms, is less than the above range, it tends to be difficult to suppress the amount of elution. On the other hand, if it exceeds the above range, the color tone tends to deteriorate, and by-products also tend to increase.

Further, from the viewpoint of further suppressing elution of antimony, among these coexistent metal compounds, a titanium compound is also preferred, and particularly a combined use with a metal compound of Group IA or IIA of the periodic table, particularly with the above magnesium compound of Group IIA of the periodic table, is preferred. Specifically, such a titanium compound may, for example, be tetra-n-propyl titanate, tetra-i-propyl titanate, tetra-n-butyl titanate, tetra-n-butyl titanate-tetramer, tetra-t-butyl titanate, tetracyclohexyl titanate, tetraphenyl titanate, tetrabenzyl titanate, titanium acetate, titanium oxalate, titanium acetyl acetonate, potassium titanium oxalate, sodium titanium oxalate, potassium titanate, sodium titanate, a titanic acid/aluminum hydroxide mixture, titanium chloride, a titanium chloride/aluminum chloride mixture, titanium bromide, titanium fluoride, potassium hexafluoro titanate, cobalt hexafluoro titanate, manganese hexafluoro titanate, ammonium hexafluoro titanate or titanium acetyl acetonate. Among them, tetra-n-propyl titanate, tetra-i-propyl titanate, tetra-n-butyl titanate, titanium oxalate or potassium titanium oxalate, is preferred.

Further, the amount of the titanium compound used at the time of the polycondensation and the resulting content in the polyester resin are such that from the viewpoint of further suppressing elution of antimony, the content as titanium atoms (Ti) of the titanium component in the polyester resin, is preferably from 0.25 to 10 weight ppm, more preferably from 0.75 to 5.0 weight ppm, particularly preferably from 1.5 to 4.0 weight ppm. If the content as titanium atoms is less than the above range, the degree of suppressing the amount of elution tends to be low. On the other hand, if it exceeds the above range, the color tone tends to deteriorate, and by-products also tend to increase.

Further, typically, other coexistent metal compounds may, for example, be a compound of metal of Group IA of the periodic table, such as lithium acetate, sodium acetate or potassium acetate, a compound of a metal of Group IIA of the periodic table, such as calcium oxide, calcium hydroxide, calcium acetate or calcium carbonate, a zinc compound such as zinc acetate, zinc benzoate, zinc methoxide, zinc acetyl acetonate or zinc chloride, a germanium compound such as germanium dioxide, germanium tetraoxide, germanium hydroxide, germanium tetraethoxide, germanium tetra butoxide or germanium oxalate, a manganese compound such as manganese oxide, manganese hydroxide, manganese methoxide, manganese acetate, manganese benzoate, manganese acetyl acetonate or manganese chloride, or a cobalt compound such as cobalt formate, cobalt acetate, cobalt stearate, cobalt naphthenate, cobalt benzoate, cobalt acetyl acetonate, cobalt carbonate, cobalt oxalate, cobalt chloride or cobalt bromide.

Physical Properties of the Polyester Resin

The polyester resin of the present invention is one whereby the amount of antimony eluted when immersed in a hot water of 95° C. for 60 minutes in the form of particles having a number average particle weight of 24 mg, is not more than 1 μg more preferably not more than 0.5 μg, further preferably not more than 0.2 μg, particularly preferably not more than 0.1 μg, per 1 g of the polyester resin, as antimony atoms (Sb).

Here, the amount of elution as antimony atoms (Sb) is one obtained by heating 50 g of the polyester resin particles having a number average of particle weight of 24 mg at 120° C. for 10 hours for crystallization, followed by immersion in 150 g of hot water of 95° C. for 60 minutes, measuring the antimony extracted in water at that time, as antimony atom concentration C (ppb) by an induction coupled plasma mass spectrometry and calculating the eluted amount D (μg) as antimony atoms per 1 g of the polyester resin, by the following formula.

$$D(\mu g)=(C/10^9)\times(150/50)\times10^6$$

Further, from the viewpoint of the taste deterioration resistance of the contained beverage when used as e.g. a bottle, the polyester resin of the present invention is preferably such that the difference ($\Delta AA=AA_s-AA_o$) between the acetaldehyde content ($AA_s$; ppm) in a molded product when injection-molded at 280° C. and the acetaldehyde content ($AA_o$; ppm) before the injection molding, is not more than 20 ppm, more preferably not more than 15 ppm.

Further, from the viewpoint of suppressing elution of antimony, the polyester resin of the present invention preferably has an intrinsic viscosity [η] (the value measured at 30° C. in a solution of a mixed solvent of phenol/tetrachloroethane (weight ratio: 1/1)) of usually from 0.35 to 0.75 dl/g in the case of a melt polycondensed resin, and, in the case of a solid phase polycondensed resin, preferably of from 0.70 to 1.0 dl/g, more preferably from 0.70 to 0.90 dl/g, particularly preferably from 0.70 to 0.80 dl/g. Further, as the color tone, color coordinate b of Hunter's color difference formula in the Lab color system as disclosed in Reference 1 of JIS Z8730, is preferably not more than 3, particularly preferably from −5 to 2. Further, the content of acetaldehyde is preferably not more than 5 ppm, particularly preferably not more than 3 ppm.

Further, in the present invention, the polyester resin may further contain an antioxidant, a ultraviolet absorber, a photostabilizer, an antistatic agent, a lubricant, a blocking preventive agent, an antifogging agent, a nucleating agent, a plasticizer, a colorant, a filler, etc.

Further, the polyester resin of the present invention is characterized in that the haze in a thickness of 5 mm of a molded product after injection molding at 270° C. is not more than 50% (the above polyester ⑤), preferably not more than 30%, more preferably not more than 20%, particularly preferably not more than 10%. If this haze exceeds the above range, the transparency as molded into a bottle at a low temperature, tends to be poor, and accordingly, the molding is obliged to be carry out at a high temperature, whereby it will be impossible to adequately suppress formation of acetaldehyde or contamination of the mold during the molding.

Further, the polyester resin of the present invention is such that the difference ($\Delta AA = AA_s - AA_o$) between the acetaldehyde content ($AA_s$; ppm) of the resin in a molded product after injection molding at 270° C. and the acetaldehyde content ($AA_o$; ppm) of the resin before the injection molding, is preferably not more than 15 ppm, more preferably not more than 13 ppm, particularly preferably not more than 10 ppm. If this value $\Delta AA$ exceeds the above range, a problem is likely to result such that the taste of the contained beverage will be impaired when used as a container for a beverage as a molded product such as a bottle.

Further, the polyester resin of the present invention is such that the difference ($ACT = CT_s - CT_o$) between the cyclic trimer content ($CT_s$; wt %) of the resin in a molded product after injection molding at 270° C. and the cyclic trimer content ($CT_o$; wt %) of the resin before the injection molding, is preferably not more than 0.05 wt %, more preferably not more than 0.03 wt %, particularly preferably not more than 0.01 wt %. If this value $\Delta CT$ exceeds the above range, contamination of the mold tends to result at the time of molding into a bottle or the like.

Production Process

The polyester resin of the present invention is produced by polycondensing a dicarboxylic acid component containing an aromatic dicarboxylic acid or its ester-forming derivative as the main component and a diol component containing ethylene glycol as the main component in the presence of at least an antimony compound and a phosphorus compound, preferably in the coexistence of the above-mentioned metal compound, particularly the magnesium compound and/or the titanium compound, via an esterification reaction or an ester exchange reaction, but basically in accordance with a common process for producing a polyester resin. Namely, it is produced by introducing into a slurry preparation tank the above dicarboxylic acid component containing an aromatic dicarboxylic acid or its ester-forming derivative as the main component and the diol component containing ethylene glycol as the main component together with an optional copolymer component, etc., followed by mixing with stirring to obtain a raw material slurry, subjecting it to an esterification reaction in an esterification reactor under atmospheric pressure or elevated pressure under heating or to an ester exchange reaction in the presence of an ester exchange catalyst, then transferring the obtained polyester low molecular weight product as the esterification reaction product or the ester exchange reaction product to a polycondensation tank, and melt polycondensing it in the presence of the above compounds under atmospheric pressure or gradually reduced pressure under heating.

As a process whereby the polyester resin of the present invention can be obtained, there may be mentioned a process wherein atoms of antimony, phosphorus, etc., are added in specific ranges at specific ratios to the polyester resin obtainable. Accordingly, the present invention also relates to such a process for producing a polyester resin.

Namely, as a preferred process for producing the polyester resin of the present invention, a process for producing a polyester resin may be mentioned which comprises polycondensing a dicarboxylic acid component containing an aromatic dicarboxylic acid or its ester-forming derivative as the main component and a diol component containing ethylene glycol as the main component, characterized in that a catalyst is added to the reaction system so that the following respective atoms derived from the catalyst will be contained in the following concentration ranges based on the obtainable polyester resin:

$0 < T \leq 50$ ppm $0 \leq Sb \leq 250$ ppm $0.1 \leq P \leq 200$ ppm $6.0 \leq Sb/P \geq 30$ (in the above formulae, T is the total concentration (ppm) of at least one type of atoms selected from the group consisting of titanium atoms, hafnium atoms and zirconium atoms in the resin, Sb is the concentration (ppm) of antimony atoms in the resin, and P is the concentration (ppm) of phosphorus atoms in the resin).

Further, preferred ranges of the dicarboxylic acid component, the diol component, T, Sb, P, etc., in such production process are the same as described above with respect to the components of the polyester resin of the present invention.

Further, in the above process for producing a polyester resin of the present invention, preferably, in addition to the above-mentioned polymerization catalyst, the following polymerization catalyst is further added to the reaction system so that the following respective atoms derived from the catalyst will be contained within the following concentration ranges based on the obtainable polyester resin:

$0.1 \leq M \leq 200$ ppm $1.1 \leq M/P \leq 15$ (M is the total content (ppm) of at least one type of metal atoms selected from the group consisting of Group IA metal atoms, Group IIA metal atoms, manganese atoms, iron atoms and cobalt atoms in the resin).

In the production process, preferred ranges of M, P, etc., are the same as described above with respect to the components for the polyester resin of the present invention.

More preferably, at a stage where the esterification ratio is less than 90%, a phosphorus compound is added to the reaction mixture containing the esterification reaction product, and after the esterification ratio has reached at least 90%, at least one metal atom compound selected from the group consisting of a Group IA element compound, a Group IIA element compound, a manganese compound, an iron compound and a cobalt compound, is added, and thereafter, at least one compound selected from the group consisting of a titanium compound, a zirconium compound, a hafnium compound, an aluminum compound, a zinc compound, a gallium compound and a germanium compound, is added.

In the foregoing, details of preferred compounds and the order of their addition, are as disclosed in Disclosure of the Invention for every preferred embodiment of the polyester resin of the present invention as described hereinafter.

Further, in the case of the ester exchange reaction, it is necessary to employ an ester exchange catalyst, and it is necessary to employ such an ester exchange catalyst in a large amount. Accordingly, in the present invention, one produced via an esterification reaction, is preferred.

Here, in the case of the esterification reaction, preparation of the raw material slurry is carried out by mixing the dicarboxylic acid component containing an aromatic dicarboxylic acid as the main component and the diol component containing ethylene glycol as the main component, and an optional copolymerizable component, etc., so that the molar ratio of the diol component to the dicarboxylic acid component will be preferably within a range of from 1.02 to 2.0, more preferably from 1.03 to 1.7. If the molar ratio is less than the above range, the esterification reactivity tends to be low. On the other hand, if it exceeds the above range, the amount of formation of diethylene glycol tends to increase.

Further, the esterification reaction is carried out usually by means of a multi stage reaction apparatus having a plurality of esterification reactors connected in series under reflux of ethylene glycol, while removing water formed by the reaction and excess ethylene glycol out of the system, until the esterification ratio (the proportion of the esterified by a reaction with the diol component among the total carboxyl groups of the raw material dicarboxylic acid component) reaches usually at least 90%, preferably at least 93%. Further, the number average molecular weight of the polyester low molecular weight product as the obtainable esterification reaction product, is preferably from 500 to 5,000.

With respect to the reaction conditions in the esterification reaction, the reaction temperature in the esterification reactor for the first stage is usually from 240 to 270° C., preferably from 245 to 265° C., the relative pressure to the atmospheric pressure is usually from 5 to 300 kPa (from 0.05 to 3 kg/cm$^2$G), preferably from 10 to 200 kPa (from 0.1 to 2 kg/cm$^2$G), the reaction temperature at the final stage is usually from 250 to 280° C., preferably from 255 to 275° C., and the relative pressure to the atmospheric pressure is usually from 0 to 150 kPa (from 0 to 1.5 kg/cm$^2$G), preferably from 0 to 130 kPa (from 0 to 1.3 kg/cm$^2$G). Further, in a case where the reaction is carried out in a single esterification reactor, the reaction conditions at the final stage will be employed.

Further, in the esterification reaction, it is possible to suppress the side reaction to form diethylene glycol from ethylene glycol, by adding a small amount of a tertiary amine such as triethylamine, tributylamine or benzyldimethylamine, a quaternary ammonium hydroxide such as tetraethylammonium hydroxide, tetrabutylammonium hydroxide or trimethylbenzylammonium hydroxide, or a basic compound such as lithium carbonate, sodium carbonate, potassium carbonate or sodium acetate.

Further, melt polycondensation is carried out usually by means of a multi stage reaction apparatus having a plurality of melt polycondensation tanks connected in series, under reduced pressure while distilling off formed ethylene glycol out of the system. The reaction apparatus may, for example, be one comprising a perfect mixing type reactor equipped with stirring vanes for the first stage and horizontal plug flow type reactors equipped with stirring vanes for the second and third stages.

With respect to the reaction conditions in the melt polycondensation, the reaction temperature in the polycondensation tank for the first stage is usually from 250 to 290° C., preferably from 260 to 280° C. and the absolute pressure is usually from 65 to 1.3 kPa (from 500 to 10 Torr), preferably from 26 to 2 kPa (from 200 to 15 Torr), and the reaction temperature at the final stage is usually from 265 to 300° C., preferably from 270 to 295° C., and the absolute pressure is usually from 1.3 to 0.013 kPa (from 10 to 0.1 Torr), preferably from 0.65 to 0.065 kPa (from 5 to 0.5 Torr). The reaction conditions for an intermediate stage are selected to be intermediate conditions thereof, and for example, in a three stage reaction apparatus, the reaction temperature in the second stage is usually from 265 to 295° C., preferably from 270 to 285° C., and the absolute pressure is usually from 6.5 to 0.13 kPa (from 50 to 1 Torr), preferably from 4 to 0.26 kPa (from 30 to 2 Torr).

Further, in the polycondensation, the addition of the above antimony compound, the above phosphorus compound and the above coexistent metal compound, etc. to the reaction system, may be at an optional stage of a step of preparing a slurry of the starting material dicarboxylic acid component and the diol component or a step of the esterification reaction, or at an initial stage in the melt polycondensation step. However, in order to further suppress elution of antimony in the obtainable polyester resin and obtain the effect for reducing by-product such as acetaldehyde effectively, in addition to sufficient polymerization activities, the above-mentioned phosphorus compound is preferably added to a slurry preparation tank or an esterification reaction tank for the first stage, particularly preferably to the slurry preparation tank. Further, the above antimony compound and the above coexistent metal compounds are preferably added to the esterification reaction product having an esterification ratio of at least 90% in the esterification reaction step, specifically, for example, to the esterification reaction tank for the final stage in the multi stage reaction apparatus or to a stage of transporting the esterification reaction product to the melt polycondensation step, and it is particularly preferred that the above antimony compound and a metal compound of Group IA or IIA of the periodic table among the above coexistent metal compounds, are added before the addition of a compound of zinc, aluminum, gallium, germanium, titanium, zirconium or hafnium among the above-mentioned coexistent metal compounds.

The resin obtained by the above melt polycondensation is usually withdrawn in the form of a strand from a discharge outlet provided at the bottom portion of the polycondensation tank and, while being cooled by water or after being cooled with water, cut by a cutter into particles such as pellets or chips. Further, such particles after the melt polycondensation, are subjected to solid phase polycondensation by heating them at a temperature of usually 190 to 230° C., preferably from 195 to 225° C. in an inert gas atmosphere such as nitrogen, carbon dioxide or argon, under a pressure of usually at most 100 kPa (1 kg/cm$^2$G), preferably at most 20 kPa (0.2 kg/cm$^2$G) as a relative pressure to the atmospheric pressure, or under a reduced pressure of usually from 6.5 to 0.013 kPa (from 50 to 0.1 Torr), preferably from 1.3 to 0.065 kPa (from 10 to 0.5 Torr), as the absolute pressure. By this solid phase polycondensation, it is possible to further increase the polymerization degree and to reduce by-products such as acetaldehyde.

At that time, prior to the solid phase polycondensation, it is preferred to heat the resin particles in an inert gas atmosphere, or in a steam atmosphere or a steam-containing inert gas atmosphere usually from 120 to 200° C., preferably from 130 to 190° C. to crystallize the surface of the resin particles.

Further, it is possible to deactivate the catalyst used for polycondensation by subjecting the resin obtained by the above melt polycondensation or solid phase polycondensation to water treatment of dipping them in warm water of at least 40° C. for at least 10 minutes, or steam treatment of contacting them with steam or a steam-containing gas of at least 60° C. for at least 30 minutes, or treatment with an organic solvent, or treatment with an aqueous acidic solution of e.g. various mineral acids, organic acids or phosphoric acid, or treatment with an organic solvent solution or an aqueous alkaline solution of e.g. an amine or a metal of Group IA or IIA.

Use of the Polyester Resin

The polyester resin of the present invention may, for example, be molded into a preform by injection molding, followed by stretch blow molding, or may be molded into a parison by extrusion, followed by blow molding, to form a bottle or the like, or may be molded into a sheet by extrusion, followed by hot forming to form a tray, a container or the like, or such a sheet may be biaxially stretched into a film or the like, or formed in a fiber shape to obtain various fiber products, in accordance with usual methods.

Preferred Embodiment as a Bottle for a Non-carbonated Beverage

The polyester resin on the present invention is preferably the above polyester ② for the purpose of obtaining a container having excellent transparency, heat resistance and strength with a productivity higher than ever while suppressing elution of antimony, particularly when molded into a hollow container for a non-carbonated beverage such as mineral water, tea or juice. Such a preferred embodiment will be described in detail.

Monomer Components Constituting the Resin

The ethylene glycol component in the polyester resin is preferably at least 96 mol %, more preferably at least 97.5 mol %, based on the total glycol component in the resin; the diethylene glycol component in the resin is preferably not more than 2.5 mol % of the total glycol component; and the terephthalic acid component is preferably at least 98.5 mol %, more preferably at least 99.0 mol %, of the total acid component. With respect to the diethylene glycol component, diethylene glycol formed by a side reaction in the reaction system may be copolymerized, and the content of the dioxyterephthalate component inclusive of one added as a copolymerizable component from outside the system, is preferably not more than 2.5 mol %, more preferably from 1.0 mol % to 2.5 mol %, further preferably from 1.8 mol % to 2.3 mol %, of the total glycol component. If the amount of the copolymerizable component exceeds the above range, it tends to be difficult to obtain a molded product having adequate heat resistance and strength efficiently, and by-products such as acetaldehyde in the resin tend to increase, the thermal stability at the time of molding tends to deteriorate, or when formed into a molded product, the acetaldehyde content in the molded product tends to increase. Further, if the amount of the copolymerizable component is less than the above range, the transparency tends to deteriorate, when formed into a molded product.

Antimony and Phosphorus

The amount of the antimony compound to be used is preferably such an amount that the content as antimony atoms (Sb) will be from 10 to 250 ppm more preferably from 30 to 180 ppm, further preferably from 60 to 120 ppm, particularly preferably from 80 to 100 ppm, based on the theoretical yield of the polyester resin. If the amount of antimony atoms is small, the polymerizability tends to be inadequate, whereby the productivity tends to be poor, the color tone also tends to deteriorate, and the amount of by-products such as acetaldehyde also tends to increase. If the amount of antimony atoms is large, the transparency tends to deteriorate when formed into a molded product, and the amount of by-products such as acetaldehyde tends to increase, or the color tone tends to deteriorate.

Further, the content of phosphorus atoms in the polyester resin is the same as mentioned above, but for a non-carbonated beverage bottle, it is more preferably not more than 14 ppm, particularly preferably from 5 to 10 ppm.

If the amount of phosphorus atoms is large, the heat resistance tends to deteriorate when formed into a molded product.

Further, the ratio of antimony atoms Sb (ppm) to the content P (ppm) of phosphorus atoms in the obtainable polyester resin, is as mentioned above. When the Sb/P range is within the above range, the balance of the polymerization speed, the color tone, the amount of by-products such as acetaldehyde, and heat resistance and transparency, etc., when formed into a molded product, are good.

Other Constituting Element Components

Further, the polycondensation is preferably carried out in the presence of any one or a plurality of metal element compounds selected from a compound of Group IA element of the periodic table except hydrogen, a compound of Group IIA element, a manganese compound, an iron compound, a cobalt compound, a titanium compound, a zirconium compound, a hafnium compound, an aluminum compound, a zinc compound, a gallium compound and a germanium compound, in addition to the antimony compound and the phosphorus compound. The resin of the present invention preferably contains metals (M) derived from them.

Compounds of these metal elements have effects for improvement of the polymerization rate or effects for improving the color tone of the obtainable polyester or reducing the amount of by-products such as acetaldehyde. However, if they are present too much, the color tone, by-products such as acetaldehyde, or heat resistance when formed into a molded product, tend to be adversely affected.

Accordingly, the content of these metal compounds in the polyester resin is preferably from 0.1 to 100 ppm, and in a case where a magnesium compound is used, the weight ratio of the content of magnesium atoms to the content of phosphorus atoms, is preferably from 1.1 to 3.0, more preferably from 1.5 to 2.0. Further, its content is preferably from 3 to 25 ppm, more preferably from 8 to 18 ppm, based on the obtainable polyester resin, as magnesium atoms.

Further, in a case where a titanium compound is used, its content is preferably from 0.25 to 10 ppm, more preferably from 0.75 to 4 ppm as a titanium element based on the obtainable polyester resin.

Physical Properties of Polyester ②

Further, the intrinsic viscosity IV is from 0.65 to 0.90 (dl/g), preferably from 0.70 to 0.80 dl/g. If the intrinsic viscosity is low, the strength or transparency tends to deteriorate when formed into a molded product such as a bottle, and if the intrinsic viscosity is high, it tends to be difficult to obtain a molded product having adequate heat resistance and strength efficiently, and the productivity of the resin and the productivity at the time of molding tend to be poor, and the amount of by-products such as acetaldehyde in the molded product tends to increase.

Further, the temperature-lowering crystallization temperature Tc2 of the resin is from 150 to 200° C., preferably from 160 to 190° C. In this case, for the temperature-lowering crystallization temperature, the resin is injection-molded to form a stepped molded plate of the shape shown in FIG. 1, having a size of 50 mm×100 mm and a thickness transversely stepped six stages from 6 mm to 3.5 mm with each step being 0.5 mm, and the forward portion (portion A in FIG. 1) of 3.5 mm in thickness of the molded plate is heated from 20° C. to 285° C. at a rate of 20° C./min in a nitrogen stream by means of a differential scanning calorimeter, maintained in a molten state at 285° C. for 5 minutes and then cooled to 20° C. at a rate of 10° C./min, whereby the temperature-lowering crystallization temperature is the crystallization peak temperature observed during the temperature drop (details will be described hereinafter).

If the temperature-lowering crystallization temperature is higher than the above range, the transparency tends to be poor when formed into a molded product, and if it is lower than the above range, the release property at the time of molding tends to be poor.

Further, the acetaldehyde content in the resin is usually not more than 10 ppm, preferably not more than 3 ppm, more preferably not more than 2 ppm, further preferably not more than 1 ppm. If the acetaldehyde content is high, when formed into a bottle for a beverage or the like, the taste of the content tends to deteriorate.

Further, the carboxylic acid terminal amount of the resin is usually from 1 to 50 equivalents/ton resin, preferably from 1 to 40 equivalents/ton resin. If the carboxylic acid terminal amount is large, the heat stability during the molding tends to deteriorate, and the amount of by-products such as acetaldehyde tends to increase when formed into a molded product. Here, the carboxylic acid terminal amount is measured by the method disclosed in Examples relating to polyester ② in the Examples given hereinafter.

Further, the color coordinate value b in the Hunter's color difference formula of the resin is preferably at most 4, more preferably at most 2. If the color coordinate value b exceeds the above range, the resin tends to be yellow-colored, which impairs the appearance of a molded product such as a bottle or the like.

Production Process

In the case of the foregoing embodiment for a hollow container for a non-carbonated beverage, the process for producing a polyester resin, whereby a container having excellent transparency, heat resistance and strength can be obtained with a productivity higher than ever, while suppressing elution of antimony, is particularly preferably the following embodiment, in addition to the above-described process for producing a polyester, whereby elution of antimony is suppressed.

Firstly, the polyester resin of this embodiment can be produced by a process which comprises preparation of a raw material slurry, an esterification method or an ester exchange method and melt polymerization, in accordance with a conventional process. However, in a case where an ester exchange reaction is carried out by using a terephthalic acid ester as the raw material, an ester exchange catalyst such as a titanium compound, a magnesium compound, a calcium compound or a manganese compound, is usually required. And, there may be a case where the amount of the ester exchange catalyst required is too much to obtain a polyester resin of the present invention. Accordingly, it is preferred to carry out esterification by using terephthalic acid as a dicarboxylic acid component.

The esterification reaction may be carried out by means of the terephthalic acid component and the ethylene glycol component only. However, it can be carried out in the presence of various additives. For example, an antimony compound as a catalyst for polycondensation, or a compound of a Group IA element except for hydrogen, a compound of a Group IIA, a phosphorus compound, etc. to be contained in the polyester resin, may be added to the esterification reaction step. Further, it is preferred to carry out the reaction by adding a small amount of a basic compound in the same manner as the above-mentioned process.

The phosphorus compound is preferably mixed to the esterification reaction product at a stage where the esterification ratio is less than 90%. For example, in a case where a multi stage reaction apparatus is employed, it is added to the slurry preparation tank or to the first stage of esterification, and it is preferably added to the slurry preparation tank. The compound of a Group IA element except for hydrogen and/or the compound of a Group IIA element, is added to the esterified product preferably at a stage where the esterification ratio is at least 90%. For example, in a case where the multi stage reaction apparatus is to be used, it will be added at the second stage of esterification.

Although the reason is not necessarily clearly understood, by this order of addition, not only the amount of by-production of diethylene glycol units will be suppressed, but also precipitation of solid foreign matters will be suppressed, the polymerizability will be good, and the thermal decomposition reactions will be suppressed, so that in the resulting resin, the carboxylic acid terminal number or the amount of by-products such as acetaldehyde can be suppressed to a low level.

The antimony compound is added preferably to a reacted product having an esterification ratio of at least 90%. Specifically, it is supplied preferably to a later stage of the esterification step at which the esterification ratio reaches to the prescribed level or to an esterification reaction product during the transportation from the esterification step to the melt polycondensation reaction step, particularly preferably to the esterification reaction product during the transportation from the esterification step to the melt polycondensation reaction step. By the addition at this position, not only the amount of by-production of diethylene glycol units will be suppressed, but also precipitation of solid foreign matters will be suppressed, the polymerizability will be good, and thermal decomposition reactions will be suppressed, whereby in the obtainable resin, the carboxylic acid terminal number or the amount of by-products such as acetaldehyde can be suppressed to a low level.

The titanium compound, the zirconium compound, the hafnium compound, the aluminum compound, the zinc compound, the gallium compound or the germanium compound is supplied preferably to the esterification step or to the esterification reaction product supplied to the melt polycondensation reaction step, and more preferably it is added to a reaction product at a later stage of the esterification reaction at which the esterification ratio is at least 90%. It is added preferably at a later step than the addition of the compound of Group IA element except for hydrogen and/or the compound of Group IIA element. Specifically, it is supplied at a later stage of the esterification step at which the esterification ratio reaches to the prescribed level or to the esterification reaction product during the transportation from the esterification step to the melt polycondensation step, preferably to the esterification reaction product during the transportation from the esterification step to the melt polycondensation step. By the addition at this position, not only the amount of by-production of diethylene glycol units will be suppressed, but also precipitation of solid foreign matters will be suppressed, the polymerizability will be good. And thermal decomposition reactions will be suppressed, whereby in the obtainable resin, the carboxylic acid terminal number or the amount of by-products such as acetaldehyde can be suppressed to a low level.

The reasons why the above-described positions for addition of the respective catalyst components are preferred, are not clearly understood. However, basically, it is considered that acid catalysts such as the antimony compound, and the titanium compound, the zirconium compound, the hafnium compound, the aluminum compound, the zinc compound, the gallium compound or the germanium compound, are added preferably immediately before the polycondensation step, as they increase the amount of by-production of diethylene glycol units, while basic catalysts such as the compound of Group IA element except for hydrogen and/or the compound of Group IIA element, are added preferably at the initial stage, as they suppress the amount of by-production of diethylene glycol units, but if they are added too early in the initial stage, they will cause precipitation of solid foreign matters, thermal decomposition reactions or other side reactions for e.g. acetaldehyde. Accordingly, it is considered preferred to add them at a stage where the esterification ratio is at least 90%. The phosphorus compound, added first as a buffer agent for the above-described various catalysts, is believed to suppress abrupt catalytic actions, whereby the reactions for the production will be easily controlled as a whole, and also with the obtainable polyester, the heat stability will be improved, and the acetaldehyde content or the like will be reduced.

Use of the Polyester Resin

The polyester resin thus obtained is useful particularly for a hollow container for a non-carbonated beverage, whereby a container having excellent transparency, heat resistance and strength can be produced at a productivity higher than ever, while suppressing elution of antimony. Specifically, it is preferably molded into a preform having a bottomed tubular shape by injection molding, and then this preform is subjected to stretch blow molding to produce a bottle for a beverage. With respect to the temperature conditions for the injection molding, the mold temperature is from 0 to 30° C., and the resin temperature is from the melting point to 350° C., preferably from the melting point +10° C. to 320° C. For the stretch blow molding, the reheating temperature of the preform is from 70 to 130° C., preferably from 80 to 125° C., and the mold temperature is from room temperature to 200° C., preferably from room temperature to 180° C. Further, in a case where heat treatment is applied to the molded product to improve the heat resistance, such heat treatment may be carried out form 70 to 200° C., preferably from 90 to 180° C. The most preferred temperature is from 120° C. to 160° C. Further, at the time of the production of a molded product, usual additives such as a nucleating agent, a lubricant, a stabilizer, an antistatic agent, an antifogging agent, a colorant, etc., may be incorporated, as the case requires.

Preferred Embodiment as a Bottle for a Carbonated Beverage

The polyester resin of the present invention is preferably polyester ③ as disclosed in Disclosure of the Invention, for the purpose of obtaining a bottle excellent in transparency, strength, taste-deterioration resistance of e.g. a contained beverage and environmental stress cracking resistance, while suppressing elution of antimony. Such an embodiment will be described in detail.

Monomer Components Constituting the Resin

The polyester resin of this embodiment is preferably a polycondensate of the dicarboxylic acid component wherein terephthalic acid or its ester-forming derivative constitutes at least 96 mol % of the total dicarboxylic acid component and the diol component wherein ethylene glycol constitutes at least 97 mol % of the total diol component, and preferably one wherein ethylene terephthalate units made of them constitute at least 96 mol % of the constituting repeating units. If the ethylene terephthalate units are less than 96 mol %, the mechanical strength or heat resistance tends to be poor as a molded product such as a bottle.

Antimony, Phosphorus and Other Constituting Element Components

The polyester resin of this embodiment preferably contains an antimony compound or/and a titanium compound in such ranges that the content (ppm) as antimony atoms (Sb) and the content (ppm) as titanium atoms (Ti) satisfy the following formulae:

$10 \leq Sb \leq 200$ $0 \leq Ti \leq 10$ $150 \leq 100Ti+Sb \leq 1,200$

If the content as antimony atoms (Sb) exceeds the above range, the transparency tends to deteriorate as a molded product such as a bottle, and if the content as titanium atoms (Ti) exceeds the above range, the color tone tends to deteriorate.

Further, if (100Ti+Sb) is less than the above range, the polycondensability tends to be inadequate. On the other hand, if it exceeds the above range, increase of the amount of acetaldehyde will be substantial, and the thermal stability tends to be low, as a molded product such as a bottle.

Further, the polyester resin of this embodiment contains a compound of a metal element of Group IA or IIA of the periodic table and a phosphorus compound, from the viewpoint of the polycondensability, reduction of by-products such as acetaldehyde and cyclic trimers, as well as the transparency, the color tone, etc. of the obtainable resin. It preferably contains the above compounds of metal elements in an amount of from 0.2 to 5 mol/ton (from 5 to 121 ppm) as the total (M) of such atoms and the phosphorus compound in an amount of from 0.1 to 6.5 mol/ton (from 3 to 200 ppm) as phosphorus atoms (P). It is more preferred that it contains the above-mentioned metal element compounds in an amount of from 0.3 to 3 mol/ton (from 8 to 72 ppm) as the total (M) of their atoms and the phosphorus compound in an amount of from 0.2 to 2 mol/ton (from 7 to 61 ppm) as phosphorus atoms (P).

As the phosphorus compound, orthophosphoric acid, tris(triethylene glycol)phosphate, ethyl diethyl phosphonoacetate, ethyl acid phosphate, triethylene glycol acid phosphate or phosphorous acid may, for example, be preferred. Particularly preferred is tris(triethylene glycol) phosphate, ethyldiethyl phosphonoacetate, ethyl acid phosphate or triethylene glycol acid phosphate.

Further, at the time of polycondensation, a metal compound other than the above-mentioned various compounds may be coexistent within a range not to impair the effects of the present invention. Accordingly, the polyester resin of the present invention may contain the metal compound. The metal compound in such a case, may, for example, be a compound such as an oxide, hydroxide, alkoxide, carbonate, phosphate, carboxylate or halide of aluminum, chromium, iron, cobalt, nickel, copper, zinc, germanium, zirconium, molybdenum, silver, tin, lanthanum, cerium, hafnium, tungsten or gold.

Physical Properties of Polyester ③

The polyester resin of this embodiment satisfies the following characteristics (A), (B) and (C):

(A) after formed into a molded product, the temperature-rising crystallization temperature ($Tc_1$) is at least 155° C., and the temperature-lowering crystallization temperature ($Tc_2$) is at most 180° C. or not observed, (B) the difference ($\Delta AA = AA_s - AA_o$) between the acetaldehyde content ($AA_s$; ppm) in a molded product after injection molding at 280° C. and the acetaldehyde content ($AA_o$; ppm) before the injection molding, is not more than 15 ppm, and (C) when an injection-molded sheet having a thickness of 1 mm is immersed in a 0.2 wt % sodium hydroxide aqueous solution at 25° C. in such a state that it is fixed along the outer circumference of a cylinder having a diameter of 32mm, the environmental stress rupture time is at least 10 minutes.

The polyester resin of this embodiment is preferably such that after formed into a molded product, the temperature-rising crystallization temperature ($Tc_1$) is at least 155° C., and the temperature-lowering crystallization temperature ($Tc_2$) is at most 180° C. or not observed, and the temperature-rising crystallization temperature ($Tc_1$) is more preferably at least 157° C., and the temperature-lowering crystallization temperature ($Tc_2$) is more preferably at most 178° C. or not observed. If the temperature-rising crystallization temperature ($Tc_1$) is less than the above range, or if the temperature-lowering crystallization temperature ($Tc_2$) exceeds the above range, the transparency tends to be poor as a molded product such as a bottle.

Here, for the temperature-rising crystallization temperature ($Tc_1$) after formed into a molded product, a preform after injection molding at 280° C. is heated from 20° C. to 285° C. at a rate of 20° C./min in a nitrogen stream by a differential scanning calorimeter ("DSC220C" manufactured by Seiko Denshi K. K.) and the temperature-rising crystallization temperature is one obtained by measuring the crystallization heat generation peak temperature as observed during the temperature rise, and for the temperature-lowering crystallization temperature ($Tc_2$), the preform is heated from 20° C. to 285° C. at a rate of 20° C./min, maintained in a molten state at 285° C. for 5 minutes and then cooled to 20° C. at a rate of 10° C./min, and the temperature-lowering crystallization temperature is one obtained by measuring the crystallization heat generation peak temperature as observed during the temperature drop.

The polyester resin of this embodiment is preferably such that the difference ($\Delta AA = AA_s - AA_o$) between the acetaldehyde content ($AA_s$; ppm) in a molded product after injection molding at 280° C. and the acetaldehyde content ($AA_o$; ppm) before the injection molding, is not more than 15 ppm. The difference ($AA_s - AA_o$) is more preferably not more than 13 ppm. If $\Delta AA$ exceeds the above range, the taste deterioration resistance of the contained beverage or the like tends to deteriorate as a molded product such as a bottle.

The polyester resin of this embodiment is preferably such that when an injection-molded sheet having a thickness of 1 mm is immersed in a 0.2 wt % sodium hydroxide aqueous solution at 25° C. in such a state that it is fixed along the outer circumference of a cylinder having a diameter of 32 mm, the environmental stress rupture time is at least 10 minutes. Such environmental stress rupture time is more preferably at least 12 minutes.

Here, for the environmental stress rupture time, an injection-molded sheet having a length of 50 mm, a width of 6 mm and a thickness of 1 mm is immersed in a 0.2 wt % sodium hydroxide aqueous solution at 25° C. in such a state that it is fixed along the outer circumference of a cylinder having a diameter of 32 mm with both ends in the length direction of the molded sheet extending over a half circumference of the outer circumference of the cylinder, whereby the time until the rupture takes place, is measured as the environmental stress rupture time.

Further, the polyester resin of this embodiment preferably satisfies also the following characteristics (D), (E) and (F):

(D) the proportion of diethylene glycol in the diol component in the resin is not more than 2.0 mol %, (E) the carboxylic acid terminal amount (AV) is from 20 to 50 equivalents/ton resin, and (F) the intrinsic viscosity [η] is from 0.75 to 1.0 dl/g.

The polyester resin of this embodiment is such that the proportion of diethylene glycol in the diol component in the resin is preferably not more than 2.0 mol %, more preferably not more than 1.8 mol %, particularly preferably not more than 1.6 mol %. If the proportion of diethylene glycol in the diol component exceeds the above range, the environmental stress cracking resistance tends to be poor as a molded product such as a bottle. Further, the carboxylic acid terminal amount is measured by the method disclosed in Examples relating to polyester ③ in the Examples given hereinafter.

Further, the polyester resin of this embodiment is such that the carboxylic acid terminal amount is preferably from 20 to 50 equivalents/ton resin. If the carboxylic acid terminal amount is less than the above range, the environmental stress cracking resistance tends to be poor as a molded product such as a bottle. On the other hand, if it exceeds the above range, the thermal stability, etc., tend to be poor.

Further, the polyester resin of this embodiment is such that the intrinsic viscosity [η] is preferably from 0.75 to 1.0 dl/g, more preferably from 0.80 to 0.90 dl/g. If the intrinsic viscosity is less than the above range, the mechanical strength such as environmental stress cracking resistance tends to be inadequate as a molded product such as a bottle, and in molding such as stretch blow molding, uniform stretching tends to be difficult. On the other hand, if it exceeds the above range, the moldability tends to be low, and a problem such that in molding such as stretch blow molding, a molded product tends to break by the blow pressure.

Further, the polyester resin of this embodiment preferably satisfies also the following characteristic (G):

(G) The absorbance at a wavelength of 1,000 nm in the form of an injection-molded plate having a thickness of 4 mm, is from 0.06 to 0.20.

The polyester resin of this embodiment is such that the absorbance at a wavelength of 1,000 nm in the form of an injection-molded plate having a thickness of 4 mm, is preferably from 0.04 to 0.20, more preferably from 0.06 to 0.15. If the absorbance is less than the above range, it takes time for heat treatment during molding of a bottle, whereby the productivity tends to be low, or the shape of the mouth stopper portion, etc. tends to deteriorate due to heat treatment. On the other hand, if it exceeds the above range, the transparency tends to be poor as a molded product such as a bottle.

Production Process

As described above, the polyester resin whereby, particularly when formed into a bottle for a carbonated beverage, it is possible to obtain a bottle excellent in transparency, strength, taste-deterioration resistance of contained beverage, etc., and environmental stress cracking resistance, while suppressing elution of antimony, can be obtained by the above-mentioned process for producing a polyester to suppress elution of antimony, preferably by adjusting the amount of the copolymerizable component, the amount of contained atoms, the carboxylic acid terminal number, the intrinsic viscosity, etc., to be within the above-mentioned ranges in accordance with conventional methods by controlling the feed materials, the charged catalyst composition, the operation conditions, etc. at the time of the production.

Application Example of Polyester ③

The polyester resin of this embodiment thus obtained is useful particularly for a bottle for a carbonated beverage, whereby it is possible to obtain a bottle excellent in transparency, strength, taste-deterioration resistance of the contained beverage, while suppressing elution of antimony.

Specifically, it will be melt plasticized by a usual method to obtain a molding material. And, it is suitably used for molding an injection blow bottle to mold a bottle by stretch blow molding by biaxially stretching in a blow molding mold, after forming a preform by injection molding. The injection molding conditions at that time may be within ranges which are commonly employed. For example, the cylinder temperature is from 260° C. 300° C., the screw rotational speed is from 40 to 300 rpm, the injection pressure is from $4 \times 10^6$ to $14 \times 10^6$ Pa, and the mold temperature is from about 5 to 40° C., and with respect to the stretch blow molding conditions, the stretch temperature is from 70 to 120° C., the stretching ratio is from 1.5 to 3.5 times in the longitudinal direction and from 2 to 5 times in the circumferential direction. Further, heat set is carried out for a few second to a few minutes at a temperature of from 100 to 200° C.

The polyester resin of this embodiment is suitable for molding of an injection blow bottle wherein a preform obtained by injection molding is reheated and then molded into a bottle by blow molding, and it is particularly suitable for a bottle for a carbonated beverage. Preferred embodiment for hot filling The polyester resin of the present invention is preferably the above-mentioned polyester ④ for the purpose of obtaining a bottle which is free from deterioration of the transparency of the body portion, which is excellent in the productivity of a hollow container as the crystallization rate of the mouth stopper portion is high and which is excellent in the dimensional stability of the mouth stopper portion and which has little deformation at the mouth stopper portion, while suppressing elution of antimony, in a case where it is formed into a hollow container to be used particularly by heat sterilization filling for both non-carbonated and carbonated beverages. Such an embodiment will be described in detail.

Monomer Components Constituting the Resin

The polyester resin of this embodiment is one containing an ethylene terephthalate unit as the main constituting repeating unit and is preferably a polycondensate of a dicarboxylic acid component wherein terephthalic acid or its ester-forming derivative such as an alkyl ester having from about 1 to 4 carbon atoms, constitutes at least 98 mol % of the total dicarboxylic acid component, with a diol component wherein ethylene glycol constitutes at least 95 mol % of the total diol component. It is more preferably the one wherein this ethylene terephthalate unit constitutes at least 93 mol % of the constituting repeating units. If the ethylene terephthalate unit is less than 93 mol %, the mechanical strength or the heat resistance tends to be poor as a molded product.

Antimony and Phosphorus

In the polyester resin of this embodiment, the content of the antimony compound is from 0.08 to 2 mol (from 10 to 243 ppm), preferably from 0.2 to 1.7 mol (from 25 to 206 ppm), as antimony atoms (Sb), per 1 ton of the polyester resin. If the content as antimony atoms (Sb) in the antimony compound is less than the above range, the polycondensability tends to deteriorate, and the content of cyclic trimers, etc. as by-products, tends to be large. On the other hand, if it exceeds the above range, elution of the antimony compound tends to increase, when used as a bottle or the like.

The content of the phosphorus compound in the polyester resin is preferably from 0.1 to 7 mol (from 4 to 216 ppm), more preferably from 0.3 to 4 mol (from 10 to 123 ppm) as phosphorus atoms (P), per 1 ton of the polyester resin.

As the phosphorus compound, the same one as described in the preferred embodiment for a bottle for a carbonated beverage, is preferred.

Other Components

Further, the polycondensation of the polyester resin of this embodiment is preferably one carried out in the coexistence of a titanium compound, and accordingly, the polyester resin contains such a titanium compound. The amount of the titanium compound used for the polycondensation and the resulting content in the polyester resin, are preferably not more than 0.2 mol (9 ppm), more preferably from 0.001 to 0.1 mol (from 0.05 to 5 ppm), as titanium atoms (Ti) per 1 ton of the polyester resin. If the content of the titanium compound is less than the above range, the degree of improvement in the transparency as the polyester resin tends to be low. On the other hand, if it exceeds the above range, the color tone tends to deteriorate.

Further, the polycondensation of the polyester resin is preferably one carried out in the coexistence of a compound of an element of Group IA or IIA of the periodic table, from the viewpoint of the polycondensability, and reduction of by-products such as cyclic trimers and acetaldehyde, as well as the transparency, the color tone, etc. of the obtainable resin. Accordingly, the polyester resin contains the compound of such an element. The amount of the compound of such an element to be used for polycondensation, and the resulting content in the polyester resin, are preferably from 0.4 to 8 mol (from 9 to 194 ppm), more preferably from 0.6 to 4 mol (from 14 to 97 ppm), as the total of atoms of the compound of such an element, per 1 ton of the polyester resin.

Physical Properties and Process for Producing Polyester ④

The polyester resin of this embodiment is such that the intrinsic viscosity [η] is preferably from 0.6 to 1.0 dl/g, more preferably from 0.7 to 1.0 dl/g. If the intrinsic viscosity is less than the above range, the mechanical strength as the polyester resin tends to be inadequate, and uniform stretching tends to be difficult in molding such as stretch blow molding. On the other hand, if it exceeds the above range, the moldability tends to deteriorate, and there will be a problem that in molding such as stretch blow molding, the molded product is likely to break by the blow pressure.

And, the polyester resin of this embodiment preferably contains a polyolefin resin or a polyamide resin, and the polyolefin resin or the polyamide resin is preferably contained in an amount of from 0.0001 to 1,000 ppm, more preferably from 0.001 to 100 ppm. Here, if the content of the latter polyolefin resin or the polyamide resin is less than the above range, the crystallization rate at the mouth stopper portion tends to be low when formed into a hollow container, and consequently, the productivity of the bottle deteriorates. On the other hand, if it exceeds the above range, the transparency tends to be poor.

Here, the polyolefin resin may, for example, be a homopolymer of an a-olefin having from about 2 to 8 carbon atoms, such as ethylene, propylene or butene-1, or a copolymer of such an a-olefin with another a-olefin having from about 2 to 20 carbon atoms, such as ethylene, propylene, 1-butene, 3-methyl-1-butene, 1-pentene, 4-methyl-1-pentene, 1-hexene, 1-octene or 1-decene or with a vinyl compound such as vinyl acetate, acrylic acid, methacrylic acid, an acrylate, a methacrylate, vinyl chloride or styrene. Specifically, for example, an ethylene homopolymer such as a low, intermediate or high density polyethylene (branched or linear), an ethylene type resin such as an ethylene/propylene copolymer, an ethylene/1-butene copolymer, an ethylene/4-methyl-1-pentene copolymer, an ethylene/1-hexene copolymer, an ethylene/1-octene copolymer, an ethylene/vinyl acetate copolymer, an ethylene/acrylic acid copolymer, an ethylene/methacrylic acid copolymer or an ethylene/ethyl-acrylate copolymer, a propylene homopolymer, a propylene type resin such as a propylene/ethylene copolymer or propylene/ethylene/1-butene copolymer, and a 1-butene homopolymer, a 1-butene type resin such as a 1-butene/ethylene copolymer or a 1-butene/propylene copolymer, may be mentioned.

Further, the polyamide resin may, for example, be a polymer of a lactam such as butyrolactam, δ-valerolactam, E-caprolactam, enantholactam or ω-lauryllactam, a polymer of an amino acid such as 6-amino caproic acid, 7-amino heptanoic acid, 8-amino octanoic acid, 9-amino nonanoic acid, 11-amino undecanoic acid or 12-amino dodecanoic acid, a polycondensate of a diamine, such as an aliphatic diamine such as 1,4-butane diamine, 1,5-pentane diamine, 1,5-hexane diamine, 1,6-hexane diamine, 1,9-nonane diamine, 1,11-undeca diamine, 1,12-dodecane diamine or α, ω-diaminopolypropylene glycol, an alicyclic diamine such as 1,3- or 1,4-bis(aminomethyl)cyclohexane or bis(p-aminocyclohexylmethane), or an aromatic diamine such as m- or p-xylylene diamine, with a dicarboxylic acid, such as an aliphatic dicarboxylic acid such as glutaric acid, adipic acid, suberic acid, sebacic acid or dodecanoic diacid, an alicyclic dicarboxylic acid such as cyclohexane dicarboxylic acid, or an aromatic dicarboxylic acid such as terephthalic acid or isophthalic acid, or a copolymer thereof. Specifically, for example, nylon 4, nylon 6, nylon 7, nylon 8, nylon 9, nylon 11, nylon 12, nylon 66, nylon 69, nylon 610, nylon 611, nylon 612, nylon 6T, nylon 61, nylon MXD6, nylon 6/66, nylon 6/610, nylon 6/12, nylon 6/6T or nylon 6I/6T may be mentioned.

Further, in this embodiment, the above polyolefin resin or the polyamide resin may be incorporated to the polyester resin by a common method such as a method of directly adding and melt mixing or a method of adding and melt mixing as a master batch the above polyolefin resin or the polyamide resin to the above polyester resin so that its content becomes within the above-mentioned range. Otherwise, a method may be employed wherein the above polyolefin resin or the polyamide resin is directly added as a powder at a production stage of the above polyester resin, for example, at any stage of e.g. during the melt polycondensation (the starting materials, slurry, catalyst, etc.), immediately after the melt polycondensation, immediately after the preliminary crystallization, during the solid phase polycondensation or immediately after the solid phase polycondensation, or a liquid such as water having the powder dispersed therein is contacted with the polyester resin chips, a gas such as air having the powder included is contacted with the polyester resin chips, or the polyester resin chips are contacted to a component made of the polyolefin resin or the polyamide resin under a flowing condition, followed by melt kneading.

Among these methods, as a method of adding the polyolefin resin or the polyamide resin in the form of a powder, a method is preferred in which a powder of the polyolefin resin or the polyamide resin is incorporated to air for pneumatic transportation at the time of pneumatic transportation to a preliminary crystallization machine or at the time of pneumatic transportation to a solid polycondensation tank, of chips of the polyester resin after the melt polycondensation, or at the time of pneumatic transportation to a storage tank or at the time of pneumatic transportation to a molding machine, of chips after the solid phase polycondensation.

Further, as a method of contacting the polyester resin chips to a component made of the polyolefin resin or the polyamide resin under a flowing condition, it is preferred that in a space wherein the component made of the polyolefin resin or the polyamide resin is present, the polyester resin chips are brought in collision and contacted with the component. Specifically, a method may, for example, be mentioned in which a part of a pneumatic transportation pipe, a gravity transportation pipe, a silo, a punching plate or a vibration sieve, a magnet portion of a magnet catcher, etc. in the production step such as immediately after the melt polycondensation of the polyester resin, immediately after the preliminary crystallization or immediately after the solid polycondensation, or at the time of charging or discharging the transport container in e.g. the transportation stage as a product of polyester resin chips, or at the time of introducing into the molding machine at the molding stage of the polyester resin chips, is made of the polyolefin resin or the polyamide resin, or the polyolefin resin or the polyamide resin is lined, or in the above-mentioned transport channel, the component made of the polyolefin resin or the polyamide resin is installed in the form of a rod or net, whereby the polyester resin chips are transported. The contact time of the polyester resin chips with the above component is usually a very short time at a level of from 0.01 to 1 second, whereby a very small amount of the polyolefin resin or the polyamide resin can be included in the polyester resin.

And, the polyester resin of this embodiment is such that the temperature-rising crystallization temperature ($Tc_1$) after formed into a molded product is preferably from 155 to 165° C., and the temperature-lowering crystallization temperature ($Tc_2$) is preferably at most 180° C. or not observed. The temperature-rising crystallization temperature ($Tc_1$) is more preferably from 157 to 164° C., and the temperature-lowering crystallization temperature ($Tc_2$) is more preferably at most 178° C. or not observed. Here, if the temperature-rising crystallization temperature ($Tc_1$) is less than the above range, the transparency tends to be poor as the polyester resin composition. On the other hand, if it exceeds the above range, it takes time for heat treatment at the time of molding a bottle, whereby the productivity tends to be low, or the shape of e.g. the mouth stopper portion tends to deteriorate due to the heat treatment. Further, if the temperature-lowering crystallization temperature (Tc2) exceeds the above range, the transparency tends to be poor as a polyester resin.

Here, for the temperature-rising crystallization temperature ($Tc_1$) after formed into a molded product, a preform after injection molding at 280° C., was heated from 20° C. to 285° C. at a rate of 20° C./min in a nitrogen stream by a differential scanning calorimeter ("DSC220C", manufactured by Seiko Denshi K. K.), and the crystallization heat generation peak temperature observed in the temperature rise, was measured as the temperature-rising crystallization temperature, and for the temperature-lowering crystallization temperature ($Tc_2$), the preform was heated from 20° C. to 285° C. at a rate of 20° C./min, maintained in a molten state at 285° C. for 5 minutes and then cooled to 20° C. at a rate of 10° C./min, and the crystallization heat generation peak temperature observed during the temperature drop was measured as the temperature-lowering crystallization temperature.

Further, the polyester resin of this embodiment is such that the cyclic trimer content ($CT_o$) is preferably not more than 0.45 wt % from the viewpoint of the mold contamination resistance during the molding. Further, from the viewpoint of e.g. the taste-deterioration resistance of the contained beverage when used as a bottle or the like, the acetaldehyde content ($AA_o$) is preferably not more than 10 ppm, and from the viewpoint of e.g. the color tone as a bottle or the like, the color coordinate b of the Hunter's color difference formula in the Lab color system disclosed in Reference 1 of JIS Z8730 is preferably not more than 4. The cyclic trimer content ($CT_o$) is more preferably not more than 0.40 wt %, the acetaldehyde content ($AA_o$) is more preferably not more than 5 ppm, and the color coordinate b of Hunter's color difference formula is more preferably not more than 3.

Further, from the viewpoint of e.g. the mold contamination resistance during the molding, the polyester resin of this embodiment is such that the difference ($CT_s-CT_o$) between the cyclic trimer content ($CT_s$; wt %) in a molded product after injection molding at 280° C. and the cyclic trimer content ($CT_o$; wt %) before the injection molding, is preferably not more than 0.15 wt %, more preferably not more than 0.10 wt %. Further, from the viewpoint of e.g. the taste-deterioration resistance of the contained beverage when used as a bottle or the like, the difference ($AA_s-AA_o$) between the acetaldehyde content ($AA_s$; ppm) in a molded product after injection molding at 280° C. and the acetaldehyde content ($AA_o$; ppm) before the injection molding, is preferably not more than 20 ppm, more preferably not more than 15 ppm.

Use of Polyester Resin ④

The polyester resin thus obtained is useful as a hollow container to be used for hot filling for both non-carbonated and carbonated beverages, whereby it is possible to obtain a bottle which is free from deterioration of the transparency of the body portion, which is excellent in the productivity of a hollow container as the crystallization rate at the mouth stopper portion is high, and which is excellent in the dimensional stability of the mouth stopper portion and has little deformation of the mouth stopper portion during hot filling, while suppressing elution of antimony.

Specifically, it is useful, for example, for molding of an injection blow molded product, wherein a preform is formed by injection molding and then biaxially stretched in a blow molding mold for stretch blow molding to form a bottle or the like, and it is particularly suitable for molding a hollow container to be used by heat sterilization filling, by heat treating the preform or the mouth stopper portion of a bottle by e.g. an infrared ray heater. The injection molding conditions at that time are within the ranges which are commonly employed. For example, the cylinder temperature is from 260° C. to 300° C., the screw rotational speed is from 40 to 300 rpm, the injection pressure is from $4\times10^6$ to $14\times10^6$ Pa, and the molding temperature is from about 5 to 40° C. Further, as the stretch blow molding conditions, the stretching temperature is from 70 to 120° C., the stretching ratio is from 1.5 to 3.5 times in a longitudinal direction and from about 2 to 5 times in the circumferential direction, and further, heat fixing is carried out for a few second to a few minutes at a temperature of from 100 to 200° C.

Further, among the molded products by the above-mentioned molding methods, it is suitable particularly for an injection blow bottle which is molded into a bottle by a blow molding method such as a cold parison method wherein a preform obtained by an injection molding method is reheated and then biaxially stretched, and for example, it is suitable for a hollow container used by heat sterilization filling of a beverage or the like such as a fruit juice beverage, tea or mineral water.

Further, an injection blow bottle having a specific surface area of from 0.6 to 0.8 $cm^{-1}$ obtainable from the polyester resin of this embodiment will have an excellent antimony compound elution resistance whereby the amount of elution of an antimony compound when filled with hot water of 93° C. is not more than 1.0 ppb as the concentration of antimony atoms (Sb) in water. Here, the specific surface area of the bottle is a value obtained by dividing the inner surface area of the bottle by the volume of the bottle.

Preferred Embodiment as for Fibers and Films

The polyester resin of the present invention is preferably the above-mentioned polyester ⑥ for the purpose of forming fibers or films by minimizing the number of particles in the interior of the resin while suppressing elution of the antimony, so that there will be no substantial thread breakage or film rupture caused by the particles, and when formed into a molded product such as a film, there will be no substantial projections such as fish eyes formed on the surface. Such an embodiment will be described in detail.

Constituting Monomer Components

A preferred amount of terephthalic acid or its ester-forming derivative, is at least 95 mol %, more preferably at least 98.5 mol %, further preferably 100 mol %, of the dicarboxylic acid component, and the preferred amount of ethylene glycol is at least 95 mol %, preferably at least 97 mol %, further preferably at least 98 mol %, of the diol component.

As the diol component, diethylene glycol (usually considered to be formed as a by-product from ethylene glycol) formed as a by-product in the reaction system, may be copolymerized, and the content of the diethylene glycol component inclusive of one added as a copolymerizable component from outside of the system, is preferably not more than 3 mol %, more preferably from 0.5 mol % to 2.5 mol %, further preferably from 1.0 mol % to 2.0 mol %.

If the amount of the copolymerizable component is larger than the above range, it tends to be difficult to obtain sufficient heat resistance and strength when formed into a molded product, and if the amount of the copolymerizable component is smaller than the above range, the transparency tends to be poor when formed into a molded product.

Physical Properties of the Resin

The polyester resin of this embodiment is such that the number of particles of at least 1 μm in the interior of the resin is not more than 20 particles/0.01 mm³. Such a number of particles in the interior of the resin is one obtained by counting the number of particles having a size of at least 1 μm in a polyester film obtained by melt-molding a polyester resin, also in the film thickness direction by an image treating apparatus by enlarging by means of an interference microscope and converted to the number of particles per 0.01 mm³, and the details are described in Examples.

The number of particles of at least 1 μm in the interior of the resin is preferably not more than 10 particles/0.01 mm³, more preferably not more than 5 particles/0.01 mm³, further preferably not more than 3 particles/0.01 mm³, particularly preferably not more than 2 particles/0.01 mm³, most preferably not more than 1 particle/0.01 mm³. If the number of particles is more than the above range, film rupture or thread breakage is likely to take place due to the stress concentration on the foreign matters, when films or fibers are molded at a high speed, or when formed into a film or a bottle, projections so-called fish eyes are likely to form on the surface, whereby the appearance tends to be impaired.

Antimony and Phosphorus

The phosphorus compound to be used, is preferably a pentavalent phosphoric acid ester such as ethyl acid phosphate, from the viewpoint of suppressing the number of particles in the resin and from the viewpoint of improving the polymerization rate.

Further, the content of phosphorus atoms based on the obtainable polyester resin is preferably from 0.1 to 20 ppm, more preferably from 2 to 15 ppm, further preferably from 4 to 10 ppm, from the viewpoint of suppressing the number of particles in the resin, the polymerization rate, the heat stability and the volume resistivity of the resin. Namely, if P is less, foreign matters will be less, the volume resistivity of the resin increases, and the polymerization rate is high, but the color tone tends to deteriorate, and the acid terminal number of the resin increases, whereby the melt heat stability tends to deteriorate. If P is large, the tendency tends to be opposite, and in the above-mentioned range, the foregoing various characteristics are most well balanced.

The preferred content of phosphorus atoms as mentioned above, is relatively small as compared with the prior art. According to the prior art, if the content of phosphorus atoms is reduced, the color tone or the melt heat stability deteriorates to a large extent. Whereas, according to the present invention, by adjusting the contents of various compounds derived from the catalysts and the order of addition preferably to specific ranges, as described hereinafter, various characteristics such as the color tone, the melt heat stability, the volume resistivity and the polymerizability, can be maintained at good levels, while maintaining the number of particles in the resin at a level substantially small as compared with the prior art.

Further, the total content S of at least one type of atoms selected from the group consisting of antimony atoms, aluminum atoms, zinc atoms and gallium atoms, satisfies $10 \leq S \leq 200$ (weight ppm based on the polyester resin). The content (Sb) of antimony atoms is preferably $Sb \leq 200$, more preferably $30 \leq Sb \leq 150$, further preferably $60 \leq Sb \leq 100$ (each weight ppm based on the polyester resin).

If the content of antimony atoms is small, the number of particles in the resin decreases, but the polymerization rate, the color tone, the acid terminal number and the melt heat stability tend to deteriorate. If the content of antimony atoms is large, the number of particles in the resin increases, but the polymerization rate, the color tone, the acid terminal number and the melt heat stability tend to be better. In the above range, the above-mentioned various characteristics are most well balanced.

The content P of phosphorus atoms (weight ppm based on the polyester resin) and the content Sb of antimony atoms (weight ppm based on the polyester resin) preferably satisfy $6.0 \leq Sb/P \leq 30$, more preferably $9 \leq Sb/P \leq 22.5$. The larger Sb/P, the smaller the foreign matters, but if it is small, the polymerization rate tends to be inadequate, and the color tone, the acid terminal number and the melt heat stability tend to deteriorate. Within the above-mentioned ranges of the content P of phosphorus atoms and the content Sb of antimony atoms, when Sb/P is within the above range, the foregoing various physical properties and characteristics are most well balanced.

Other Constituting Components

The polyester resin of this embodiment is such that the content T of each or a total of the plurality of titanium atoms, zirconium atoms and hafnium atoms, is $0.1 \leq T \leq 10$ (weight ppm based on the polyester resin).

The titanium atoms, the zirconium atoms and the hafnium atoms are derived from a titanium compound, a zirconium compound and a hafnium compound to be added as a catalyst at the time of the production of the polyester resin. If T is large, the polymerization rate will be improved, but the color tone tends to deteriorate. If T is small, the color tone will be good, but the polymerization rate tends to deteriorate. In the above range, various physical properties and characteristics will be balanced.

When titanium atoms are contained, the content Ti is preferably $0.5 \leq Ti \leq 6$ (weight ppm based on the polyester resin), more preferably $1 \leq Ti \leq 3$ (weight ppm based on the polyester resin).

The polyester resin of this embodiment is such that the content M of each or the total of the plurality of Group IA metal atoms, Group IIA metal atoms, manganese atoms, iron atoms and cobalt atoms, preferably satisfies $0.1 \leq M \leq 100$ (weight ppm based on the polyester resin).

These atoms are derived from compounds to be added as catalysts at the time of the production of the polyester resin. If M is large, the polymerization rate will be improved, the color tone will be good, and the volume resistivity will also increase (will be good), but the acid terminal number and the melt heat stability tend to deteriorate. If M is small, the acid terminal number and the melt heat stability will be good, but the polymerization rate, the color tone and the volume resistivity tend to deteriorate. In the above range, various physical properties and various characteristics will be balanced.

The polyester resin of this embodiment is such that when it contains magnesium atoms, their content Mg is preferably $10 \leq Mg \leq 70$ (weight ppm based on the polyester resin), more preferably $20 \leq Mg \leq 40$ (weight ppm based on the polyester resin).

Further, in such a case, the magnesium content Mg and the content P of phosphorus atoms preferably satisfy $1.5 \leq Mg/P \leq 15$ (weight ppm based on the polyester resin). If Mg/P is large, the polymerization rate will be improved, the color tone will be good, and the volume resistivity will increase (will be good), but the acid terminal number, and the melt heat stability tend to deteriorate. If Mg/P is small, the acid terminal number and the melt heat stability will be good, but the polymerization rate, the color tone and the volume resistivity tend to deteriorate. Within the above-mentioned ranges of the phosphorus atom content P and the magnesium atom content Mg, when Mg/P is within the above range, the foregoing various physical properties and various characteristics will be most balanced.

Production Process

As the foregoing process for producing a polyester resin which is substantially free from thread breakage or film rupture caused by particles at the time of molding fibers or films and which is substantially free from projections such as fish eyes which are likely to form on the surface when formed into a molded product such as a film or a bottle, while suppressing elution of antimony, particularly while minimizing the number of particles in the interior of the resin, the following embodiment is particularly preferred in addition to the above description of the process for producing a polyester to suppress elution of antimony.

As between an esterification method and an ester exchange method, the esterification method is preferred. The reason is that if the ester exchange method is adopted, an ester exchange catalyst such as a titanium compound, a magnesium compound, a calcium compound or a manganese compound, is usually required in a relatively large amount, and the number of particles in the resin tends to increase, attributable to such a compound.

The esterification reaction may be carried out solely by the terephthalic acid component and the ethylene glycol component, but it can also be carried out in the presence of various additives. For example, the above-mentioned phosphorus compound, and the antimony compound, the titanium compound, the zirconium compound, the hafnium compound, the Group IA metal compound, the Group IIA metal compound, the manganese compound, the iron compound, the cobalt compound, etc. may be added to the esterification reaction step. Further, if a small amount of a tertiary amine such as triethylamine, tri-n-butylamine or benzyldimethylamine, a quaternary ammonium hydroxide such as tetraethylammonium hydroxide, tetra n-butylammonium hydroxide or trimethylbenzylammonium hydroxide, or a basic compound such as lithium carbonate, sodium carbonate, potassium carbonate or sodium acetate, is added, by-production of diethylene glycol from ethylene glycol will be suppressed, whereby the ratio of the diethylene glycol component contained in the polyester chain can be made small.

The polyester resin of this embodiment is preferably produced by adding the above-mentioned various compounds in the amounts within the above-mentioned ranges in the specific order of addition in the above-mentioned esterification reaction or ester exchange reaction, and the subsequent melt polycondensation step.

The phosphorus compound is added preferably at a stage where the esterification ratio is less than 90%. For example, in a case where a multistage reaction apparatus is employed, it is added to the slurry preparation tank or the first stage of esterification. Preferably it is added to the slurry preparation tank.

The Group IA metal compound, the Group IIA metal compound, the manganese compound, the iron compound or the cobalt compound is added preferably at a stage where the esterification ratio is at least 90%. For example in a case where a multistage reaction apparatus is employed, it is preferably added at the second stage of esterification.

The aluminum compound, the zinc compound, the gallium compound, the germanium compound or the antimony compound is added preferably to the reaction product having an esterification ratio of at least 90%. Specifically, it is supplied at a later stage of the esterification step at which the esterification ratio reaches that level or to the esterification reaction product during the transportation from the esterification step to the melt polycondensation reaction step. Preferably it is supplied to the esterification reaction product during the transportation from the esterification step to the melt polycondensation reaction step.

The titanium compound, the zirconium compound or the hafnium compound is supplied preferably to the esterification step or to the esterification reaction product to be supplied to the melt polycondensation reaction step, and more preferably, it is added to the reaction product at the later stage of the esterification reaction at which the esterification ratio is at least 90%, and it is added preferably at a step later than the addition of the Group IA metal compound or the Group IIA metal compound. Specifically, it is supplied to a later stage of the esterification step at which the esterification ratio reaches the prescribed level or to the esterification reaction product during the transportation from the esterification step to the melt polycondensation reaction step. Preferably it is supplied to the esterification reaction product during the transportation from the esterification step to the melt polycondensation reaction step.

The reason why the above-described position for addition is preferred, is not necessarily clearly understood. However, by this order of addition, not only the number of particles in the resin will be suppressed, but also the carboxylic acid terminal number may be suppressed at a low level, and the polymerization rate may be improved.

Further, from the viewpoint of the production cost, etc., it is preferred to complete the production by the melt polycondensation, and the polyester resin obtained by the melt polycondensation is substantially amorphous, whereby melting when heated is quick, and the productivity by molding is excellent. The polyester resin of this embodiment is also preferably the one obtained by the process up to the melt polycondensation.

The intrinsic viscosity (IV) of the polyester resin of this embodiment obtained as described above, is preferably from 0.55 to 0.70 dl/g, more preferably from 0.58 to 0.68 dl/g. If the intrinsic viscosity is low, the strength or the transparency tends to be poor when formed into a molded product such as a film. If the intrinsic viscosity is high, not only the productivity of the resin but also the productivity during the molding and the amount of by-products such as acetaldehyde in the molded product tend to deteriorate.

Further, the polyester resin of the present invention is such that the carboxylic acid terminal number (AV) is preferably not more than 50 equivalents/ton. If the carboxylic acid terminal number is large, the melt heat stability tends to be poor, and thermal decomposition or coloring of the resin during the molding tends to be remarkable.

Further, the polyester resin of this embedment is characterized in that the volume resistivity is preferably from $1 \times 10^{06}$ to $1 \times 10^{10}$ Ω·cm, more preferably from $1 \times 10^{06}$ to $1 \times 10^{09}$ Ω·cm, further preferably from $1 \times 10^{07}$ to $5 \times 10^{08}$ Ω·cm. The value of the volume resistivity can be adjusted by the amount of the phosphorus compound, the amount of the aluminum compound, the zinc compound, the gallium compound, the germanium compound or the antimony compound, the amount of the Group IA metal compound, the Group IIA metal compound, the manganese compound, the iron compound or the cobalt compound, or the amount of the titanium compound, the zirconium compound or the hafnium compound. When the volume resistivity value is within the above range, when formed into a film, the adhesion to the film roll is reduced, whereby high speed forming will be possible. Further, the polyester resin of this embodiment is such that value b in the Hunter's color coordinate system is preferably at most 5, more preferably at most 3. If value b is high, the color tends to be yellowish when formed into a molded product, thus leading to a problem on appearance.

Further, the polyester resin of this embodiment is such that the content of the diethylene glycol component is preferably not more than 3 mol %, more preferably from 0.5 mol % to 2.5 mol %, further preferably from 1.0 mol % to 2.0 mol %, based on the total diol component. If the amount of the diethylene glycol component is large, no adequate heat resistance or strength tends to be obtained when formed into a molded product, and if it is small, the transparency tends to deteriorate when formed into a molded product.

Use of Polyester ⑥

The polyester resin thus obtainable can be made to have a very small number of particles in the interior of the resin while suppressing elution of antimony, so that when formed into fibers or films, thread breakage or film rupture caused by particles will not substantially take place, or when formed into a molded product such as a film, there will be no substantial projections such as fish eyes on its surface.

For example, it can be formed into various molded products such as fibers, sheets and stretched films, by usual methods. When formed into a sheet, this sheet may then be used to form a container by draw forming.

For example, in a case where a film is to be produced, the polyester composition is extruded at a temperature of from the melting point (Tm: ° C.) to (Tm+70)° C. to obtain a non-stretched film, and this non-stretched film is stretched in a monoaxial direction (longitudinal direction or transverse direction) at a temperature of from (Tg−10) to (Tg+70)° C. (where Tg: glass transition temperature of the polyester) at a stretching ratio of from 2.5 to 5.0 times and then stretched in a direction perpendicular to the above stretching direction (when the first stretching is in a longitudinal direction, the second stretching will be in a transverse direction) at a temperature of from Tg (° C.) to (Tg+70)° C. at a stretching ratio of from 2.5 to 5.0 times to obtain the film. In such a case, the area stretching ratio is preferably from 9 to 22 times, more preferably from 12 to 22 times. The stretching means may be either simultaneous biaxial stretching or successive biaxial stretching.

Further, the obtained film can be heat-set at a temperature of from (Tg+70)° C. to Tm (° C.). For example, in the case of a polyethylene terephthalate film, heat setting is preferably conducted at a temperature of from 200 to 240° C. The heat setting time is, for example, from 1 to 60 seconds.

Particularly, the polyester resin of the present invention is characterized in that when formed into a biaxially stretched film under the following conditions, projections on the film surface are preferably such that:

those (L1) having heights of at least 0.27 μm and less than 0.54 μm are at most 50/200 cm$^2$, those (L2) having heights of at least 0.54 μm and less than 0.81 μm are at most 10/200 cm$^2$, and those (L3) having heights of at least 0.81 μm and less than 1.08 μm are at most 3/200 cm$^2$.

Projections L1 are more preferably at most 30, further preferably at most 20, particularly preferably at most 10. Projections L2 are more preferably at most 5, and projections L3 are more preferably at most 1.

For example, when fibers are to be produced, conventional spinning conditions may be employed. Spinning is carried out at a spinning rate of from 700 to 8,000 m/min, preferably from 2,000 to 5,000 m/min. If the spinning rate is less than 700 m/min, the productivity tends to be low, and the cost tends to be high, such being not practical. Further, spinning at a rate of 8,000 m/min or higher, is preferred from a theoretical production, but a problem which must be solved from an engineering point of view such as an accompanying flow formed at the time of spinning, tends to be large, and unless the spinning apparatus is improved, thread breakage will be frequented in spinning, such being undesirable.

The spun yarn thus withdrawn may be once wound up and then subjected to stretching, or without being wound up, may be subjected to stretching and used as a stretched yarn. The size of yarn is not limited and may be free ranging from a fine yarn of 1 dpf or less to a very thick yarn of 100 dpf or more. Depending upon the particular application, false twisting or crimping may be applied, and the cross-section of fiber may be free i.e. may, for example, be circular, triangular or hollow. Further, composite spinning with other material may be possible.

In any case, no adequate strength can be obtained at a stretching ratio of 1.3 times or less. Further, by a usual stretching step, it is difficult to carry out stretching at a stretching ratio of 3.5 times or more constantly.

Further, when it is used as a short fiber, the fiber length is, as commonly known, preferably from 3 to 200 mm, more preferably from 10 to 150 mm. Also as commonly known, the crimping degree is preferably from 5 to 35%, more preferably fro 8 to 30%.

EXAMPLES

Now, the present invention will be described in further detail with reference to Examples, but the present invention is not limited to the following Examples.

Common analytical and evaluation methods to be used in the Examples will be listed below. Further, the results are shown in various Tables by using abbreviations of the following analytical and evaluation methods.

Esterification Ratio

With respect to a solution having a sample dissolved at a concentration of 3 wt % in a mixed solvent of deuterated chloroform/hexafluoroisopropanol (weight ratio: 7/3), 1H-NMR was measured by a nuclear magnetic resonance apparatus ("JNM-EX270 model", manufactured by Nihon Denshi K. K.), and each peak was identified. The carboxylic acid terminal amount (A mol/ton sample) was calculated from the integral value of the peak, and by the following formula, the esterification ratio (E%) was calculated as a proportion of the esterified among all carboxyl groups of terephthalic acid units.

Esterification ratio (E)=[1−A/((1,000,000/192.2)×2)]×100

Amount of Antimony Eluted From the Polyester Resin Particles 50 g of polyester resin particles having a number average particle weight of 24 mg were heated and crystallized at 120° C. for 10 hours and then immersed in 150 g of hot water of 95° C. for 60 minutes, whereby antimony extracted into water was measured as antimony atom concentration C (ppb) by means of an inductively coupled plasma mass spectrometer ("HP4500", manufactured by Hewlett-Packard Company). By the following formula, the eluted amount D (μg) as antimony atoms per 1 g of the polyester resin, was calculated.

$$D(\mu g)=(C/10^9)\times(150/50)\times10^6$$

Content of Metal Atoms 2.5 g of a resin sample was ashed and completely decomposed by hydrogen peroxide in the presence of sulfuric acid in accordance with a usual method and then adjusted by distilled water to a constant volume of 50 ml, and with respect to this sample, quantitative analysis was carried out by plasma emission spectrometry by means of a high frequency inductively coupled plasma emission spectrometer ("JY46P model", manufactured by JOBIN YVON COMPANY).

Quantitative Determination of Acid Components

With respect to a solution having a sample dissolved at a concentration of 3 wt % in a mixed solvent of deuterated chloroform/hexafluoroisopropanol (weight ratio: 7/3), 1H-NMR was measured by a nuclear magnetic resonance apparatus ("JNM-EX270 model", manufactured by Nippon Denshi K. K.), and peaks of the respective acid components were identified, whereupon from the integral value of a peak, mol % of the particular acid component based on all acid components, was calculated.

Copolymerized Amount of Diethylene Glycol

With respect to a solution having a resin sample dissolved at a concentration of 3 wt % in a mixed solvent of deuterated chloroform/hexafluoroisopropanol (weight ratio: 7/3), 1H-NMR was measured by a nuclear magnetic resonance apparatus ("JNM-EX270 model", manufactured by Nippon Denshi K. K.), and the respective peaks were identified, whereupon from the integral value of a peak, mol % of diethylene glycol based on all diol components, was calculated.

Intrinsic Viscosity 0.25 g of a freeze-pulverized resin sample was dissolved at a concentration (c) of 1.0 g/dl in a mixed solvent of phenol/tetrachloroethane (weight ratio: 1/1), at 110° C. for 30 minutes in the case of a melt polycondensed resin, or at 120° C. for 30 minutes in the case of a solid phase polycondensed resin, whereupon by means of an Ubbellohde capillary viscometer, the relative viscosity (ηrel) with the stock solution was measured at 30° C. A ratio (ηsp/c) of the specific viscosity (ηsp) obtained from this relative viscosity (ηrel)–1, to the concentration (c), was obtained. In a similar manner, the corresponding ratios (ηsp/c) were obtained when the concentration (c) was changed to 0.5 g/dl, 0.2 g/dl and 0.1 g/dl, respectively. From these values, a ratio (ηsp/c) when the concentration (c) was extrapolated to be 0, was obtained as the intrinsic viscosity [η] (dl/g).

Cyclic Trimer Content ($CT_o$) in the Polyester Resin 4.0 mg of a resin sample was accurately weighted and dissolved in 2 ml of a mixed solvent of chloroform/hexafluoroisopropanol (volume ratio: 3/2), and then further diluted by an addition of 20 ml of chloroform. Then, 10 ml of methanol was added thereto for precipitation, followed by filtration to obtain a filtrate, which was evaporated to dryness and then dissolved in 25 ml of dimethylformamide. The amount of a cyclic trimer (cyclotriethylene terephthalate) in this solution was quantitatively analyzed by liquid chromatography ("LC-10A", manufactured by Shimadzu Corporation).

Color Coordinate Value b of the Polyester Resin

A resin sample was filled into a cylindrical powder calorimetric cell having an inner diameter of 36 mm and a depth of 15 mm to be flush, and by means of a calorimetric color difference meter ("ND-300A", manufactured by NIPPON DENSHOKU INDUSTRIES CO., LTD.), color coordinate b of the Hunter's color difference formula in the Lab color system as disclosed in Reference 1 of JIS Z8730, was obtained as a simple average value of values measured at four positions by rotating the cell every 900 by a reflection method. At the time of the measurement, the apparatus was preliminarily left to stand for at least 4 hours after the power source was switched on, to have it sufficiently stabilized before the measurement. The lower the value b, the lower the yellowish degree, and the better as the color tone.

Acetaldehyde Content ($AA_o$) in the Polyester Resin 5. 0 g of a resin sample was accurately weighed and sealed in together with 10 ml of pure water in a micro bomb having an internal capacity of 50 ml under sealing with nitrogen, whereupon heat extraction was carried out at 160° C. for 2 hours. The amount of acetaldehyde in the extracted solution was quantitatively analyzed by gas chromatography ("GC-14A", manufactured by Shimadzu Corporation) using isobutyl alcohol as the internal standard and represented by a ratio (ppm) per weight of the PET polyester.

Acetaldehyde Content ($AA_s$) of the Molded Plate

Using samples cut out in the form of chips of about 4×4 mm from the 4 mm portion (portion B in FIG. 1) and the rear end portion having a thickness of 3.5 mm in the molded plate, the measurement was carried out by the same method as described above.

Cyclic Trimer Content ($CT_s$) in the Molded Plate

Using a sample cut out from the forward end portion (portion A in FIG. 1) having a thickness of 3.5 mm in the molded plate, the measurement was carried out by the same method as described above.

Amount of Antimony Eluted From the Bottle

About 1.5 l of distilled water of 93° C. was filled in a bottle and left to cool at room temperature, whereupon the concentration (ppb) of antimony atoms in water was measured by means of an inductively coupled plasma mass spectrometer ("HP4500", manufactured by Hewlett-Packard Company).

Color Tone of the Bottle

The color tone of the mouth stopper portion of a bottle was visually inspected and evaluated with the following standards:

⊚: colorless transparent.

○: slightly yellowish, but practically not problematic.

X: yellowish, and practically problematic.

Acetaldehyde Odor of the Bottle

A bottle was heated in an oven at 50° C. for one hour, whereupon the acetaldehyde odor was examined by a sensory test and evaluated with the following standards:

⊚: acetaldehyde odor very little.

○: acetaldehyde odor little.

X: acetaldehyde odor assails ones nostrils.

Further, abbreviations in the Tables given hereinafter, have the following meanings.

Explanation of Abbreviations:

EAP: ethyl acid phosphate

H3PO4: orthophosphoric acid

H3PO3: phosphorous acid

TMP: trimethyl phosphate

EG: ethylene glycol

DEG copolymerized amount: The copolymerized amount of diethylene glycol in the glycol component. IPA copolymerized amount: The copolymerized amount of isophthalic acid in the carboxylic acid component.

Sections for the Qualities of Molded Products

280° C. AAs: acetaldehyde content in the stepped molded plate injection-molded at a cylinder temperature of 280° C.

280° C. ΔAA: difference between 280° C. AAs and the acetaldehyde content (AAo) in the polyester resin.

280° C. CTs: cyclic trimer content in the stepped molded plate injection-molded at a cylinder temperature of 280° C.

280° C. ΔCT: difference between the 280° C. CTs and the cyclic trimer content (CTo) in the polyester resin.

280° C. haze: haze at the 5.0 mm portion of the stepped molded plate injection-molded at a cylinder temperature of 280° C.

270° C. AAs: acetaldehyde content in the stepped molded plate injection-molded at a cylinder temperature of 270° C.

270° C. CTs: cyclic trimer content in the stepped molded plate injection-molded at a cylinder temperature of 270° C.

270° C. haze: haze at the 5.0 mm portion of the stepped molded plate injection-molded at a cylinder tempera- ture of 270° C.

Section for Production Process

A: In the continuous system for an esterification method, the phosphorus compound was added to the slurry tank, the antimony compound and the magnesium compound were added to the second esterification tank, and the titanium compound was added into a transportation pipe from the second esterification tank to the first polymerization tank.

B: In the continuous system for an esterification method, the phosphorus compound was added to the slurry tank, the magnesium compound was added to the second esterification tank, and the antimony compound and the titanium compound were added into a transportation pipe from the second esterification tank to the first polymerization tank.

C: In the batch system for an esterification method, prior to the initiation of the polymerization, the phosphorus compound, the magnesium compound, the antimony compound and the titanium compound were added in this order.

D: The batch system for an ester exchange method.

E: A method other than A, B, C and D.

Examples Relating to Polyester ①

Examples from the viewpoint of suppressing elution of antimony, will be shown below.

Example 1-1

Using a continuous polymerization apparatus comprising a slurry preparation tank, esterification reactors of two stages connected in series thereto and melt polycondensation tanks of three stages connected in series to the second stage esterification reactor, terephthalic acid and ethylene glycol were continuously supplied in a weight ratio of 865:485 to the slurry preparation tank, and a 0.3 wt % ethylene glycol solution of ethyl acid phosphate, was continuously added in such an amount that the content as phosphorus atoms (P) based on the formed polyester resin would be 9 weight ppm, followed by stirring and mixing to obtain a slurry. This slurry was transferred to the first stage esterification reactor set for an average retention time of 4 hours in a nitrogen atmosphere at 260° C. under a relative pressure of 50 kPa (0.5 kg/cm$^2$G) and then to the second stage esterification reactor set for an average retention time of 1.5 hours in a nitrogen atmosphere at 260° C. under a relative pressure of 5 kPa (0.05 kg/cm$^2$G), to carry out the esterification reac- tion. At that time, the esterification ratio as measured by the above-described method, was 85% in the first stage and 95% in the second stage.

Further, at that time, via an upper pipe provided at the second stage, a 0.6 wt % ethylene glycol solution of mag- nesium acetate tetrahydrate was continuously added in such an amount that the content as magnesium atoms (Mg) based on the formed polyester resin would be 15 weight ppm and a 1.9 wt % ethylene glycol solution of antimony trioxide was continuously added in such an amount that the content as antimony atoms (Sb) based on the formed polyester resin would be 90 weight ppm.

Continuously, at the time of transporting the esterification reaction product obtained as described above to the melt polycondensation tank, a 0.2 wt % ethylene glycol solution of tetrabutyl titanate, was continuously added to the trans- portation pipe in such an amount that the content as titanium atoms (Ti) based on the formed polyester resin would be 2.0 weight ppm, and the esterification reaction product was continuously transferred to the first stage melt polyconden- sation tank set for an average retention time of 1.2 hours at 270° C. under an absolute pressure of 2.6 kPa (20 Torr), then to the second stage melt polycondensation tank set for an average retention time of 1.2 hours at 278° C. under an absolute pressure of 0.5 kPa (4 Torr) and then to the third stage melt polycondensation tank set for an average reten- tion time of 1.2 hours at 280° C. under an absolute pressure of 0.3 kPa (2 Torr), to carry out the melt polycondensation, whereupon the product is withdrawn in the form of a strand from an outlet provided at the bottom of the polycondensa- tion tank, cooled with water and then cut by a cutter to obtain a polyester resin in the form of chips having a number average particle weight of 24 mg. The intrinsic viscosity of the obtained resin was 0.60 dl/g.

Then, the polyester resin chips obtained as described above were continuously supplied for crystallization to an agitation crystallization machine held at about 160° C. in a nitrogen atmosphere so that the retention time would be about 60 minutes and then continuously supplied to a tower type solid polycondensation apparatus and heated at 205° C. in a nitrogen atmosphere for solid phase polycondensation.

With respect to the obtained solid phase polycondensate resin chips, the eluted amount of antimony was measured by the above-described method, and the results are shown in Table 1.

Further, with respect to the obtained solid phase polycondensate resin chips, the contents as phosphorus atoms (P), magnesium atoms (Mg), antimony atoms (Sb) and titanium atoms (Ti) of the phosphorus component, the magnesium component, the antimony component and the titanium component, respectively, were measured by the above-described method, and the results are shown in Table 1.

Further, with respect to the obtained solid phase polycondensate resin chips, the copolymerized amount of diethylene glycol, the intrinsic viscosity, color coordinate value b as the color tone and the acetaldehyde content, were measured by the above-described methods, and the results are shown in Table 1.

Figure 1B:
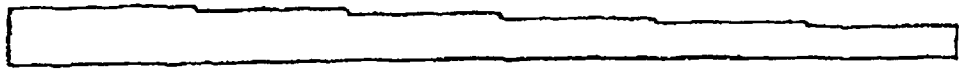

Further, the obtained polyester resin chips were dried at 160° C. for 4 hours in a nitrogen stream of 40 l/min in an inert oven ("IPHH-201 model", manufactured by ESPEC COMPANY), then, by an injection molding machine ("M-70AII-DM", manufactured by Meiki Co., Ltd.), a stepped molded plate having a shape shown in FIG. 1 having a size of 50 mm×100 mm and thicknesses of six steps ranging from 6 mm to 3.5 mm in a transverse direction with each step being 0.5 mm, was injection-molded (in FIG. 1, G indicates a gate portion) at a cylinder temperature of 280° C. under a back pressure of $5 \times 10^5$ Pa at an injection rate of 40 cc/sec under a dwell pressure of $35 \times 10^5$ Pa at a mold temperature of 25° C. with a molding cycle of about 75 seconds. With respect to the molded plate, the acetaldehyde content was measured by the above-described method, and the results are shown in Table 1.

Further, the obtained polyester resin chips were dried at 130° C. for 10 hours in a vacuum dryer. Then, by an injection molding machine ("FE-80S", manufactured by Nissei Plastic Industrial Co., Ltd.), a preform of a test tube shape having an outer diameter of about 29 mm, a height of about 165 mm, an average wall thickness of about 3.7 mm and a weight of about 60 g, was injection-molded at a cylinder temperature of 280° C. under a back pressure of $5 \times 10^5$ Pa at an injection rate of 45 cc/sec under a dwell pressure of $30 \times 10^5$ Pa at a mold temperature of 20° C. with a molding cycle of about 40 seconds. The obtained preform was heated for 70 seconds in a near infrared ray irradiation furnace equipped with a quartz heater and then left to stand at room temperature for 25 seconds. Then, it was introduced into a blow mold set at 160° C. and blow-molded under a blow pressure of $7 \times 10^5$ Pa for one second and further under a blow pressure of $30 \times 10^5$ Pa for 40 seconds, while stretching in the height direction by a stretching rod, heat-set and cooled in air to mold a bottle having an outer diameter of about 95 mm, a height of about 305 mm, an average wall thickness of the body portion of about 0.37 mm, a weight of about 60 g, an internal capacity of about 1.5 l and a specific surface area of about 0.7 $cm^{-1}$.

With respect to the obtained bottle, the amount of antimony eluted with hot water, the color tone and the acetaldehyde odor, were measured and evaluated by the above-described methods, and the results are shown in Table 1.

Examples 1-2 to 1-12

A polyester resin was produced in the same manner as in Example 1-1 by using the compound as identified in Table 1 as the phosphorus compound and adding it in such an amount that the content as phosphorus atoms (P) based on the formed polyester resin would be the amount as identified in Table 1, and adding other materials in such amounts that the contents as magnesium atoms (Mg), antimony atoms (Sb) and titanium atoms (Ti), based on the formed polyester resin, would be the amounts as identified in Table 1. The obtained polyester resin was measured and evaluated in the same manner as in Example 1-1, and the results are shown in Table 1.

Comparative Example 1-1

A polyester resin was produced in the same manner as in Example 1-1 except that a solution of phosphoric acid was used as the phosphorus compound and added via an upper pipe of the second stage esterification reactor, the solution of magnesium acetate was added via an upper pipe of the first stage esterification reactor, the solution of antimony trioxide and the solution of tetrabutyl titanate were added to the transportation pipe from the second stage esterification reactor to the first stage melt polycondensation tank, and the respective compounds were added in such amounts that the contents of the respective metal atoms based on the formed polyester resin would be the amounts as identified in Table 1. The obtained polyester resin was measured and evaluated in the same manner as in Example 1-1, and the results are shown in Table 1.

Comparative Example 1-2

A polyester resin was produced in the same manner as in Example 1-1 except that no tetrabutyl titanate was added, the solution of antimony trioxide and the solution of magnesium acetate tetrahydrate were added to the transportation pipe from the second stage esterification reactor to the first melt polycondensation tank, and the respective compounds were added in such amounts that the contents of the respective metal atoms based on the formed polyester resin, would be the amounts as identified in Table 1. The obtained polyester resin was measured and evaluated in the same manner as in Example 1-1, and the results are shown in Table 1.

Comparative Example 1-3

An ester exchange reaction of 100 parts by weight of dimethyl terephthalate and 70 parts by weight of ethylene glycol was initiated in accordance with a usual method by using, as ester exchange catalysts, calcium acetate monohydrate and magnesium acetate tetrahydrate in such amounts that the contents of the respective metal atoms would be as identified in Table 1, and after 20 minutes from the initiation of distillation of methanol, antimony trioxide was added in such an amount that the content of the metal atoms would be as identified in Table 1, and the ester exchange reaction was continued. Then, trimethyl phosphate was added in such an amount that the content of the metal atoms would be as identified in Table 1, and the ester exchange reaction was substantially completed. Continuously, tetrabutyl titanate was further added in such an amount that the content of the metal atoms would be as identified in Table 1, and then, polycondensation was carried out at a high temperature high vacuum condition in accordance with a usual method to produce a polyester resin. The obtained polyester resin was measured and evaluated in the same manner as in Example 1-1, and the results are shown in Table 1.

TABLE 1

|  | Examples | | | | |
|---|---|---|---|---|---|
|  | 1-1 | 1-2 | 1-3 | 1-4 | 1-5 |
| Amount of Sb eluted (μg/resin) | 0.15 | 0.18 | 0.12 | 0.09 | 0.21 |
| Sb content (ppm) | 90 | 90 | 90 | 90 | 90 |
| Ti content (ppm) | 2.0 | 2.0 | 2.0 | 2.0 | 2.0 |
| Mg content (ppm) | 15 | 20 | 10 | 5.0 | 15 |
| Ca content (ppm) | 0 | 0 | 0 | 0 | 0 |
| P content (EAP) (ppm) (H3PO4) | 9 | 12 | 6 | 3 | 0 |
| (H3PO3) | 0 | 0 | 0 | 0 | 9 |
|  | 0 | 0 | 0 | 0 | 0 |
| Sb/P (weight ratio) | 10 | 7.5 | 15 | 30 | 10 |
| Mg/P (weight ratio) | 1.7 | 1.7 | 1.7 | 1.7 | 1.7 |
| Production process | A | A | A | A | A |
| Copolymerized amount of DEG (mol %) | 2.4 | 2.6 | 2.1 | 1.8 | 1.9 |
| Physical properties of resin | | | | | |
| Intrinsic viscosity (dl/g) | 0.78 | 0.78 | 0.78 | 0.78 | 0.79 |
| Color coordinate b | +0.5 | +0.1 | +0.9 | +1.5 | +0.3 |
| AAo (ppm) | 0.7 | 0.8 | 0.7 | 0.8 | 0.8 |
| Quality of molded product | | | | | |
| 280° C. AAs (ppm) | 17.1 | 17.0 | 16.4 | 14.9 | 14.2 |
| 280° C. ΔAA (ppm) | 16.4 | 16.2 | 15.7 | 14.1 | 13.4 |
| 270° C. haze (%) | 25 | — | — | — | — |
| 270° C. AAs (ppm) | 11.2 | — | — | — | — |
| Bottle | | | | | |
| Amount of Sb eluted (ppb) | 0.2 | — | — | — | — |
| Color tone | ⊙ | — | — | — | — |
| Acetaldehyde odor | ⊙ | — | — | — | — |

|  | Examples | | | | |
|---|---|---|---|---|---|
|  | 1-6 | 1-7 | 1-8 | 1-9 | 1-10 |
| Amount of Sb eluted (μg/resin) | 0.09 | 0.14 | 0.13 | 0.09 | 0.13 |
| Sb content (ppm) | 90 | 90 | 90 | 50 | 70 |
| Ti content (ppm) | 2.0 | 2.0 | 2.0 | 6.0 | 3.0 |
| Mg content (ppm) | 15 | 12 | 25 | 15 | 15 |
| Ca content (ppm) | 0 | 0 | 0 | 0 | 0 |
| P content (EAP) (ppm) (H3PO4) | 0 | 9 | 9 | 9 | 9 |
| (H3PO3) | 0 | 0 | 0 | 0 | 0 |
|  | 9 | 0 | 0 | 0 | 0 |
| Sb/P (weight ratio) | 10 | 10 | 10 | 5.6 | 7.8 |
| Mg/P (weight ratio) | 1.7 | 1.3 | 2.8 | 1.7 | 1.7 |
| Production process | A | A | A | A | A |
| Copolymerized amount of EG (mol %) | 98.1 | 97.4 | 97.6 | 96.8 | 97.2 |
| Copolymerized amount of DEG (mol %) | 1.9 | 2.6 | 2.4 | 3.2 | 2.8 |
| Copolymerized amount of TPA (mol %) | 100 | 100 | 100 | 100 | 100 |
| Physical properties of resin | | | | | |
| Intrinsic viscosity (dl/g) | 0.78 | 0.78 | 0.78 | 0.78 | 0.78 |
| Color coordinate b | +0.4 | +0.9 | +3.1 | +3.5 | +1.5 |
| AAo (ppm) | 0.8 | 1.5 | 3.2 | 4.7 | 0.7 |

TABLE 1-continued

|  | | | | | |
|---|---|---|---|---|---|
| Quality of molded product | | | | | |
| 280° C. AAs (ppm) | 14.1 | 17.5 | 17.6 | 19.8 | 17.4 |
| 280° C. ΔAA (ppm) | 13.3 | 16.0 | 14.4 | 15.1 | 16.7 |
| 270° C. haze (%) | — | — | — | 9.2 | — |
| 270° C. AAs (ppm) | — | — | — | 13.5 | — |
| Bottle | | | | | |
| Amount of Sb eluted (ppb) | 0.1 | — | — | 0.1 | — |
| Color tone | ⊙ | — | — | ○ | — |
| Acetaldehyde odor | ⊙ | — | — | ○ | — |

|  | Example | | Comparative Example | | |
|---|---|---|---|---|---|
|  | 1-11 | 1-12 | 1-1 | 1-2 | 1-3 |
| Amount of Sb eluted (μg/resin) | 0.18 | 0.28 | 1.8 | 1.5 | 1.2 |
| Sb content (ppm) | 110 | 150 | 81 | 180 | 47 |
| Ti content (ppm) | 1.0 | 0.5 | 3.0 | 0.0 | 5.0 |
| Mg content (ppm) | 15 | 15 | 27 | 57 | 47 |
| Ca content (ppm) | 0 | 0 | 0 | 0 | 67 |
| P content (EAP) (ppm) (H3PO4) | 9 | 9 | 0 | 90 | 40 |
| (H3PO3) | 0 | 0 | 26 | 0 | 0 |
|  | 0 | 0 | 0 | 0 | 0 |
| Sb/P (weight ratio) | 12 | 17 | 3.1 | 2.0 | 1.2 |
| Mg/P (weight ratio) | 1.7 | 1.7 | 1.0 | 0.6 | 1.2 |
| Production process | A | A | E | E | D |
| Copolymerized amount of EG (mol %) | 97.8 | 98.0 | 97.2 | 97.1 | 96.5 |
| Copolymerized amount of DEG (mol %) | 2.2 | 2.0 | 2.8 | 2.9 | 3.5 |
| Copolymerized amount of TPA (mol %) | 100 | 100 | 100 | 100 | 100 |
| Physical properties of resin | | | | | |
| Intrinsic viscosity (dl/g) | 0.78 | 0.78 | 0.74 | 0.78 | 0.72 |
| Color coordinate b | +0.5 | +0.9 | +1.1 | +0.1 | +5.4 |
| AAo (ppm) | 0.8 | 0.8 | 3.4 | 3.1 | 8.2 |
| Quality of molded product | | | | | |
| 280° C. AAs (ppm) | 16.2 | 15.0 | 24.1 | 20.8 | 29.4 |
| 280° C. ΔAA (ppm) | 15.4 | 14.2 | 20.7 | 17.7 | 21.2 |
| 270° C. haze (%) | — | — | — | 65 | — |
| 270° C. AAs (ppm) | — | — | — | — | — |
| Bottle | | | | | |
| Amount of Sb eluted (ppb) | — | — | 1.8 | — | 1.2 |
| Color tone | — | — | ○ | — | X |
| Acetaldehyde odor | — | — | ○ | — | X |

Examples Relating to Polyester ②

Now, Examples for the polyester resin, whereby when it is formed into a hollow container for a non-carbonated beverage, it is possible to obtain the container excellent in transparency and heat resistance, with a productivity higher than ever, while suppressing elution of antimony, will be described.

In the Examples of this embodiment, particularly, the following physical properties were measured as follows.

Quantitative Analysis of the Glycol Component 50 ml of a 4N-KOH/methanol solution was added to 5 g of a sample resin pulverized by a Willette type pulverizer (model: 1029-A) manufactured by Yoshida Co., Ltd. by means of a perforated plate having 1.5 mm holes, and a reflux condenser was set. Then, it was heated and refluxed for hydrolysis for two hours while stirring on a hot plate (surface temperature: 200° C.) equipped with a magnetic stirrer. After cooling, about 20 g of high purity terephthalic acid was added, followed by shaking thoroughly for neutralization to obtain a slurry having a pH of not higher than 9, which was filtered by means of a 11G-4 glass filter and then washed twice with 2 ml of methanol. The filtrate and the washing liquids were put together to obtain a sample liquid for gas chromatography. By a microsyringe, 1 $\mu$l of the sample liquid was injected to a gas chromatography of Shimadzu Corporation (model: GC-14APF), and from the areas of peaks of the respective glycol components, mol % of each glycol component based on the total glycol component was calculated in accordance with the following formula.

mol % of a certain glycol component=(ACO×CfCO)/($\Sigma$(A×Cf))×100

ACO: area of the glycol component ($\mu$V·sec)

CfCO: correction coefficient of the glycol component

A: area of each glycol component ($\mu$V·sec)

Cf: correction coefficient of each glycol component

The conditions for using the gas chromatography are as follows.

| Column: | "DB-WAX", manufactured by J&W (0.53 mm × 30 m) | |
|---|---|---|
| Set temperatures: | Column: | 160° C. to 220° C. |
| | Vaporizing chamber: | 230° C. |
| | Detector: | 230° C. |
| Gas flow rates: | Carrier (nitrogen): | 5 ml/min |
| | Hydrogen: | 0.6 kg/cm$^2$ |
| | Air: | 0.6 kg/cm$^2$ |
| Detector: | FID | |
| Sensitivity | 102 M$\Omega$ | |

Quantitative Analysis of Carboxylic Acid Terminal Mumber (AV)

Chips were pulverized, then dried at 140° C. for 15 minutes by a hot air drier and cooled to room temperature in a desiccator to obtain a sample. From this sample, 0.1 g was accurately weighed and put into a test tube and after an addition of 3 ml of benzyl alcohol, dissolved at 195° C. for 3 minutes while blowing dry nitrogen gas thereto. Then, 5 ml of chloroform was gradually added, followed by cooling to room temperature. To this solution, a phenol red indicator was added in an amount of one or two drops, followed by titration with a 0.1N sodium hydroxide benzyl alcohol solution with stirring while blowing dry nitrogen gas thereto. The titration was terminated at a time point where the color changed from yellow to red. Further, as a blank, the same operation was carried out without using the polyester resin sample, and the acid number was calculated by the following formula.

Acid number (mol/ton)=(A−B)×0.1×f/W [where A is the amount ($\mu$l) of the 0.1N sodium hydroxide benzyl alcohol solution required for the titration, B is the amount ($\mu$l) of the 0.1N sodium hydroxide benzyl alcohol solution required for the titration of the blank, W is the amount (g) of the polyester resin sample, and f is the titer of the 0.1N sodium hydroxide benzyl alcohol solution.]

For the titer (f) of the 0.1N sodium hydroxide benzyl alcohol solution, 5 ml of methanol was taken into a test tube and, after adding an ethanol solution of phenol red as an indicator in an amount of one or two drops, titration was carried out to the point of color change with 0.4 ml of the 0.1N sodium hydroxide benzyl alcohol solution. Then, 0.2 ml of a 0.1N hydrochloric acid aqueous solution having a known titer was added as a standard solution, followed by titration again to the point of color change with the 0.1N sodium hydroxide benzyl alcohol solution. (The foregoing operation was carried out while blowing dry nitrogen gas thereto.) The titer (f) was calculated by the following formula.

Titer (f)=titer of the 0.1N hydrochloric acid aqueous solution×amount ($\mu$l) of the 0.1N hydrochloric acid aqueous solution/titrated amount ($\mu$l) of the 0.1N sodium hydroxide benzyl alcohol solution

Temperature-lowering Crystallization Temperature

The obtained resin was dried at 160° C. for 4 hours in a nitrogen stream of 40 l/min in an inert oven ("IPHH-201 model", manufactured by ESPEC COMPANY). Then, by an injection molding machine ("M-70AII-DM", manufactured by Meiki Co., Ltd.), a stepped molded plate having the shape as shown in FIG. 1 and having a size of 50 mm×100 mm and thicknesses of six steps ranging from 6 mm to 3.5 mm in a transverse direction with each step being 0.5 mm, was injection-molded at a cylinder temperature of 280° C. under a back pressure of 5×10$^5$ Pa at an injection rate of 40 cc/sec under a dwell pressure of 35×10$^5$ Pa at a mold temperature of 25° C. and with a molding cycle of about 75 seconds. Further, in FIG. 1, G indicates a gate portion.

The forward end portion (portion A in FIG. 1) having a thickness of 3.5 mm in the molded plate was cut out and dried at 40° C. for three days in a vacuum dryer, whereupon a sample was cut out from the non-surface portion, and about 10 mg of the sample was accurately weighed and sealed in by using an aluminum oven pan and a pan cover (normal pressure type, "P/N SSC000E030" and "P/N SSC000E032", manufactured by Seiko Denshi K. K.). By means of a differential scanning calorimeter ("DSC220C", manufactured by Seiko K. K.), it was heated from 20° C. to 285° C. at a rate of 20° C./min in a nitrogen stream, then maintained in a molten state at 285° C. for 5 minutes and then cooled to 20° C. at a rate of 10° C./min, whereby the crystallization peak temperature observed during the temperature drop was measured.

Evaluation of Molding of a Bottle

The obtained polyester resin chips were thoroughly dried. Using an injection molding machine "FE-80S", manufactured by Nissei Plastic Industrial Co., Ltd., a preform of a test tube shape having a height of 165 mm, an outer diameter of the tube of 29.0 mm, an average wall thickness of 3.7 mm and a weight of 60 g, was injection-molded at a resin temperature of 280° C. under a back pressure of about 5 kg/cm$^2$ at an injection rate of about 45 cc/sec under a dwell pressure of about 30 kg/cm$^2$ at a mold temperature of 20° C. and with a molding cycle of about 40 seconds.

Such preforms were introduced into a near infrared ray irradiation furnace equipped with a quartz heater, and under a constant output, the respective preforms were heated for 56, 58, 60, 62, 64, 66, 68 and 70 seconds, respectively, then left at room temperature for 25 seconds and immediately thereafter, each preform was put into a mold adjusted to 160° C. and subjected to blowing under a blow pressure of about 7 kg/cm² for one second and then under a blow pressure of about 30 kg/cm² for 5 seconds, while stretching it in the height direction of the bottle by a stretching rod, and then maintained for 5 seconds while exerting the blow pressure. After cooling in air, the molded products were taken out to obtain bottles having an average wall thickness of the body portion of 350 μm and a capacity of about 1.5 l.

With respect to these bottles, the transparency at the body portion was visually observed, whereby one having good transparency was identified by "○", one which is slightly foggy but not practically problematic, was identified by "Δ", and one which is foggy and practically not acceptable, was identified by "X".

Further, the heat resistance of these bottles was evaluated as follows. Namely, a bottle was stored in an environment of 23° C. under a relative humidity of 50% for one week. Then, to this bottle, hot water of 90° C. was filled at room temperature, and then the bottle was tightly closed. It was laid horizontally for one minute and then held vertically for 5 minutes. Thereafter, it was cooled for 20 minutes in water of 10° C. The shape of the bottle was visually observed, whereby one having no change in shape and good heat resistance, was identified by "⊚", one having a slight deformation at the body portion but being substantially not problematic, was identified by "○", one having a deformation at the body portion and inadequate heat resistance, was identified by "Δ", and one having a large deformation at the body portion and very poor heat resistance, was identified by "X". By the foregoing evaluation, the minimum heating time of the preform to obtain bottles whereby both the transparency and the heat resistance are evaluated to be "○" or "⊚" was identified by Tmin (seconds). The shorter the Tmin, the more efficient the production of the bottle.

Example 2-1

Figure 2:
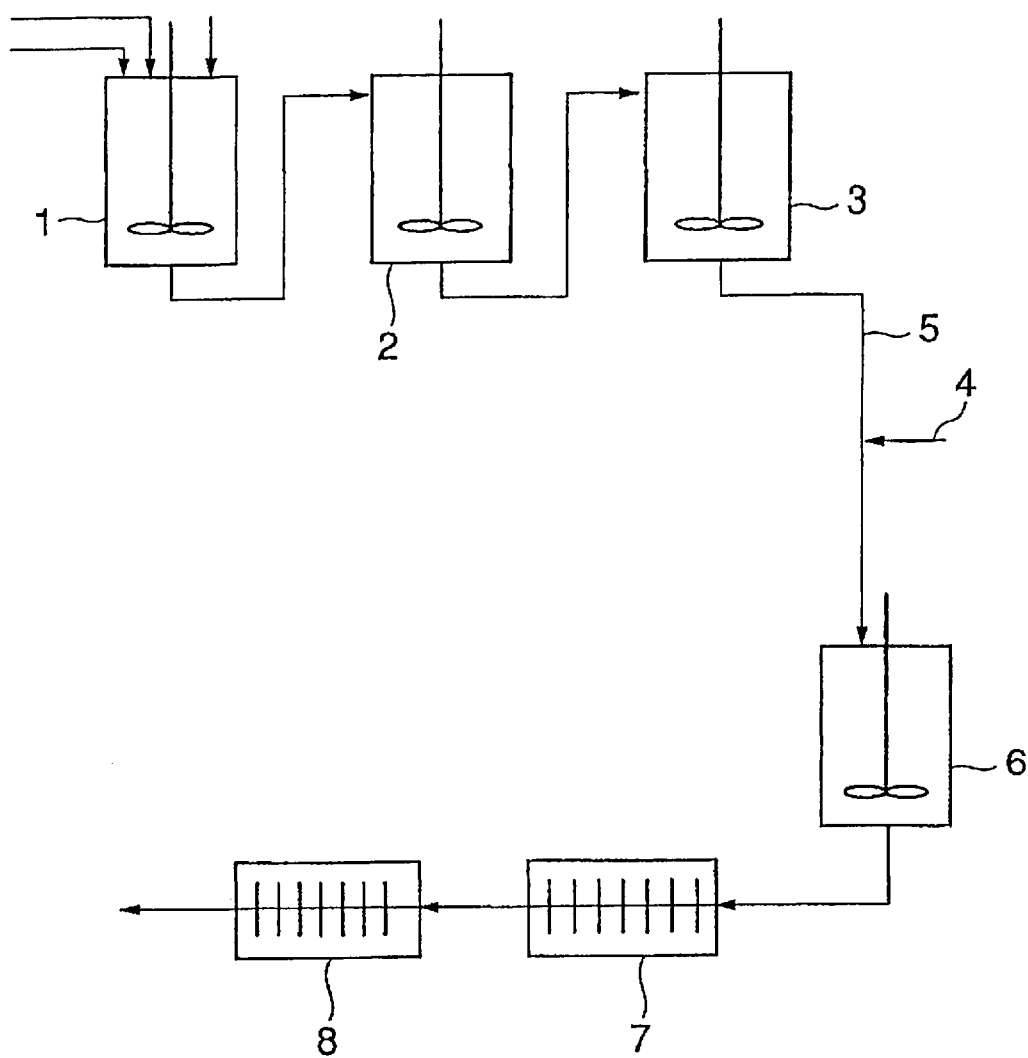
FIG. 2: one embodiment of the apparatus for producing a polyester by the process of the present invention.

A polyester was continuously produced by means of a continuous polymerization apparatus as shown in FIG. 2, which comprises a slurry preparation tank composed of a single agitation tank, esterification reaction tanks comprising two agitation tanks connected in series, and a total of three melt polycondensation reactors comprising an agitation tank and two horizontal plug flow type reactors following it.

To the slurry preparation tank 1, an ethylene glycol solution of ethyl acid phosphate (concentration: 0.3 wt %) in such an amount that 9 ppm of phosphorus atoms would remain per 1 kg of the formed polyester resin, and terephthalic acid and ethylene glycol, were supplied so that the ratio of terephthalic acid:ethylene glycol would be 865:485 (weight ratio), to obtain a slurry. This slurry was continuously supplied to the esterification reactors. The reaction conditions in the esterification reactors were such that the first stage 2 was carried out in a nitrogen atmosphere at 260° C. under a relative 2 pressure of 50 KPa (0.5 kg/cm G) for an average retention time of 4 hours, and the second stage 3 was carried out similarly in a nitrogen atmosphere at 260° C. under 5 KPa (0.05 kg/cm²G) for an average retention time of 1.5 hours.

From an upper pipe installed in the second stage esterification reactor, an ethylene glycol solution of magnesium acetate tetrahydrate (concentration: 0.6 wt %) was continuously supplied in such an amount that 15 ppm of magnesium atoms would remain per 1 kg of the formed polyester resin.

In this case, the esterification ratio in the first step esterification was 85%, and the esterification ratio in the second stage esterification was 95%.

The esterification reaction product was continuously supplied to the melt polycondensation reactors via a conduit 5. At an intermediate point of the conduit 5, an ethylene glycol solution of tetrabutyl titanate (concentration: 0.2 wt %) in such an amount that 2.0 ppm of titanium atoms would remain per 1 kg of the formed polyester resin, and an ethylene glycol solution of antimony trioxide (concentration: 1.9 wt %) in such an amount that 90 ppm of antimony atoms would remain per 1 kg of the formed polyester resin, were continuously added to the esterification reaction product, via a conduit 4.

The reaction conditions in the melt polycondensation reactors were such that the first stage was carried out at 270° C. under an absolute pressure of 2.6 KPa (20 Torr) for an average retention time of 1.2 hours, the second stage was carried out at 278° C. under an absolute pressure of 0.5 KPa (4 Torr) for an average retention time of 1.2 hours, and the third stage 8 was carried out at 280° C. under an absolute pressure of 0.3 KPa (2 Torr) for an average retention time of 1.2 hours. The melt polycondensation reaction product was extruded from the die in the form of a strand, cooled and solidified, and then cut by a cutter to obtain melt polymerized chips having an average weight of 24 mg per chip. The intrinsic viscosity of the chips was 0.60 dl/g.

The chips were continuously supplied to a crystallizer maintained at about 160° C. and having a nitrogen atmosphere and maintained for about 60 minutes with stirring. Then, via a preheater, they were continuously supplied to a tower type solid polycondensation apparatus and subjected to a solid phase polycondensation reaction in a nitrogen atmosphere at 205° C. With respect to the obtained solid phase polycondensate chips, the amount of antimony eluted, the intrinsic viscosity, the copolymerized amount of diethylene glycol, the acetaldehyde content, the carboxylic acid terminal number and the color coordinate value b were measured by the above-described methods. Further, the obtained solid phase polycondensate chips were dried at 160° C. for 4 hours in a nitrogen stream of 40 l/min in an inert oven ("IPHH-201 model", manufactured by ESPEC COMPANY). Then, by an injection molding machine ("M-70AII-DM", manufactured by Meiki Co., Ltd.), a stepped molded plate having the shape as shown in FIG. 1 and having a size of 50 mm×100 mm and thicknesses of six steps ranging from 6 mm to 3.5 mm in the transverse direction with each step being 0.5 mm, was injection-molded at a cylinder temperature of 280° C. under a back pressure of 5×10⁵ Pa at an injection rate of 40 cc/sec under a dwell pressure of 35×10⁵ Pa at a mold temperature of 25° C. with a molding cycle of about 75 seconds (in FIG. 1, G indicates a gate portion). With respect to the molded plate, the acetaldehyde content and the temperature-lowering crystallization temperature were measured by the above-described methods, and the results are shown in Table 3.

Further, the obtained solid phase polycondensate chips were subjected to evaluation for molding of a bottle. The minimum heating time of the preform at the time of molding was as short as 60 seconds, and it was possible to obtain the bottle satisfying both transparency and heat resistance, efficiently with a high productivity. The analyzed values and the evaluation results are shown in Table 2.

Examples 2-2 to 2-9

Polyester resin chips were obtained in the same manner as in Example 2-1 except that catalysts were added so that the amounts of remaining elements derived from the catalysts were as disclosed in Table 1. The analytical values and evaluation results of the obtained chips are shown in Table 2.

Comparative Example 2-1

Melt polymerized chips were obtained in the same manner as in Example 2-1 except that no ethyl acid phosphate was added to the slurry preparation tank 1, an ethylene glycol solution of magnesium acetate tetrahydrate was continuously added to the first stage esterification in such an amount that 27 ppm of magnesium atoms would remain per 1 kg of the formed polyester resin, an ethylene glycol solution of phosphoric acid was continuously added to the second stage esterification in such an amount that 26 ppm of phosphorus atoms would remain per 1 kg of the formed polyester resin, and at an intermediate position of the conduit 5, an ethylene glycol solution of antimony trioxide in such an amount that 81 ppm of antimony atoms would remain per 1 kg of the formed polyester resin and an ethylene glycol solution of tetrabutyl titanate (concentration: 0.2 wt %) in such an amount that 3 ppm of titanium atoms would remain per 1 kg of the formed polyester resin, were continuously added to the esterification reaction product, via a conduit 4. the intrinsic viscosity of the obtained melt polymerized chips was 0.52 dl/g.

The chips were subjected to a solid phase polycondensation reaction in the same manner as in Example 2-1. The analytical values and evaluation results of the obtained resin are shown in Table 2. With the resin of this example, the intrinsic viscosity was low as compared with Examples, and the values of diethylene glycol, AA, AV and b were high, thus indicating deterioration of both the polymerizability and quality of the product. Further, in the evaluation for molding of a bottle, the minimum heating time of the preform at the time of the molding was long at a level of 70 seconds, thus indicating poor productivity, whereby the bottle cannot be obtained efficiently.

Comparative Example 2-2

A melt polymerized chips were obtained in the same manner as in Example 2-1 except that the amount of the ethylene glycol solution of ethyl acid phosphate added to the slurry preparation tank 1 was changed to such an amount that 90 ppm of phosphorus atoms would remain per 1 kg of the formed polyester resin, no magnesium acetate tetrahydrate was added to the second stage esterification, and at an intermediate point of the conduit 5, the solution having a mixture of magnesium acetate tetrahydrate and antimony trioxide dissolved in ethylene glycol, was continuously added to the esterification reaction product, via a conduit 4, so that 57 ppm of magnesium atoms and 180 ppm of antimony atoms would remain per 1 kg of the formed melt polymerized polyester resin. The intrinsic viscosity of the obtained melt polymerized chips was 0.58 dl/g.

The chips were subjected to a solid phase polycondensation reaction in the same manner as in Example 2-1. The analytical values and the evaluation results for molding a bottle, of the obtained resin, are shown in Table 2.

Comparative Example 2-3

An ester exchange reaction of 100 parts of dimethyl terephthalate and 70 parts of ethylene glycol was initiated in accordance with a usual method by using, as ester exchange catalysts, calcium acetate monohydrate and magnesium acetate tetrahydrate, as shown in Table 2. After 20 minutes from the initiation of distillation of methanol, antimony trioxide was added as shown in Table 2, and the ester exchange reaction was continued. Then, trimethyl phosphate was added as shown in Table 2, and the ester exchange reaction was substantially completed. Further, tetrabutyl titanate was added as shown in Table 2, and then, continuously, polycondensation was carried out in accordance with a usual method at a high temperature under a high vacuum condition, to obtain a polyethylene terephthalate polyester having an intrinsic viscosity of 0.60 (o-chlorophenol, 35° C.).

The chips were subjected to a solid polycondensation reaction in the same manner as in Example 2-1. The analytical values and the evaluation results for molding a bottle, of the obtained PET resin, are shown in Table 2. Further, in the evaluation for forming a bottle, even if the heating time of the preform was changed to 70 seconds, it was impossible to obtain a bottle whereby both transparency and heat resistance are evaluated to be "o" or "☉". Accordingly, the minimum heating time Tmin (seconds) of the preform was indicated as "more than 70 seconds".

Comparative Example 2-4

Polyester resin chips were obtained in the same manner as in Example 2-1 except that the amounts of the copolymerized components and the amounts of remaining atoms derived from the catalysts were as disclosed in Table 2. The analytical values and evaluation results for the obtained chips, are shown in Table 2. Further, in the evaluation for molding of a bottle, even if the heating time of the preform was changed to 70 seconds, it was impossible to obtain a bottle whereby both transparency and heat resistance are evaluated to be "o" or "☉", and accordingly, the minimum heating time Tmin (seconds) of the preform was indicated as "more than 70 seconds".

TABLE 2

| | Examples | | | | |
|---|---|---|---|---|---|
| | 2-1 | 2-2 | 2-3 | 2-4 | 2-5 |
| Amount of Sb eluted (μg/resin) | 0.16 | 0.18 | 0.13 | 0.11 | 0.16 |
| Sb content (ppm) | 90 | 90 | 90 | 90 | 90 |
| M content (ppm)* | 17 | 22 | 12 | 7 | 14 |
| Ti content (ppm) | 2 | 2 | 2 | 2 | 2 |
| Mg content (ppm) | 15 | 20 | 10 | 5 | 12 |
| P content (EAP) (ppm) (H3PO4) (H3PO3) | 0 9 0 | 0 12 0 | 0 6 0 | 0 3 0 | 0 9 0 |
| Sb/P (weight ratio) | 10.0 | 7.5 | 15.0 | 30.0 | 10.0 |
| Mg/P (weight ratio) | 1.67 | 1.67 | 1.67 | 1.67 | 1.33 |
| Production process | B | B | B | B | B |
| Copolymerized amount of DEG (mol %) | 2.2 | 2.5 | 1.9 | 1.6 | 2.2 |
| Copolymerized amount of IPA (mol %) | 0 | 0 | 0 | 0 | 0 |
| Physical properties of resin | | | | | |
| Intrinsic viscosity (dl/g) | 0.78 | 0.78 | 0.78 | 0.78 | 0.78 |
| Color coordinate b | 0.5 | 0.1 | 0.9 | 1.5 | 0.9 |
| Carboxylic acid terminal number (AV) (equivalents/ton resin) | 15 | 20 | 10 | 35 | 25 |
| AAo (ppm) | 0.7 | 0.8 | 0.7 | 0.8 | 1.5 |

TABLE 2-continued

| Quality of molded product | | | | | |
|---|---|---|---|---|---|
| 280° C. AAs (ppm) | 16.0 | 16.1 | 15.4 | 13.9 | 16.5 |
| 280° C. ΔAA (ppm) | 15.3 | 15.3 | 14.7 | 13.1 | 15.0 |
| Temperature-lowering crystallization temperature (Tc$_2$) (° C.) | 167 | 166 | 168 | 169 | 167 |
| 270° C. haze (%) | 35 | — | — | — | — |
| 270° C. AAs (ppm) | 12.1 | — | — | — | — |
| Bottle Heat resistance/transparency Heating time: | | | | | |
| 56 sec | Δ/○ | X/○ | Δ/○ | Δ/Δ | X/○ |
| 58 sec | Δ/○ | Δ/○ | Δ/○ | ○/Δ | Δ/○ |
| 60 sec | ○/○ | Δ/○ | ○/○ | ○/Δ | Δ/○ |
| 62 sec | ○/○ | Δ/○ | ○/○ | ○/○ | Δ/○ |
| 64 sec | ○/○ | ○/○ | ○/○ | ◎/○ | ○/○ |
| 66 sec | ◎/○ | ○/○ | ◎/○ | ◎/○ | ○/○ |
| 68 sec | ◎/○ | ○/○ | ◎/○ | ◎/○ | ○/○ |
| more than 70 sec | ◎/○ | ◎/○ | ◎/○ | ◎/○ | ◎/○ |
| Minimum heating time (sec) | 60 sec | 64 sec | 60 sec | 62 sec | 64 sec |

| | Examples | | | |
|---|---|---|---|---|
| | 2-6 | 2-7 | 2-8 | 2-9 |
| Amount of Sb eluted (μg/resin) | 0.14 | 0.16 | 0.14 | 0.29 |
| Sb content (ppm) | 90 | 70 | 110 | 150 |
| M content (ppm)* | 27 | 18 | 16 | 15.5 |
| Ti content (ppm) | 2 | 3 | 1 | 0.5 |
| Mg content (ppm) | 25 | 15 | 15 | 15 |
| P content (EAP) (ppm) (H3PO4) | 0 | 0 | 0 | 0 |
| (H3PO3) | 9 | 9 | 9 | 9 |
| Sb/P (weight ratio) | 0 | 0 | 0 | 0 |
| Mg/P (weight ratio) | 10.0 | 7.8 | 12.2 | 16.7 |
| Production process | 2.78 | 1.67 | 1.67 | 16.7 |
| Copolymerized amount of DEG (mol %) | B | B | B | B |
| Copolymerized amount of IPA (mol %) | 2.3 | 2.2 | 2.0 | 1.9 |
| Physical properties of resin | 0 | 0 | 0 | 0 |
| Intrinsic viscosity (dl/g) | 0.78 | 0.78 | 0.78 | 0.78 |
| Color coordinate b | 3.1 | 1.5 | 0.5 | 0.9 |
| Carboxylic acid terminal number (AV) (equivalents/ton resin) | 35 | 15 | 20 | 30 |
| AAo (ppm) | 3.2 | 0.7 | 0.8 | 0.8 |
| Quality of molded product | | | | |
| 280° C. AAs (ppm) | 17.0 | 13.4 | 16.1 | 15.2 |
| 280° C. ΔAA (ppm) | 13.8 | 12.7 | 15.3 | 14.4 |
| Temperature-lowering crystallization temperature (Tc$_2$) (° C.) | 167 | 165 | 169 | 173 |
| 270° C. haze (%) | — | — | — | — |
| 270° C. AAs (ppm) | — | — | — | — |
| Bottle Heat resistance/transparency Heating time: | | | | |
| 56 sec | X/○ | Δ/○ | Δ/Δ | Δ/X |
| 58 sec | X/○ | Δ/○ | Δ/Δ | Δ/X |
| 60 sec | X/○ | ○/○ | Δ/Δ | ○/Δ |
| 62 sec | X/○ | ○/○ | ○/○ | ○/Δ |
| 64 sec | Δ/○ | ○/○ | ○/○ | ○/Δ |
| 66 sec | Δ/○ | ◎/○ | ◎/○ | ◎/○ |
| 68 sec | ○/○ | ◎/○ | ◎/○ | ◎/○ |
| more than 70 sec | ○/○ | ◎/○ | ◎/○ | ◎/○ |
| Minimum heating time (sec) | 68 sec | 60 sec | 64 sec | 68 sec |

| | Comparative Examples | | | |
|---|---|---|---|---|
| | 2-1 | 2-2 | 2-3 | 2-4 |
| Amount of Sb eluted (μg/resin) | 1.8 | 1.5 | 1.2 | 1.8 |
| Sb content (ppm) | 81 | 180 | 47 | 200 |
| M content (ppm)* | 29.9 | 57 | 119 | 0 |
| Ti content (ppm) | 2.9 | 0 | 5 | 0 |
| Mg content (ppm) | 27 | 57 | 47 | 0 |
| Ca content (ppm) | 0 | 0 | 67 | 0 |
| P content (EAP) (ppm) (H3PO4) | 0 | 90 | 0 | 0 |
| (H3PO3) | 26 | 0 | 0 | 20 |
| Sb/P (weight ratio) | 0 | 0 | 40 | 0 |
| Mg/P (weight ratio) | 3.1 | 2.0 | 1.2 | 10.0 |
| Production process | 1.04 | 0.63 | 1.18 | 0.00 |
| Copolymerized amount of DEG (mol %) | E | E | D | E |
| Copolymerized amount of IPA (mol %) | 2.8 | 2.9 | 3.5 | 2.2 |
| Physical properties of resin | 0 | 0 | 0 | 1.8 |
| Intrinsic viscosity (dl/g) | 0.74 | 0.78 | 0.78 | 0.78 |
| Color coordinate b | 1.1 | 0.1 | 5.4 | 1.5 |
| Carboxylic acid terminal number (AV) (equivalents/ton resin) | 45 | 30 | 50 | 30 |
| AAo (ppm) | 3.4 | 3.1 | 8.2 | 2.5 |
| Quality of molded product | | | | |
| 280° C. AAs (ppm) | 24.1 | 20.8 | 29.4 | 23.2 |
| 280° C. ΔAA (ppm) | 20.7 | 17.7 | 21.2 | 20.7 |
| Temperature-lowering crystallization temperature (Tc$_2$) (° C.) | 161 | 162 | 163 | 169 |
| 270° C. haze (%) | — | 65 | — | — |
| 270° C. AAs (ppm) | — | — | — | — |
| Bottle Heat resistance/transparency Heating time: | | | | |
| 56 sec | X/○ | X/○ | X/○ | X/Δ |
| 58 sec | X/○ | X/○ | X/○ | X/Δ |
| 60 sec | X/○ | X/○ | X/○ | X/Δ |
| 62 sec | X/○ | X/○ | X/○ | X/○ |
| 64 sec | Δ/○ | Δ/○ | X/○ | X/○ |
| 66 sec | Δ/○ | Δ/○ | Δ/○ | X/○ |
| 68 sec | Δ/○ | Δ/○ | Δ/○ | Δ/○ |
| more than 70 sec | ○/○ | Δ/○ | Δ/○ | Δ/○ |
| Minimum heating time (sec) | 70 sec | 70 sec | more than 70 sec | more than 70 sec |

*M indicates the total of Mg and Ti contents

Examples relating to Polyester ③

Now, Examples for the polyester resin whereby when it is formed into a hollow container for a carbonated beverage, it is possible to obtain the bottle excellent in transparency, strength, taste-deterioration resistance of the contained beverage, etc. and environmental stress cracking resistance, while suppressing elution of antimony, will be described.

In the Examples of this embodiment, particularly, the following physical properties were measured as follows.

Carboxylic Acid Terminal Number (AV)

0.5 g of a resin sample was accurately weighed and dissolved in 25 ml of benzyl alcohol at 195° C. and then cooled in ice water. Then, 2 ml of ethyl alcohol was added, and by means of an automatic titration apparatus ("AUT-301", manufactured by Toa Denpa K. K.), it was neutralized and titrated with a 0.01N sodium hydroxide benzyl alcohol solution. From the measured titration amount A (ml), the blank titration amount B (ml), the titer F of the 0.01N sodium hydroxide benzyl alcohol solution and the sample weight W (g), the carboxylic acid terminal number (equivalents/ton resin) was calculated by the following formula.

$$\text{Carboxylic acid terminal number} = (A-B) \times 0.01 \times F \times 1{,}000/W$$

Temperature-rising Crystallization Temperature ($Tc_1$) and Temperature-lowering Crystallization Temperature ($Tc_2$)

The forward end portion (portion A in FIG. 2) in a thickness of 3.5 mm in the molded plate, was cut out and dried at 40° C. for 3 days by a vacuum dryer, whereupon a sample cut out from the non-surface portion was used, and about 10 mg thereof was accurately weighed and sealed in by means of an aluminum oven pan and a pan cover (normal pressure type, "P/N SSC000E030" and "P/N SSC000E032", manufactured by Seiko Denshi K. K.). By means of a differential scanning calorimeter ("DSC220C", manufactured by Seiko K. K.), the sample was heated from 20° C. to 285° C. at a rate of 20° C./min in a nitrogen stream, and the crystallization heat generation peak temperature observed during the temperature rise, was measured and taken as the temperature-rising crystallization temperature ($Tc_1$). Thereafter, it was held in a molten state at 285° C. for 5 minutes and then cooled to 20° C. at a rate of 10° C./min, and the crystallization heat generation peak temperature observed during the temperature drop, was measured and taken as the temperature-lowering crystallization temperature ($Tc_2$).

Absorbance

A sample cut out from the portion having a thickness of 4 mm (portion C in FIG. 1) in the molded plate, was measured by means of a double beam spectrophotometer ("U-2000 model", manufactured by Hitachi, Ltd.) at a scanning speed of 200 nm/min within a range of from 1,100 to 500 nm by ABS mode, whereby the value at 1,000 nm was taken as the absorbance.

Haze

With respect to the portion having a thickness of 5 mm (portion C in FIG. 1) in the molded plate, the haze was measured by a haze meter ("NDH-300A", manufactured by NIPPON DENSHOKU INDUSTRIES CO., LTD.).

Environmental Stress Rupture Time

An injection-molded sheet having a length of 50 mm, a width of 6 mm and a thickness of 1 mm, was immersed in a 0.2 wt % sodium hydroxide aqueous solution at 25° C. in such a state that it is fixed along the outer circumference of a cylinder having a diameter of 32 mm so that both ends in the length direction of the molded plate extend over a half circumference of the outer circumference of the cylinder, whereby the time until rupture takes place, was measured. The test was repeated five times, and the maximum value and the minimum value were discarded, and an average value of the remaining three tests was taken.

Environmental Stress Cracking Resistance of a Bottle

To 18.8 g of citric acid monohydrate, distilled water adjusted to 0° C. was added to dissolve the citric acid.

Then, the entire amount of this aqueous solution was filled in a bottle, and 22.5 g of sodium bicarbonate was further introduced, whereupon it was immediately tightly sealed, followed by shaking for a few tens minutes to dissolve sodium bicarbonate. At that time, the interior of the bottle corresponds to a state where about 40 times by volume of carbon dioxide gas was filled at 0° C. under 1 atm. Then, this filled bottle was left to stand for one day. Thereafter, about ⅓ of the lower portion was immersed in a 0.2 wt % sodium hydroxide aqueous solution, whereby leakage of the gas from the bottom was visually observed, and the time until leakage of gas started was relatively compared and evaluated by →○→∆→X i.e. in the sequential order from one which took the longest time.

Example 3-1

13 kg of high purity terephthalic acid having an average particle size of 120 μm and a slurry of 5.21 kg of ethylene glycol were sequentially supplied over a period of 1.5 hours to an esterification reactor maintained at a temperature of 265° C. under a pressure of $1.5 \times 10^5$ Pa and having 0.3 kg of bis(2-hydroxyethyl)terephthalate preliminarily charged. After completion of the supply, the esterification reaction was carried out for further 0.5 hour. One half of this esterification reaction product was transferred to a polycondesation tank. Further, water formed during the esterification reaction was distilled out of the system, and the ethylene glycol component was recycled to the system.

Then, to the above polycondensation tank to which the esterification reaction product was transferred, an ethylene glycol solution of ethyl acid phosphate, an ethylene glycol solution of tetrabutoxy titanate, an ethylene glycol solution of antimony trioxide and a water/ethylene glycol solution of magnesium acetate tetrahydrate, were sequentially added with intervals of fiver minutes from a pipe in such amounts that 12 ppm of phosphorus atoms (P), 1.8 ppm of titanium atoms (Ti), 120 ppm of antimony atoms (Sb) and 12 ppm of magnesium atoms (Mg) would remain based on the formed polyester resin, whereupon the interior of the system was gradually heated from 250° C. to 278° C., and at the same time the pressure was reduced from atmospheric pressure to 67 Pa, and while maintaining the pressure, the reaction was carried out for 3 hours. The formed polymer was withdrawn in the form of a strand from an outlet formed at the bottom of the polycondensation tank, cooled with ice and cut by a cutter into chips, to obtain polyester resin chips.

Then, the polyester resin chips thus obtained were continuously supplied to an agitation crystallyzer (manufactured by Bepex Company) maintained at 150° C., and crystallized, then transferred to a stationary solid phase polymerization tower, dried at about 140° C. for 3 hours in a nitrogen gas stream of 20 l/kg·hr and then solid phase polycondensed at 210° C. for 20 hours.

With respect to the obtained polyester resin chips, the amount of antimony eluted, the proportion of sophthalic acid as the dicarboxylic acid component in he total dicarboxylic acid component, the proportion of diethylene glycol as a diol component in the total diol component, the carboxylic acid terminal amount, the contents of metal atoms of the respective metal compounds, the aldehyde content and the intrinsic viscosity, were measured by the above-described methods, and the results are shown in Table 3.

Further, the obtained polyester resin chips were dried at 160° C. for 4 hours in a nitrogen stream of 40 l/min in an inert oven ("IPHH-201 model", manufactured by ESPEC COMPANY). Then, by an injection molding machine ("M-70AII-DM", manufactured by Meiki Co., Ltd.), a stepped molded plate having the shape shown in FIG. 1 and having a size of 50 mm×100 mm and having thicknesses of six steps ranging from 6 mm to 3.5 mm in a transverse direction with each step being 0.5 mm, was injection-molded at a cylinder temperature of 280° C. under a back pressure of $5 \times 10^5$ Pa at an injection rate of 40 cc/sec under a dwell pressure of $35 \times 10^5$ Pa at a mold temperature of 25° C. with a molding cycle of about 75 seconds (In FIG. 1, G indicates a gate portion). With respect to the obtained molded plate, the temperature-rising crystallization temperature and the temperature-lowering crystallization temperature, the acetaldehyde content, the absorbance and the haze as an index for transparency, were measured by the above-described methods, and the results are shown in Table 3.

Further, the obtained polyester resin chips were dried at 160° C. for 4 hours in a nitrogen stream of 40 l/min in an inert oven ("IPHH-201 model", manufactured by ESPEC COMPANY). Then, by an injection molding machine ("MINIMAT 8/7A", manufactured by Sumitomo Heavy Industries, Ltd.), a molded plate having a length of 50 mm, a width of 6 mm and a thickness of 1 mm, was injection-molded at a cylinder temperature of 280° C. under a back pressure of $3 \times 10^5$ Pa at an injection rate of 3 cc/sec under a dwell pressure of $20 \times 10^5$ Pa at a mold temperature of 20° C. With respect to the obtained molded plate, the environmental stress rupture time was measured by the above-described method, and the results are shown in Table 3.

Further, the obtained polyester resin chips were dried at 130° C. for 10 hours by a vacuum dryer. Then, by an injection molding machine ("FE-80S", manufactured by Nissei Plastic Industrial Co., Ltd.), a preform of a test tube shape having an outer diameter of about 29 mm, a height of about 165 mm, an average wall thickness of about 3.7 mm and a weight of about 60 g, was injection-molded at a cylinder temperature of 280° C. under a back pressure of $5 \times 10^5$ Pa at an injection rate of 45 cc/sec under a dwell pressure of $30 \times 10^5$ Pa at a mold temperature of 20° C. with a molding cycle of about 40 seconds. The obtained preform was heated for 70 seconds in a near infrared ray irradiation furnace equipped with a quartz heater, left to cool at room temperature for 25 seconds and then introduced into a blow mold set at 40° C. and subjected to blow molding for 40 seconds under a blow pressure of $7 \times 10^5$ Pa for one second and further under a blow pressure of $30 \times 10^5$ Pa for 40 seconds, while stretching in the height direction by a stretching rod, to form a bottle having an outer diameter of about 95 mm, a height of about 305 mm, an average wall thickness at 10 the body portion of about 0.37 mm, a weight of about 60 g and an internal capacity of about 1.5 l. With respect to the obtained bottle, the environmental stress cracking resistance was evaluated by the above-described method, and the results are shown in Table 3.

Example 3-2

Polyester resin chips were produced in the same manner as in Example 3-1 except that 0.229 g of iron tetraoxide ("HR-370H", manufactured by Toda Kogyo Corp.) was added following the addition of the metal compound at the time of polycondensation. The obtained polyester resin was measured and evaluated, and the results are shown in Table 3.

Example 3-3

Polyester resin chips were produced in the same manner as in Example 3-2 except that 12.8 kg of terephthalic acid and 0.2 kg of isophthalic acid were used. The obtained polyester resin was measured and evaluated, and the results are shown in Table 3.

Comparative Example 3-1

13 kg of high purity terephthalic acid having an average particle size of 120 μm and a slurry of 12.2 kg of ethylene glycol were sequentially supplied over a period of 4 hours to an esterification reaction tank maintained at a temperature of 250° C. under a pressure of $1.0 \times 10^5$ Pa and having 0.3 kg of bis(2-hydroxyethyl)terephthalate preliminarily charged. After completion of the supply, the esterification reaction was carried out for further one hour. One half of this esterification reaction product was transferred to a polycondensation tank. Further, water formed during the esterification reaction and the ethylene glycol component were distilled in the entire amounts out of the system.

Then, to the above polycondensation tank to which the esterification reaction product was transferred, from its pipe, an ethylene glycol solution of ethyl acid phosphate and an ethylene glycol solution of antimony trioxide were sequentially added with intervals of 5 minutes in such amounts that 12 ppm of phosphorus atoms (P) and 240 ppm of antimony atoms (Sb) would remain based on the formed polyester resin. Then, the interior of the system was gradually heated from 250 to 278° C., and at the same time, the pressure was reduced from atmospheric pressure to 67 Pa, and while maintaining the same pressure, the reaction was carried out for 3 hours. The formed polymer was withdrawn in the form of a strand from an outlet formed at the bottom of the polycondensation tank, cooled with water and then cut by a cutter into chips, to obtain polyester resin chips. Thereafter, solid phase polycondensation was carried out in the same manner as in Example 3-1. Then, the obtained polyester resin was measured and evaluated, and the results are shown in Table 3.

Comparative Example 3-2

Polyester resin chips were produced in the same manner as in Comparative Example 3-1 except that 110 g of ethylene glycol was added following the addition of the metal compound during polycondensation. The obtained polyester resin was measured and evaluated, and the results are shown in Table 3.

Comparative Example 3-3

13 kg of high purity terephthalic acid having an average particle size of 50 μm and a slurry of 12.2 kg of ethylene glycol, were sequentially supplied over a period of 3.5 hours to an esterification reactor maintained at a temperature of 250° C. under a pressure of $1.0 \times 10^5$ Pa and having 0.3 kg of bis(2-hydroxyethyl)terephthalate preliminarily charged. After completion of the supply, the esterification reaction was carried out for further one hour. One half of this esterification reaction product was transferred to the polycondensation tank.

Further, water formed during the esterification reaction and the ethylene glycol component were distilled in their entire amount out of the system.

Then, to the above polycondensation tank to which the esterification reaction product was transferred, from its pipe, an ethylene glycol solution of ethyl acid phosphate, an ethylene glycol solution of antimony trioxide and a water/ethylene glycol solution of magnesium acetate tetrahydrate, were sequentially added with intervals of 5 minutes in such amounts that 17 ppm of phosphorus atoms (P), 240 ppm of antimony atoms (Sb) and 15 ppm of magnesium atoms (Mg) would remain based on the formed polyester resin, whereupon the interior of the system as gradually heated from 250° C. to 278° C., and at the same time, the pressure was reduced from atmospheric pressure to 67 Pa, and while maintaining the same pressure, the reaction was carried out for 3 hours. The formed polymer was withdrawn in the form of a strand from an outlet formed at the bottom of the polycondensation tank, cooled with water and then cut by a cutter into chips, to obtain polyester resin chips. Thereafter, solid phase polycondensation was carried out in the same manner as in Example 3-1. Then, the obtained polyester resin was measured and evaluated, and the results are shown in Table 3.

TABLE 3

|  | Examples | | |
| --- | --- | --- | --- |
|  | 3-1 | 3-2 | 3-3 |
| Amount of Sb eluted (μg/resin) | 0.19 | 0.19 | 0.27 |
| Sb content (ppm) | 120 | 120 | 120 |
| Ti content (ppm) | 1.8 | 1.8 | 1.8 |
| Mg content (ppm) | 12 | 12 | 12 |
| P content (EAP) (ppm) | 12 | 12 | 12 |
| (100 × Ti + Sb) (ppm) | 300 | 300 | 300 |
| Sb/P (weight ratio) | 10.00 | 10.00 | 10.00 |
| Mg/P (weight ratio) | 1.00 | 1.00 | 1.00 |
| Production process | C | C | C |
| Copolymerized amount of DEG (mol %) | 1.5 | 1.5 | 1.5 |
| Copolymerized amount of IPA (mol %) | 0 | 0 | 1.5 |
| Physical properties of resin | | | |
| Intrinsic viscosity (dl/g) | 0.86 | 0.86 | 0.88 |
| Carboxylic acid terminal number (AV) (equivalents/ton resin) | 30 | 32 | 31 |
| AAo (ppm) | 2.5 | 2.3 | 2.4 |
| Quality of molded product | | | |
| 280° C. AAs (ppm) | 14.8 | 14.4 | 14.5 |
| 280° C. ΔAA (ppm) | 12.3 | 12.1 | 12.1 |
| Temperature-rising crystallization temperature (Tc$_1$) (° C.) | 162 | 162 | 172 |
| Temperature-lowering crystallization temperature (Tc$_2$) (° C.) | 174 | 174 | 162 |
| 280° C. haze (%) | 6 | 14 | 9 |
| 270° C. haze (%) | — | — | 5 |
| 270° C. AAs (ppm) | — | — | 11.2 |
| Environmental stress rupture time (min) | 17 | 16 | 14 |
| Absorbance | 0.04 | 0.09 | 0.08 |

TABLE 3-continued

| Bottle | | | |
| --- | --- | --- | --- |
| Environmental stress cracking resistance | ○ | ⊙ | ⊙ |

|  | Comparative Examples | | |
| --- | --- | --- | --- |
|  | 3-1 | 3-2 | 3-3 |
| Amount of Sb eluted (μg/resin) | 2.0 | 2.0 | 2.0 |
| Sb content (ppm) | 240 | 240 | 240 |
| Ti content (ppm) | 0 | 0 | 0 |
| Mg content (ppm) | 0 | 0 | 15 |
| P content (EAP) (ppm) | 12 | 12 | 17 |
| (100 × Ti + Sb) (ppm) | 240 | 240 | 240 |
| Sb/P (weight ratio) | 20.0 | 20.0 | 14.12 |
| Mg/P (weight ratio) | 0.00 | 0.00 | 0.88 |
| Production process | E | E | E |
| Copolymerized amount of DEG (mol %) | 2.5 | 3.5 | 2.0 |
| Copolymerized amount of IPA (mol %) | 0 | 0 | 0 |
| Physical properties of resin | | | |
| Intrinsic viscosity (dl/g) | 0.83 | 0.88 | 0.87 |
| Carboxylic acid terminal number (AV) (equivalents/ton resin) | 20 | 22 | 18 |
| AAo (ppm) | 2.7 | 2.6 | 2.7 |
| Quality of molded product | | | |
| 280° C. AAs (ppm) | 20.6 | 21.6 | 26.1 |
| 280° C. ΔAA (ppm) | 17.9 | 19.0 | 23.4 |
| Temperature-rising crystallization temperature (Tc$_1$) (° C.) | 149 | 167 | 147 |
| Temperature-lowering crystallization temperature (Tc$_2$) (° C.) | 182 | 167 | 188 |
| 280° C. haze (%) | 20 | 2 | 35 |
| 270° C. haze (%) | 65 | — | — |
| 270° C. AAs (ppm) | — | — | — |
| Environmental stress rupture time (min) | 7 | 4 | 8 |
| Absorbance | 0.06 | 0.06 | 0.06 |
| Bottle | | | |
| Environmental stress cracking resistance | X | X | Δ |

Examples Relating to Polyester ④

Examples for the polyester resin whereby particularly when it is formed into a hollow container to be used by heat sterilization filling, it is possible to obtain a bottle of which the transparency of the body portion will not deteriorate, which is excellent in productivity of a hollow container as the crystallization rate at the mouth stopper portion is high and which is excellent in the dimensional stability of the mouth stopper portion whereby deformation at the mouth stopper portion at the time of heat sterilization filling is little, while suppressing elution of antimony, will be described.

Further, in the Examples of this embodiment, particularly, the following physical properties were measured as follows.

Proportion of Ethylene Terephthalate Units in the Polyester Resin

Using a 3 wt % solution having a resin sample dissolved in deuterated trifluoroacetic acid at room temperature, 1H-NMR was measured by a nuclear magnetic resonance apparatus ("JNM-EX270 model", manufactured by JEOL. Ltd). The respective peaks were identified, and from their integral ratios, dicarboxylic acid components other than terephthalic acid, and diol components other than ethylene glycol were calculated, whereby the proportion of ethylene terephthalate units was obtained.

The Temperature-rising Crystallization Temperature (Tc1) and the Temperature-lowering Crystallization Temperature (Tc2)

The forward end portion (portion A in FIG. 1) in a thickness of 3.5 mm in the molded plate, was cut out and dried at 40° C. for 3 days by a vacuum dryer, whereupon a sample cut out from the non-surface portion was used, and about 10 mg thereof was accurately weighed and sealed in by means of an aluminum oven pan and a pan cover (normal pressure type, "P/N SSC000E030" and "P/N SSC000E032", manufactured by Seiko Denshi K. K.). By means of a differential scanning calorimeter ("DSC220C", manufactured by Seiko K. K.), the sample was heated from 20° C. to 285° C. at a rate of 20° C./min in a nitrogen stream, and the crystallization heat generation peak temperature observed during the temperature rise, was measured and taken as the temperature-rising crystallization temperature ($Tc_1$). Thereafter, it was held in a molten state at 285° C. for 5 minutes and then cooled to 20° C. at a rate of 10° C./min, and the crystallization heat generation peak temperature observed during the temperature drop, was measured and taken as the temperature-lowering crystallization temperature ($Tc_2$).

Example 4-1

40 kg of terephthalic acid and a slurry of 16.1 kg of ethylene glycol were sequentially supplied over 4 hours to an esterification reactor maintained at a temperature of 250° C. under a pressure of $1.2\times10^5$ Pa and having about 50 kg of bis(2-hydroxyethyl)terephthalate preliminarily charged, and after completion of the supply, the esterification reaction was carried out for further one hour. 50 kg of this esterification reaction product was transferred to a polycondensation tank.

Then, to the above polycondensation tank to which the esterification reaction product was transferred, from its pipe, an ethylene glycol solution of ethyl acid phosphate, a water/ethylene glycol solution of magnesium acetate and antimony trioxide, and an ethylene glycol solution of tetra-n-butoxy titanium, were sequentially added with intervals of 5 minutes so that 0.420 mol of phosphorus atoms (P), 0.700 mol of magnesium atoms (Mg), 0.986 mol of antimony atoms (Sb) and 0.021 mol of titanium atoms (Ti) would remain per 1 ton of the polyester resin. Then, further, 582 g of diethylene glycol, a low density polyethylene resin ("UE320", manufactured by Japan Polychem Corporation) were added so that it would be 0.040 ppm based on the weight of the polyester resin. Thereafter, the interior of the system was heated from 250° C. to 280° C. over a period of two hours and 30 minutes, and the pressure was reduced from atmospheric pressure to 400 Pa over a period of one hour and then maintained at the same pressure. Melt polycondensation was carried out for a period of time until the intrinsic viscosity of the obtainable resin became 0.62 dl/g, and the polymer was withdrawn in the form of a strand from an outlet provided at the bottom of the polycondensation tank, cooled with water and then cut by a cutter into chips to obtain about 40 kg of polyethylene terephthalate resin (copolymerized amount of diethylene glycol: 3.4 mol %).

Then, the polyester resin chips thus obtained were continuously supplied to an agitation crystallizer (manufactured by Bepex Company) maintained at about 160° C. so that the retention time would be about 5 minutes, crystallized and then dried at 160° C. for 4 hours in a nitrogen stream of 40 l/min in an inert oven ("IPHH-201 model", manufactured by ESPEC COMPANY), and then heated at 210° C. for a period of time until the intrinsic viscosity became 0.839 dl/g, for solid polycondensation.

With respect to the obtained polyester resin chips, the amount of antimony eluted, the contents of metal atoms derived from the respective metal compounds, the intrinsic viscosity, as well as the acetaldehyde content and color coordinate b as the color tone, were measured, and the results are shown in Table 4.

Further, the obtained polyester resin composition chips were dried at 160° C. for 4 hours in a nitrogen stream of 40 l/min in an inert oven ("IPHH-201 model", manufactured by ESPEC COMPANY). Then, by an injection molding machine ("M-70AII-DM", manufactured by Meiki Co., Ltd.), a stepped molded plate having the shape as shown in FIG. 1 and having a size of 50 mm×100 mm and thicknesses of six steps ranging from 6 mm to 3.5 mm in a transverse direction with each step being 0.5 mm, was injection-molded at a cylinder temperature of 280° C. under a back pressure of $5\times10^5$ Pa at an injection rate of 40 cc/sec under a dwell pressure of $35\times10^5$ Pa at a mold temperature of 25° C. with a molding cycle of about 75 seconds (in FIG. 1, G indicates a gate portion). With respect to the obtained molded plate, the cyclic trimer content, the acetaldehyde content, the temperature-rising crystallization temperature and the temperature-lowering crystallization temperature, and the haze as an index for transparency, were measured by the above-described methods, and the results are shown in Table 4.

Further, the obtained polyester resin composition chips were dried at 130° C. for 10 hours in a vacuum dryer. Then, by an injection molding machine ("FE-80S", manufactured by Nissei Plastic Industrial Co., Ltd.), a preform of a test tube shape having an outer diameter of about 29 mm, a height of about 165 mm, an average wall thickness of about 3.7 mm and a weight of about 60 g, was injection-molded at a cylinder temperature of 280° C. under a back pressure of $5\times10^5$ Pa at an injection rate of 45 cc/sec under a dwell pressure of $30\times10^5$ Pa at a mold temperature of 20° C. with a molding cycle of about 40 seconds. The mouth stopper portion of the obtained preform was heated for from 150 to 180 seconds by a quartz heater type mouth stopper portion crystallizer, and then a mold pin was inserted to carry out crystallization treatment of the mouth stopper portion, and the shape and dimension of the mouth stopper portion at that time were visually observed and evaluated in accordance with the following standards, and the results are shown in Table 4.

Shape and dimension of the mouth stopper portion

◎: constant dimensional precision was obtained.

X: crystallization was inadequate and a distortion was observed in the shape.

Then, the preform having the mouth stopper portion subjected to crystallization treatment, was heated for 70 seconds in a near infrared ray irradiation furnace equipped with a quartz heater, left at room temperature for 25 seconds and then introduced into a blow mold set at 160° C., followed by blow molding under a blow pressure of 7×10⁵ Pa for one second and further under a blow pressure of 30×10⁵ Pa for 40 seconds, while stretching in the height direction by a stretching rod, heat set and then cooled in air to form a bottle having an outer diameter of about 95 mm, a height of about 305 mm, an average wall thickness of the body portion of about 0.37 mm, a weight of about 60 g, an internal capacity of about 1.5 l and a specific surface area of about 0.7 cm⁻¹. With respect to the obtained bottle, the appearance was visually observed and evaluated in accordance with the following standards, and further, the amount of the antimony compound eluted by hot water was measured by the above-described method, and the results are shown in Table 4.

Appearance of the Bottle

⊚: transparency was excellent, and it was good as a whole.

○: transparency was good, it was good as a whole.

X: blackening or whitening observed, and transparency was poor.

Example 4-2

A polyester resin was produced in the same manner as in Example 4-1 except that no low density polyethylene resin was added at the time of melt polycondensation, and with respect to the polyester resin, the amount of antimony eluted, the proportion of ethylene terephthalate units, the contents of metal atoms, the intrinsic viscosity, as well as the amount of antimony eluted, the cyclic trimer content, the acetaldehyde content, and the color tone, were measured. Further, in stepped molded plate was injection-molded, and the cyclic trimer content, the acetaldehyde content, the temperature-rising crystallization temperature and the temperature-lowering crystallization temperature, and the transparency, were measured. Further, a bottle was formed by injection blow molding, and the shape of the mouth stopper portion and the appearance of the bottle were evaluated, and the amount of antimony eluted was measured. The results are shown in Table 4.

Example 4-3

A polyester resin was produced in the same manner as in Example 4-1 except that the low density polyethylene resin was added so that it would be 1,500 ppm based on the weight of the polyester resin, at the time of melt polycondensation. With respect to the polyester resin, the amount of antimony eluted, the proportion of ethylene terephthalate units, the contents of metal atoms, the intrinsic viscosity, as well as the amount of antimony eluted, cyclic trimer content, the acetaldehyde content and the color tone, were measured. Further, a stepped molded plate was injection-molded, and the cyclic trimer content, the acetaldehyde content, the temperature-rising crystallization temperature and the temperature-lowering crystallization temperature, and the transparency, were measured. Further, a bottle was formed by injection blow molding, and the shape of the mouth stopper portion and the appearance of the bottle, were evaluated, and the amount of antimony eluted was measured. The results are shown in Table 4.

Comparative Example 4-1

A polyester resin composition was produced in the same manner as in Example 4-1 except that at the time of melt polycondensation, orthophosphoric acid was used as the phosphorus compound, and the amounts of the phosphorus acid, antimony trioxide and magnesium acetate were changed, and no tetra-n-butoxy titanium was added, and no diethylene glycol or no low density polyethylene resin was added. With respect to the polyester resin, the proportion of ethylene terephthalate units, the contents of metal atoms, the intrinsic viscosity as well as the amount of antimony eluted, the cyclic trimer content, the acetaldehyde content and the color tone, were measured. Further, a stepped molded plate was injection-molded, and the cyclic trimer content, the acetaldehyde content, the temperature-rising crystallization temperature and the temperature-lowering crystallization temperature, and the transparency, were measured. Further, a bottle was formed by injection blow molding, and the shape of the mouth stopper portion and the appearance of the bottle were evaluated, and the amount of antimony eluted, was measured. The results are shown in Table 4.

TABLE 4

|  | Examples | | | Comparative Example |
|---|---|---|---|---|
|  | 4-1 | 4-2 | 4-3 | 4-1 |
| Amount of Sb eluted (μg/resin) | 0.23 | 0.23 | 0.23 | 2.2 |
| Sb content (ppm) | 110 | 110 | 109 | 269 |
| Ti content (ppm) | 1 | 1 | 1 | 0 |
| Mg content (ppm) | 17 | 17 | 17 | 15 |
| P content (EAP) | 13 | 13 | 13 | 15 |
| Sb/P (weight ratio) | 8.45 | 8.46 | 8.38 | 17.93 |
| Mg/P (weight ratio) | 1.31 | 1.31 | 1.31 | 1.00 |
| Production process | C | C | C | E |
| Copolymerized amount of DEG (mol %) | 3.4 | ≦5 | ≦5 | ≦3 |
| Physical properties of resin | | | | |
| Intrinsic viscosity (dl/g) | 0.839 | 0.820 | 0.830 | 0.840 |
| Cyclic trimer content (CT₀) (wt %) | 0.30 | 0.31 | 0.31 | 0.31 |
| Color coordinate b | 2.1 | 2.2 | 1.9 | 2.1 |
| Polyolefin content (ppb) | 0.040 | 0 | 1500 | 0 |
| AAo (ppm) | 1.5 | 1.5 | 1.5 | 2.4 |
| Quality of molded product | | | | |
| 280° C. AAs (ppm) | 19.9 | 20.2 | 19.8 | 22.5 |
| 280° C. ΔAA (ppm) | 18.4 | 18.7 | 18.3 | 20.1 |
| 280° C. CTs (wt %) | 0.40 | 0.42 | 0.41 | 0.42 |
| 280° C. ΔCT (wt %) | 0.10 | 0.11 | 0.10 | 0.11 |
| Temperature-rising crystallization temperature (Tc₁) (° C.) | 162.0 | 166.7 | 149.0 | 155.5 |
| Temperature-lowering crystallization temperature (Tc₂) (° C.) | 176.3 | 176.8 | 185.2 | 190.2 |
| 280° C. haze (%) | 4.1 | 4.2 | 35.5 | 36.5 |
| 270° C. haze (%) | 5 | — | — | 85 |
| 270° C. AAs (ppm) | 13.4 | — | — | 15.2 |
| 270° C. CTs (wt %) | 0.35 | — | — | 0.36 |

TABLE 4-continued

|  | Examples | | | Comparative Example |
| --- | --- | --- | --- | --- |
|  | 4-1 | 4-2 | 4-3 | 4-1 |
| Bottle | | | | |
| Amount of Sb eluted (ppb) | 0.8 | 0.8 | 0.8 | 1.1 |
| Shape and dimension of mouth stopper portion | ○ | X | ○ | ○ |
| Appearance of bottle | ⊙ | ⊙ | X | X |

Examples Relating to Polyester ⑤

Now, it will be shown that the polyester resin of the present invention can be molded without losing transparency even when the molding temperature is set to be lower than ever, whereby formation of acetaldehyde during the molding and contamination of the mold during the molding can be suppressed, and it is possible to obtain a molded product excellent also in transparency, and it is thus suitable for a hollow container.

Namely, the following evaluations were carried out in Examples 1-1, 1-9, 2-1, 3-3 and 4-1, and Comparative Examples 1-2, 2-2 and 3-1, and the results are shown in Tables 1, 2, 3 and 4.

Namely, a resin obtained in each Example was dried at 160° C. for 16 hours in a vacuum dryer ("DP-41 model", manufactured by YAMATO SCIENTIFIC CO., LTD.). Then, by an injection molding machine ("M-70AII-DM", manufactured by Meiki Co., Ltd.), a stepped molded plate having the shape shown in FIG. 1 and having a size of 50 mm×100 mm and thicknesses of six steps ranging from 6 mm to 3.5 mm in a transverse direction with each step being 0.5 mm, was injection-molded at a cylinder temperature of 270° C. under a back pressure of $5 \times 10^5$ Pa at an injection rate of 40 cc/sec under a dwell pressure of $35 \times 10^5$ Pa at a mold temperature of 25° C. with a molding cycle of about 75 seconds. Further, in FIG. 1, G indicates a gate portion.

With respect to the molded plate, the haze, the acetaldehyde content ($AA_s$) and the cyclic trimer content ($CT_s$) were measured by the following methods, and the results are shown in Table 1.

270° C. Haze

With respect to the portion having a thickness of 5.0 mm (portion C in FIG. 1) in the molded plate, the haze was measured by means of a haze meter ("NDH-300A", manufactured by NIPPON DENSHOKU INDUSTRIES CO., LTD.).

Acetaldehyde (270° C. $AA_s$)

A chip of 4×4 mm was cut out from the rear end portion having a thickness of 3.5 mm (portion B in FIG. 1) in the molded plate, and using the chip as a sample, it was measured by the same method as described above.

Cyclic Trimer Content (270° C. $CT_s$)

Using a sample cut out from the forward end portion having a thickness of 3.5 mm (portion A in FIG. 1) in the molded plate, it was measured by the same method as described above.

Examples Relating to Polyester ⑥

Now, Examples for the polyester resin whereby the number of particles in the interior of the resin can be minimized so that thread breakage or film rupture caused by such particles will not substantially occur at the time of molding fibers or films, and projections such as fish eyes will not substantially form on the surface, when it is formed into a molded product such as a film or bottle, will be described.

In the Examples of this embodiment, particularly the following physical properties were measured as follows.

Number of Particles in the Interior of the Resin 10 kg of a sample resin was subjected to crystallization and drying of chips in a hot air dryer at 180° C. for two hours, whereby the moisture in the chips became not more than 100 ppm. This resin was extruded by a 40 mmφ single screw extruder at a resin temperature of 285° C. at an extrusion rate of 8 kg/hr while filtering by means of a metal fiber sintered filter (95% cut filtration precision: 15 µm), and by tubular molding, a non-stretched film having a thickness of 210 µm and width of 10 cm was obtained. At that time, the extruder die was a 4-threaded spiral die of 80 mmφ, and the cooling ring was one equipped with a 60 mmφ internal water-cooling jacket.

The obtained film was peeled along the bonded face at the time of the tubular molding to expose an immaculate surface, which is used as a sample for microscopic examination.

A CCD camera is mounted on a trinocular head of a phase contrast microscope (OPTIPHOT XF-Ph model, manufactured by Nikon Corporation, objective lens: 40X), and by means thereof, a variable-density images will be input to an image treating apparatus (SPICCA-II model, manufactured by Nippon Avionics Co., Ltd.). In the case of this construction, on the display, the magnification is about 1,000 times, and the visual field is 0.123 mm×0.114 mm.

The measuring operation was carried out as follows.

The focus was adjusted on the front side and the rear side of a film sample, to confirm the range of the film thickness. Then, while carrying focal scanning from the front side to the rear side in an accumulable input mode of variable-density images by an image treating apparatus, the images are taken in, and particles having an absolute maximum length (*) of at least 1 µm, were counted.

This operation was repeated three times at different visual fields, and the average number thereof was calculated per 0.01 $mm^3$ of the film volume and taken as "the number of particles having a long diameter of at least 1 µm in the interior of the resin".

* "Absolute maximum length": The length corresponding to the maximum distance between optional two points on the circumference of an object (a particle) detected by the image treating apparatus.

Quantitative Analysis of the Diethylene Glycol Component 50 ml of a 4N-KOH/methanol solution was added to 5.00 g of a sample resin pulverized by a Willette type pulverizer (model: 1029-A) manufactured by Yoshida Co., Ltd. by means of a perforated plate having 1.5 mm holes, and a reflux condenser was set. Then, it was heated and refluxed for hydrolysis for two hours while stirring on a hot plate (surface temperature: 200° C.) equipped with a magnetic stirrer. After cooling, about 20 g of high purity terephthalic acid was added, followed by shaking thoroughly for neutralization to obtain a slurry having a pH of not higher than 9, which was filtered by means of a 11G-4 glass filter and then washed twice with 2 ml of methanol. The filtrate and the washing liquids were put together to obtain a sample liquid for gas chromatography. By a microsyringe, 1 $\mu$l of the sample liquid was injected to a gas chromatography of Shimadzu Corporation (model: GC-14APF), and from the areas of peaks, mol % of a diethylene glycol component based on the total glycol component was calculated in accordance with the following formula.

mol % of the diethylene glycol component=(ACO× CfCO)/($\Sigma$(A×Cf))×100

ACO: area of the diethylene glycol component ($\mu$V·sec)

CfCO: correction coefficient of the diethylene glycol component

A: area of each glycol component ($\mu$V·sec)

Cf: correction coefficient of each glycol component

The conditions for using the gas chromatography were as follows.

| Column: | "DB-WAX", manufactured by J&W (0.53 mm × 30 m) | |
|---|---|---|
| Set temperatures: | Column: | 160° C. to 220° C. |
| | Vaporizing chamber: | 230° C. |
| | Detector: | 230° C. |
| Gas flow rates: | Carrier (nitrogen): | 5 ml/min |
| | Hydrogen: | 0.6 kg/cm$^2$ |
| | Air: | 0.6 kg/cm$^2$ |
| Detector: | FID | |
| Sensitivity | 102 M$\Omega$ | |

Quantitative Analysis of Carboxylic Acid Terminal Number

Chips were pulverized, then dried at 140° C. for 15 minutes by a hot air drier and cooled to room temperature in a desiccator to obtain a sample. From this sample, 0.1 g was accurately weighed and put into a test tube and after an addition of 3 ml of benzyl alcohol, dissolved at 195° C. for 3 minutes while blowing dry nitrogen gas thereto. Then, 5 ml of chloroform was gradually added, followed by cooling to room temperature. To this solution, a phenol red indicator was added in an amount of one or two drops, followed by titration with a 0.1N sodium hydroxide benzyl alcohol solution with stirring while blowing dry nitrogen gas thereto. The titration was terminated at a time point where the color changed from yellow to red. Further, as a blank, the same operation was carried out without using the polyester resin sample, and the acid number was calculated by the following formula.

Acid number (mol/ton)=(A−B)×0.1×f/W [where A is the amount ($\mu$l) of the 0.1N sodium hydroxide benzyl alcohol solution required for the titration, B is the amount ($\mu$l) of the 0.1N sodium hydroxide benzyl alcohol solution required for the titration of the blank, W is the amount (g) of the polyester resin sample, and f is the titer of the 0.1N sodium hydroxide benzyl alcohol solution.]

For the titer (f) of the 0.1N sodium hydroxide benzyl alcohol solution, 5 ml of methanol was taken into a test tube and, after adding an ethanol solution of phenol red as an indicator in an amount of one or two drops, titration was carried out to the point of color change with 0.4 ml of the 0.1N sodium hydroxide benzyl alcohol solution. Then, 0.2 ml of a 0.1N hydrochloric acid aqueous solution having a known titer was added as a standard solution, followed by titration against the point of color change with the 0.1N sodium hydroxide benzyl alcohol solution. (the foregoing operation was carried out while blowing dry nitrogen gas thereto.) The titer (f) was calculated by the following formula.

Titer (f)=titer of the 0.1N hydrochloric acid aqueous solution×amount ($\mu$l) of the 0.1N hydrochloric acid aqueous solution/titrated amount ($\mu$l) of the 0.1N sodium hydroxide benzyl alcohol solution Volume Resistivity Into a branched test tube having an inner diameter of 20 mm and a length of 18 cm, 15 g of a sample was put, after thoroughly replacing the interior of the system with nitrogen, this test tube was immersed in an oil bath of 160° C., and by means of a vacuum pump, inside of the tube was brought to not more than 1 Torr and vacuum-dried for 4 hours. Then, the temperature of the bath was raised to 285° C. to melt the sample. Then, nitrogen supply and vacuuming were repeated to remove the contained air babbles. Then, in this melt, stainless steel electrodes (two sheets of stainless steel electrodes having an area of 1 cm$^2$ disposed in parallel with a distance of 5 mm, and the rear sides not facing, were covered with an insulating material) were inserted. After the temperature was sufficiently stabilized, 100V of direct current voltage was applied by a high resistance meter (MODEL HP4329A), manufactured by Hewlett-Packard Company, and the resistance at the time of the application was taken as the volume resistivity ($\Omega$·cm).

Evaluation of Forming a Film

In the same method as the method disclosed in the section for the method for measurement the number of particles in the interior of the resin, a non-stretched film was prepared by tubular extrusion.

The obtained non-stretched film was subjected to stretching and heat setting under the following conditions by a biaxial stretching machine manufactured by T.M. Long Company, to obtain a biaxially stretched film.

Preheating and heat setting temperature: 92° C.

Preheating time: 2 minutes

Stretching ratio: 4.0 times×3.5 times

Stretching rate: 20,000%/min (3,000 cm/min)

Stretching method: simultaneous biaxial stretching

Heat setting time: 1 minute

The obtained biaxially stretched film was bonded to a square metal frame made of SUS, and aluminum was vapor deposited on the film surface in a vacuum vapor deposition machine. Then, on its surface, a frame of 2 cm×2.5 cm was marked at random, and the number of coarse projections in that area was observed by a two-beam microscope using, as a light source, white light of a halogen lamp filtered through a G filter.

As observed by the two-beam microscope, the coarse projections are observed as contour lines of closed interference fringes, and the higher the projections, the more the number of contour lines, i.e. as a projection becomes high, the degree of fringes increases in the order of a single circle, a double circle, . . . .

The number is visually counted and converted to the number in 10 cm$^2$ of the film surface, which is taken as the number of coarse surface projections in the film.

L1: one wherein the degree of fringes is single

L2: one wherein the degree of fringes is double

L3: one wherein the degree of fringes is triple Under such measurement conditions:

L1 means one having a height of from 0.27 μm to less than 0.54 μm;

L2 means one having a height of from 0.54 μm to less than 0.81 μm; and

L3 means one having a height of from 0.81 μm to less than 1.08 μm.

Evaluation of Forming Fibers

The polyester resin chips were dried and then supplied to an extruder type spinning machine, and using a spinneret having circular holes each having a diameter of 0.6 mm, continuous extrusion was carried out at a spinning temperature of 295° C. for 48 hours, whereby presence or absence of deposition of spinneret contaminants around the discharge portions of the spinneret was visually confirmed.

Example 5-1

A polyethylene terephthalate was continuously produced by means of a continuous polymerization apparatus as shown in FIG. 2, comprising a slurry preparation tank composed of a single agitation tank, esterification reactors composed of two agitation tanks connected in series, and a total of three melt polycondensation reactors comprising an agitation tank and two horizontal plug flow type reactors following it.

To the slurry preparation tank 1, ethyl acid phosphate in such an amount that 9 ppm of phosphorus atoms would remain per 1 kg of the formed polyester resin, and terephthalic acid and ethylene glycol, were supplied so that the ratio of terephthalic acid:ethylene glycol=865:485 (weight ratio), to obtain a slurry. This slurry was continuously supplied to the first stage esterification reactor 2 and then to the second stage esterification reactor 3. The reaction conditions in the esterification reactors were adjusted to be a temperature of 260° C. and a relative pressure of from 50 to 5 KPa (from 0.5 to 0.05 kg/cm$^2$G) in a nitrogen atmosphere, and the esterification ratio in the first stage esterification reactor was 85%, and the esterification ratio in the second stage esterification reactor was 95%.

At that time, from an upper pipe provided on the second stage esterification reactor 3, magnesium acetate tetrahydrate was continuously supplied in such an amount that 30 ppm of magnesium atoms would remain per 1 kg of the formed polyester resin.

The esterification reaction product was continuously supplied via a conduit 5 to the first stage melt polycondensation reactor 6, then to the second stage melt polycondensation reactor 7 and then to the third melt polycondensation reactor 8. At an intermediate point of the conduit 5, tetrabutyl titanate in such an amount that 2.0 ppm of titanium atoms would remain per 1 kg of the formed polyester resin, and antimony trioxide in such an amount that 90 ppm of antimony atoms would remain per 1 kg of the formed polyester resin, were continuously added to the esterification reaction product via a conduit 4.

The reaction conditions in the melt polycondensation reactors were such that in the first stage, the temperature was 270° C. and the absolute pressure was 2.6 KPa (20 Torr), in the second stage, the temperature was 278° C. and the absolute pressure was 0.5 KPa (4Torr), and in the third stage, the temperature was 280° C. and the absolute pressure was 0.3 KPa (2 Torr), and the total polymerization time was three hours and 30 minutes. The melt polycondensation reaction product was extruded from the die in the form of a strand, cooled and solidified, and then cut by a cutter to obtain melt polymerized chips having an average weight of 24 mg each. The intrinsic viscosity of such chips was 0.65 dl/g, the number of particles in the interior of the resin was 5.5 particles/0.01 mm$^3$, the content of diethylene glycol component was 1.5 mol % based on the total diol component, the carboxylic acid terminal number was 35 equivalents/t, and value b in the Hunter's color coordinate was 1.5. Further, the obtained chips were subjected to the measurement of the volume resistivity, evaluation of formation of a film and evaluation of forming fibers. The analytical values and evaluation results are shown in Table 5.

Examples 5-2 to 5-4

A polyester resin was obtained in the same manner as in Example 5-1 except that the amount of ethyl acid phosphate added was changed so that the amount of phosphorus atoms per 1 kg of the formed polyester resin would be the remaining amount shown in Table 5. The analytical values and evaluation results are shown in Table 5.

Examples 5-5 to 5-7

A polyester resin was obtained in the same manner as in Example 5-1 except that the amount of antimony trioxide added was changed so that the amount of antimony atoms per 1 kg of the formed polyester resin would be the remaining amount shown in Table 5. The analytical values and evaluation results are shown in Table 5.

Examples 5-8 to 5-10

A polyester resin was obtained in the same manner as in Example 5-1 except that the amount of ethyl acid phosphate and the amount of antimony trioxide added, were changed so that the amounts of phosphorus atoms and antimony atoms, per 1 kg of the remaining polyester resin, would be the remaining amounts shown in Table 5 respectively. The analytical values and evaluation results are shown in Table 5.

Examples 5-11 to 5-12

A polyester resin was obtained in the same manner as in Example 5-1 except that the amount of magnesium acetate tetrahydrate added was changed so that the amount of magnesium atoms per 1 kg of the formed polyester resin would be the remaining amount shown in Table 5. The analytical values and evaluation results are shown in Table 5.

Example 5-13

A polyester resin was obtained in the same manner as in Example 5-1 except that the type of the phosphorus compound added was changed to orthophosphoric acid. The analytical values and evaluation results are shown in Table 5.

Comparative Example 5-1

The esterification apparatus used was a three stages perfect mixing tank type continuous esterification reaction apparatus which comprises a first esterification reactor provided with a stirring means, a partial condenser, a feed inlet and a product outlet and a second esterification reactor wherein the interior of the reactor is divided into two tanks, each reaction tank being provided with a stirring means, a partial condenser, a feed inlet and a product outlet. An EG slurry of TPA having the molar ratio of EG to TPA adjusted to 1.7, was continuously supplied to a system in the first esterification reactor where the reaction product was present. Simultaneously, an EG solution of magnesium acetate tetrahydrate was continuously supplied from an inlet separate from the inlet for the EG slurry of TPA, so that Mg atoms would be 0.82 mol per 1 ton of the formed polyester resin (i.e. about 20 ppm based on the formed polyester resin, and the reaction was carried out under normal pressure-at a temperature of 255° C. for an average retention time of four hours. This reaction product was continuously withdrawn out of the system and supplied to the first tank of the second esterification reactor and continuously withdrawn from the second tank. For the transfer from the first tank to the second tank, an overflow system was employed. From the inlet of the first tank, an EG solution of phosphoric acid in such an amount that P atoms would be 0.16 mol (about 5 ppm) per 1 ton of the formed polyester resin, and from the inlet of the second tank, an EG solution of phosphoric acid in such an amount that P atoms would be 0.60 mol (about 19 ppm) per 1 ton of the formed polyester resin, were continuously added and reacted under normal pressure at a temperature of 260° C. for an average retention time of 2.5 hours in each tank.

Then, the esterification reaction product was continuously withdrawn from the second esterification reactor and continuously supplied to a continuous polycondensation reactor of two stages provided with a stirring means, a partial condenser, a feed inlet and a product outlet. From a pipe for supplying a polycondensation catalyst, connected to the transportation pipe for the esterification reaction product, an EG solution of antimony trioxide in such an amount that Sb atoms would be 0.66 mol (about 80 ppm) per 1 ton of the formed polyester resin, and an EG solution of tetrabutyl titanate in such an amount that Ti atoms would be 0.06 mol (about 3 ppm) per 1 ton of the formed polyester resin, were supplied to the esterification reaction product, and in the above-mentioned continuous polycondensation reactor, polycondensation was carried out at about 270° C. under reduced pressure. The total polymerization time was 3 hours and 19 minutes. The melt polycondensation product was extruded from a die in the form of a strand, cooled and solidified, and then cut by a cutter to obtain melt polymerized chips having an average weight of 24 mg each. The intrinsic viscosity of the chips was 0.52 dl/g, the number of particles in the interior of the resin was 5.5 particles/0.01 mm$^3$, the content of the diethylene glycol component was 2.8 mol % based on the total diol component, the carboxylic acid terminal number was 30 equivalents/t, and value b in the Hunter's color coordinate was 1.0. Further, the obtained chips were subjected to the measurement of the volume resistivity, the evaluation of formation of a film and the evaluation of formation of fibers. The analytical values and evaluation results are shown in Table 5.

Comparative Example 5-2

A polyester resin was obtained in the same manner as in Example 5-1 except that no tetrabutyl titanate was added, the amount of ethyl acid phosphate to be added and the amounts of magnesium acetate tetrahydrate and antimony trioxide, were adjusted so that phosphorus atoms, magnesium atoms and antimony atoms would be in the remaining amounts as identified in Table 5, respectively, per 1 kg of the formed polyester resin, and the magnesium acetate tetrahydrate and the antimony trioxide were mixed and continuously added via a conduit 4 to the esterification reaction product in an intermediate point of the conduit 5. The analytical values and evaluation results are shown in Table 5.

Comparative Example 5-3

100 parts of dimethyl terephthalate and 70 parts of ethylene glycol were subjected to ester exchange reaction by adding, as ester exchange catalysts, calcium acetate monohydrate and magnesium acetate tetrahydrate so that calcium atoms and magnesium atoms would be in the remaining amounts as identified in Table 5, respectively, per 1 kg of the formed polyester resin, and further, after 20 minutes from the initiation of distillation of methanol, adding antimony trioxide so that antimony atoms would be in the remaining amount as shown in Table 5 per 1 kg of the formed polyester resin. Then, trimethyl phosphate (TMP) was added so that phosphorus atoms would be in the remaining amount as identified in Table 5 per 1 kg of the formed polyester resin, thereby to substantially terminate the ester exchange reaction. Further, tetrabutyl titanate was added so that titanium atoms would be in the remaining amount as identified in Table 5 per 1 kg of the formed polyester resin, and then continuously, polycondensation was carried out in a high temperature high vacuum condition in accordance with a usual method. The melt polycondensation reaction product was extruded from a die in the form of a strand, cooled and solidified, and then cut by a cutter to obtain melt polymerized chips having an average weight of 24 mg each. The obtained chips were subjected to the measurement of the volume resistivity, the evaluation of forming a film and the evaluation of forming fibers. The analytical values and evaluation results are shown in Table 5.

Comparative Example 5-4

254 parts by weight of bis(β-hydroxyethyl)terephthalate and 83 parts by weight of terephthalic acid were introduced into a polymerization reactor having a rectifying column and then heated to 250° C. with stirring while supplying a very small amount of nitrogen. During this period, ethylene glycol was refluxed, only water formed, was distilled off out of the system. When the ester exchange ratio reached 80%, as calculated from the amount of water distilled, 1.7 parts by weight of a liquid solution in ethylene glycol of 2 wt % of antimony trioxide and 0.12 wt % of tetrabutyl titanate, 3.3 parts by weight of a 5 wt % ethylene glycol solution of magnesium acetate (as metal atoms, antimony: 100 ppm, titanium: 1 ppm, and magnesium: 65 ppm, based on the finally obtainable polymer) and 1.3 parts by weight of a 5 wt % ethylene glycol solution of trimethyl phosphoric acid (50 ppm as phosphorus atoms based on the finally obtainable polymer) were introduced. Then, while continuing heating and stirring, the pressure was gradually lowered, and over a period of about one hour, inside of the reactor was brought to a highly vacuumed condition of not more than 5 torr. During this period, the temperature was raised to 285° C. In this state, polymerization was continued for 189 minutes since the pressure was brought to a highly vacuumed condition of not more than 5 torr. The melt polycondensation reaction product was extruded from a die in the form of a strand, cooled and solidified, and then cut by a cutter to obtain melt polymerized chips having an average weight of 24 mg each. The obtained chips were subjected to the measurement of the volume resistivity, the evaluation of forming a film, and the evaluation of forming fibers. The analytical values and evaluation results are shown in Table 5.

TABLE 5

| | Examples | | | | | | | | |
|---|---|---|---|---|---|---|---|---|---|
| Amount of Sb eluted | 5-1 | 5-2 | 5-3 | 5-4 | 5-5 | 5-6 | 5-7 | 5-8 | 5-9 |
| ($\mu$g/resin) | 0.12 | 0.14 | 0.12 | 0.11 | 0.1 | 0.15 | 0.41 | 0.11 | 0.12 |
| Sb content (ppm) | 90 | 90 | 90 | 90 | 70 | 120 | 180 | 40 | 40 |
| T content (ppm) | 2 | 2 | 2 | 2 | 2 | 2 | 2 | 4.5 | 4.5 |
| Ti content (ppm) | 2 | 2 | 2 | 2 | 2 | 2 | 6 | 4.5 | 4.5 |
| M' content (ppm)* | 30 | 30 | 30 | 30 | 30 | 30 | 30 | 30 | 30 |
| Mg content (ppm) | 30 | 30 | 30 | 30 | 30 | 30 | 30 | 30 | 30 |
| Ca content (ppm) | 0 | 0 | 0 | 0 | 0 | 0 | 0 | 0 | 0 |
| P content (EAP) (ppm) | 9 | 12 | 6 | 3 | 9 | 9 | 9 | 6 | 3 |
| P content (TMP) (ppm) | 0 | 0 | 0 | 0 | 0 | 0 | 0 | 0 | 0 |
| P content (H3P04) (ppm) | 0 | 0 | 0 | 0 | 0 | 0 | 0 | 0 | 0 |
| Sb/P (weight ratio) | 10.0 | 7.5 | 15.0 | 30.0 | 7.8 | 13.3 | 20.0 | 6.7 | 13.3 |
| Mg/P (weight ratio) | 3.33 | 2.50 | 5.00 | 10.00 | 3.33 | 3.33 | 3.33 | 5.00 | 10.00 |
| Production process | B | B | B | B | B | B | B | B | B |
| Polymerization time hours:minutes | 3:30 | 3:40 | 3:20 | 3:10 | 4:30 | 2:37 | 1:45 | 3:20 | 3:10 |
| Copolymerized amount of DEG (mol %) | 1.5 | 1.6 | 1.4 | 1.1 | 1.4 | 1.3 | 1.1 | 1.4 | 1.3 |
| Physical properties of resin | | | | | | | | | |
| Intrinsic viscosity (dl/g) | 0.65 | 0.65 | 0.65 | 0.65 | 0.65 | 0.65 | 0.65 | 0.65 | 0.65 |
| Color coordinate b | 1.5 | 1.2 | 2.0 | 3.7 | 1.9 | 1.1 | 0.8 | 4.6 | 8.3 |
| Carboxylic acid terminal number (AV) (equivalents/ton resin) | 35 | 30 | 40 | 45 | 35 | 20 | 14 | 26 | 25 |
| Number of particles in the interior of resin particles/0.01 mm$^3$ | 5.5 | 7.3 | 3.6 | 1.8 | 4.3 | 7.3 | 10.9 | 1.6 | 0.8 |
| Volume resistivity $\Omega$.cm | 3.0E + 07 | 2.3E + 07 | 4.5E + 07 | 9.0E + 07 | 3.0E + 07 | 3.0E + 07 | | | |
| Evaluation of film Number of projections on the surface | | | | | | | | | |
| Number of F1 | 51 | 67 | 34 | 18 | 40 | 67 | | | |
| Number of F2 | 1 | 2 | 1 | 0 | 1 | 2 | | | |
| Number of F3 | 0 | 0 | 0 | 0 | 0 | 0 | | | |
| Evaluation of fibers | | | | | | | | | |
| Contamination of spinneret | No | No | No | No | No | No | | | |

TABLE 5-continued

|  | | | |
|---|---|---|---|
| Volume resistivity Ω.cm | 3.0E + 07 | 4.5E + 07 | 9.0E + 07 |
| Evaluation of film |  |  |  |
| Number of projections on the surface |  |  |  |
| Number of F1 | 100 | 16 | 9 |
| Number of F2 | 3 | 0 | 0 |
| Number of F3 | 0 | 0 | 0 |
| Evaluation of fibers |  |  |  |
| Contamination of spinneret | No | No | No |

| | Examples | | | |
|---|---|---|---|---|
| Amount of Sb eluted | 5-10 | 5-11 | 5-12 | 5-13 |
| (μg/resin) | 0.14 | 0.1 | 0.13 | 0.24 |
| Sb content (ppm) | 120 | 90 | 90 | 90 |
| T content (ppm) | 1.5 | 2 | 2 | 2 |
| Ti content (ppm) | 1.5 | 2 | 2 | 2 |
| M' content (ppm)* | 30 | 15 | 60 | 30 |
| Mg content (ppm) | 30 | 15 | 60 | 30 |
| Ca content (ppm) | 0 | 0 | 0 | 0 |
| P content (EAP) (ppm) | 18 | 9 | 9 | 0 |
| P content (TMP) (ppm) | 0 | 0 | 0 | 0 |
| P content (H3P04) (ppm) | 0 | 0 | 0 | 9 |
| Sb/P (weight ratio) | 6.7 | 10.0 | 10.0 | 10.0 |
| Mg/P (weight ratio) | 1.67 | 1.67 | 6.67 | 3.33 |
| Production process | B | B | B | B |
| Polymerization time hours:minutes | 4:00 | 3:45 | 3:15 | 3:51 |
| Copolymerized amount of DEG (mol %) | 1.6 | 1.5 | 1.5 | 1.5 |
| Physical properties of resin |  |  |  |  |
| Intrinsic viscosity (dl/g) | 0.65 | 0.65 | 0.65 | 0.65 |
| Color coordinate b | 0.7 | 1.7 | 1.3 | 1.8 |
| Carboxylic acid terminal number (AV) (equivalents/ton resin) | 31 | 35 | 46 | 35 |
| Number of particles in the interior of resin particles/0.01 mm³ | 14.6 | 5.5 | 5.5 | 13.7 |
| Volume resistivity Ω.cm | 1.5E + 07 | 7.5E + 06 | 1.2E + 08 | 3.0E + 07 |
| Evaluation of film |  |  |  |  |
| Number of projections on the surface |  |  |  |  |
| Number of F1 | 133 | 51 | 51 | 124 |
| Number of F2 | 4 | 1 | 1 | 4 |
| Number of F3 | 0 | 0 | 0 | 0 |
| Evaluation of fibers |  |  |  |  |
| Contamination of spinneret | No | No | No | No |

TABLE 5-continued

| | Comparative Examples | | | |
|---|---|---|---|---|
| Amount of Sb eluted | 5-1 | 5-2 | 5-3 | 5-4 |
| (μg/resin) | 1.8 | 1.5 | 1.2 | 1.9 |
| Sb content (ppm) | 80 | 180 | 47 | 100 |
| T content (ppm) | 3 | — | 5 | 1 |
| Ti content (ppm) | 3 | — | 5 | 1 |
| M' content (ppm)* | 24 | 57 | 114 | 65 |
| Mg content (ppm) | 24 | 57 | 47 | 65 |
| Ca content (ppm) | 0 | 0 | 67 | 0 |
| P content (EAP) (ppm) | 0 | 90 | 0 | 50 |
| P content (TMP) (ppm) | 0 | 0 | 40 | 0 |
| P content (H3P04) (ppm) | 20 | 0 | 0 | 0 |
| Sb/P (weight ratio) | 4.0 | 2.0 | 1.2 | 2.0 |
| Mg/P (weight ratio) | 1.20 | 0.63 | 1.18 | 1.30 |
| Production process | E | E | D | E |
| Polymerization time hours:minutes | 3:19 | 3:30 | 3:03 | 6:20 |
| Copolymerized amount of DEG (mol %) | 2.8 | 1.9 | 1.7 | 1.9 |
| Physical properties of resin |  |  |  |  |
| Intrinsic viscosity (dl/g) | 0.52 | 0.65 | 0.60 | 0.62 |
| Color coordinate b | 1.0 | 0.3 | 0.8 | 0.2 |
| Carboxylic acid terminal number (AV) (equivalents/ton resin) | 30 | 30 | 50 | 50 |
| Number of particles in the interior of resin particles/0.01 mm³ | 27.0 | 122.0 | 54.0 | 68.0 |
| Volume resistivity Ω.cm | 8.6E + 06 | 1.1E + 07 | 4.0E + 07 | 2.5E + 07 |
| Evaluation of film |  |  |  |  |
| Number of projections on the surface |  |  |  |  |
| Number of F1 | 244 | 1099 | 487 | 613 |
| Number of F2 | 8 | 36 | 16 | 20 |
| Number of F3 | 3 | 12 | 5 | 7 |
| Evaluation of fibers |  |  |  |  |
| Contamination of spinneret | Yes | Yes | Yes | Yes |

*M' indicates the sum of contents of Mg and Ca.

Industrial Applicability

According to the present invention, it is possible to provide a polyester resin which is polycondensed in the presence of an antimony compound and whereby elution of antimony is suppressed, and a process for producing a polyester resin, whereby such a polyester resin can suitably be obtained.

The entire disclosures of japanese patent application no. 2001-16535 filed on Jan. 25, 2001 and Japanese patent application No. 2001-297454 filed on Sep. 27, 2001 including specifications, claims, drawings and summaries are incorporated herein by reference in their entireties.

What is claimed is:

1. A polyester resin produced by polycondensing a dicarboxylic acid component containing an aromatic dicarboxylic acid or its ester-forming derivative as the main component and a diol component containing ethylene glycol as the main component in the presence of at least an antimony compound and a phosphorus compound, via an esterification reaction or an ester exchange reaction, which is characterized in that the amount of antimony eluted when immersed in hot water of 95° C. for 60 minutes in the form of particles having a number average particle weight of 24 mg, is not more than 1 pg per 1 g of the polyester resin, as antimony atoms (Sb).

2. The polyester resin according to claim 1, characterized in that the difference ($\Delta AA = AA_s - AA_o$) between the acetaldehyde content ($AA_s$; ppm) in a molded product when injection-molded at 280° C. and the acetaldehyde content ($AA_o$; ppm) before the injection molding, is not more than 20 ppm.

3. The polyester resin according to claim 2, wherein the ratio (Sb/P) of the content (weight ppm) as antimony atoms (Sb) of the antimony component to the content (weight ppm) as phosphorus atoms (P) of the phosphorus component in the polyester resin, is from 6.0 to 30.

4. The polyester resin according to claim 2, wherein the content as phosphorus atoms (P) of the phosphorus component in the polyester resin is from 0.1 to 20 weight ppm.

5. The polyester resin according to claim 2, which is poly-condensed in the coexistence of a compound of at least one metal element selected from the group consisting of Groups 1A and IIA of the Periodic Table, zinc, aluminum, gallium, germanium, titanium, zirconium, hafnium, manganese, iron and cobalt, and wherein the total content as metal atoms (M) of such metal element components in the polyester resin, is from 0.1 to 100 weight ppm.

6. The polyester resin according to claim 5, wherein the coexistent compound is a magnesium compound, and the ratio (Mg/P) of the content (weight ppm) as magnesium atoms (Mg) of the magnesium component to the content (weight ppm) as phosphorus atoms (P) of the phosphorus component in the polyester resin, is from 1.1 to 3.0.

7. The polyester resin according to claim 5, wherein the coexistent compound is a magnesium compound, and the content as magnesium atoms (Mg) of the magnesium component in the polyester resin is from 0.1 to 30 weight ppm.

8. The polyester resin according to claim 5, wherein the coexistent compound is a titanium compound, and the content as titanium atoms (Ti) of the titanium component in the polyester resin is from 0.25 to 10 weight ppm.

9. The polyester resin according to claim 2, wherein the content as antimony atoms (Sb) of the antimony component in the polyester resin is from 10 to 250 weight ppm.

10. The polyester resin according to claim 2, wherein the atomic valence of phosphorus element in the phosphorus component is trivalent.

11. A molded product obtainable from the polyester as defined in claim 1.

12. The polyester resin according to claim 1, wherein the ethylene glycol component is at least 96 mol % of the total glycol component, the diethylene glycol component is not more than 2.5 mol % of the total glycol component, the terephthalic acid component is at least 98.5 mol % of the total acid component, the intrinsic viscosity IV is from 0.65 to 0.90 dl/g, and the temperature-lowering crystallization temperature $Tc_2$ is from 150 to 200° C.

13. The polyester resin according to claim 12, wherein the acetaldehyde content AA and the carboxylic acid terminal number AV satisfy the following formulae (1) and (2), respectively:

$$AA \leq 3 \text{ (ppm)} \qquad (1)$$

AV: 1 to 40 (equivalents/ton resin) (2).

14. The polyester resin according to claim 12, characterized in that the content P of phosphorus atoms and the content Sb of antimony atoms satisfy the following formula (3):

$$6.0 \leq Sb/P \leq 20 \qquad (3)$$

(Sb: content of antimony atoms (weight ppm based on the polyester resin), P: content of phosphorus atoms (weight ppm based on the polyester resin)).

15. The polyester resin according to claim 12, characterized in that the content P of phosphorus atoms satisfies the following formula (4):

$$P \leq 14 \qquad (4)$$

(P: content of phosphorus atoms (weight ppm based on the polyester resin).

16. The polyester resin according to claim 13, characterized in that it contains, as a polycondensation catalyst, a compound of at least one metal element selected from the group consisting of Groups 1A and IIA of the Periodic Table, zinc, aluminum, gallium, germanium, titanium, zirconium, hafnium, manganese, iron and cobalt, and the total content M of the metal atoms satisfies the following formula (5):

$$0.1 \leq M \leq 100 \text{ (weight ppm based on the polyester resin) (5).}$$

17. The polyester resin according to claim 16, characterized in that the metal atoms are magnesium, and the content Mg of magnesium atoms and the content P of phosphorus atoms satisfy the following formula (6):

$$1.1 \leq Mg/P \leq 3.0 \qquad (6)$$

(Mg: content of magnesium atoms (weight ppm based on the polyester resin), P: content of phosphorus atoms (weight ppm based on the polyester resin)).

18. The polyester resin according to claim 16, characterized in that the metal atoms are magnesium, and the content of magnesium atoms is from 3 to 25 ppm.

19. The polyester resin according to claim 16, characterized in that the metal atoms are titanium, and the content of titanium atoms is from 0.25 to 10 ppm.

20. The polyester resin according to claim 12, characterized in that the content Sb of antimony atoms satisfies the following formula (7):

$$10 \leq Sb \leq 250 \qquad (7)$$

(Sb: content of antimony atoms (based on the polyester resin ppm).

21. A molded product obtainable from the polyester resin as defined in claim 20.

22. The molded product according to claim 21, which is a hollow molded product for a non-carbonated beverage.

23. The polyester resin according to claim 1, which contains an ethylene terephthalate unit as the main repeating constituting unit, characterized by satisfying the following characteristics (A), (B) and (C):

(A) after formed into a molded product, the temperature-rising crystallization temperature ($Tc_1$) is at least 155° C., and the temperature-lowering crystallization temperature ($Tc_2$) is at most 180° C. or not observed, (B) the difference ($\Delta AA = AA_s - AA_o$) between the acetaldehyde content ($AA_s$; ppm) in a molded product after injection molding at 280° C. and the acetaldehyde content ($AA_o$; ppm) before the injection molding, is not more than 15 ppm, and (C) when an injection-molded sheet having a thickness of 1 mm is immersed in a 0.2 wt % sodium hydroxide aqueous solution at 25° C. in such a state that it is fixed along the outer circumference of a cylinder having a diameter of 32 mm, the environmental stress rupture time is at least 10 minutes.

24. The polyester resin according to claim 23, which satisfies the following characteristics (D), (E) and (F):

(D) the proportion of diethylene glycol in the diol component in the resin is not more than 2.0 mol %, (E) the carboxylic acid terminal number (AV) is from 20 to 50 equivalents/ton resin, and (F) the intrinsic viscosity [η] is from 0.75 to 1.0 dl/g.

25. The polyester resin according to claim 23, which satisfies the following characteristic (G):

(G) the absorbance at a wavelength of 1,000 nm in the form of an injection-molded plate having a thickness of 4 mm, is from 0.04 to 0.20.

26. The polyester resin according to claim 23, which contains a titanium compound and wherein the content (ppm) as antimony atoms (Sb) and the content (ppm) as titanium atoms (Ti) satisfy the following formulae:

$$10 \leq Sb \leq 200$$

$$0 < Ti \leq 10$$

$$150 \leq 100Ti + Sb \leq 1,200.$$

27. A molded product obtainable from the polyester resin as defined in claim 23.

28. The polyester molded product according to claim 27, which is a hollow product for a carbonated beverage.

29. A process for producing a polyester resin, which comprises polycondensing a dicarboxylic acid component containing an aromatic dicarboxylic acid or its ester-forming derivative as the main component and a diol component containing ethylene glycol as the main component, characterized in that a catalyst is added to the reaction system so that the following respective atoms derived from the catalyst will be contained in the following concentration ranges based on the obtainable polyester resin:

$$0 < T \leq 50 \text{ ppm}$$

$$10 \leq Sb \leq 250 \text{ ppm}$$

$$0.1 \leq P \leq 200 \text{ ppm}$$

$$6.0 \leq Sb/P \leq 30$$

(in the above formulae, T is the total concentration (ppm) of at least one type of atoms selected from the group consisting of titanium atoms, hafnium atoms and zirconium atoms in the resin, Sb is the concentration (ppm) of antimony atoms in the resin, and P is the concentration (ppm) of phosphorus atoms in the resin).

30. The process for producing a polyester resin according to claim 29, characterized in that a catalyst is added to the reaction system so that the following respective atoms derived from the catalyst will be contained within the following concentration ranges based on the obtainable polyester resin:

$$0.1 \leq M \leq 200 \text{ ppm}$$

$$1.1 \leq M/P \leq 15$$

(M is the total content (ppm) of at least one type of metal atoms selected from the group consisting of Group IA metal atoms, Group IIA metal atoms, manganese atoms, iron atoms and cobalt atoms).

31. The process for producing a polyester resin according to claim 29, characterized in that the dicarboxylic acid component and the diol component are subjected to an esterification reaction, and at a stage where the esterification ratio is less than 90%, a phosphorus compound is added to the reaction mixture containing the esterification reaction product, and after the esterification ratio has reached at least 90%, at least one metal atom compound selected from the group consisting of a Group IA element compound, a Group IIA element compound, a manganese compound, an iron compound and a cobalt compound, is added, and thereafter, at least one compound selected from the group consisting of a titanium compound, a zirconium compound, a hafnium compound, an aluminum compound, a zinc compound, a gallium compound and a germanium compound, is added.

* * * * *